(12) United States Patent
Bodin et al.

(10) Patent No.: US 11,080,023 B2
(45) Date of Patent: Aug. 3, 2021

(54) SYSTEM AND METHOD IMPLEMENTING A TRANSLATION INTERFACE WITHIN AN INTELLIGENT DIGITAL EXPERIENCE DEVELOPMENT PLATFORM

(71) Applicant: Kony Inc., Orlando, FL (US)

(72) Inventors: William K. Bodin, Austin, TX (US); Edward H. Gross, Orlando, FL (US); Komandur R. Kumar, Hyderabad (IN); Mahendar Yedla, Sangareddy (IN)

(73) Assignee: KONY, INC., Orlando, FL (US)

( * ) Notice: Subject to any disclaimer, the term of this patent is extended or adjusted under 35 U.S.C. 154(b) by 0 days.

(21) Appl. No.: 16/584,123

(22) Filed: Sep. 26, 2019

(65) Prior Publication Data
US 2020/0159552 A1    May 21, 2020

Related U.S. Application Data

(60) Provisional application No. 62/770,365, filed on Nov. 21, 2018.

(51) Int. Cl.
*G06F 8/33*  (2018.01)
*G06F 40/279*  (2020.01)
(Continued)

(52) U.S. Cl.
CPC ............. *G06F 8/33* (2013.01); *G06F 9/454* (2018.02); *G06F 40/279* (2020.01); *G06F 40/58* (2020.01)

(58) Field of Classification Search
None
See application file for complete search history.

(56) References Cited

U.S. PATENT DOCUMENTS

| | | | | |
|---|---|---|---|---|
| 5,903,859 | A | * | 5/1999 | Stone ............... G06F 9/454 704/8 |
| 8,010,578 | B2 | | 8/2011 | Laflen et al. |

(Continued)

OTHER PUBLICATIONS

Office Action dated Jan. 1, 2021 in related U.S. Appl. No. 16/583,914, 26 pages.

(Continued)

*Primary Examiner* — Qing Chen
(74) *Attorney, Agent, or Firm* — Andrew M. Calderon; Roberts Calderon Safran & Cole, P.C.

(57) ABSTRACT

The present disclosure relates to an intelligent digital experience development platform (IDXDP) to assist different users in the development of digital applications. A computer-implemented method for translation includes: identifying text properties of software widgets of a software application that do not have an internationalization key, wherein the text properties show text on a user interface; scanning source code of the software application to identify strings to perform translation capabilities; generating new internationalization keys set to the text properties; replacing the source code of the software application utilizing an application program interface (API) call with the new internationalization keys based on the scanning; adding the strings to an internationalization map, along with their respective new internationalization keys; translating the strings from an initial language to a second language utilizing a translation API to produce translated strings; and adding the second language and the translated strings to the internationalization map.

18 Claims, 32 Drawing Sheets

(51) Int. Cl.
*G06F 9/451* (2018.01)
*G06F 40/58* (2020.01)

(56) References Cited

U.S. PATENT DOCUMENTS

| | | | |
|---|---|---|---|
| 8,667,456 | B1 | 3/2014 | Czymontek |
| 9,043,407 | B1 | 5/2015 | Gaulke et al. |
| 10,628,129 | B2 | 4/2020 | Gondalia et al. |
| 10,635,409 | B2 | 4/2020 | Pradhan et al. |
| 10,740,804 | B2 | 8/2020 | Spivack et al. |
| 2002/0173934 | A1 | 11/2002 | Potenza |
| 2005/0114475 | A1 | 5/2005 | Chang et al. |
| 2006/0095276 | A1 | 5/2006 | Axelrod et al. |
| 2006/0184410 | A1 | 8/2006 | Ramamurthy et al. |
| 2008/0170575 | A1 | 7/2008 | Czuchry |
| 2009/0030673 | A1* | 1/2009 | Chakra .............. G06F 9/454 704/8 |
| 2009/0030674 | A1* | 1/2009 | Chakra .............. G06F 9/454 704/8 |
| 2009/0031170 | A1* | 1/2009 | Tsurumi ............ G06F 11/3692 714/38.14 |
| 2010/0075289 | A1 | 3/2010 | Maher et al. |
| 2010/0191602 | A1 | 7/2010 | Mikkelsen et al. |
| 2013/0013536 | A1 | 1/2013 | Momma et al. |
| 2014/0026113 | A1 | 1/2014 | Farooqi |
| 2014/0365533 | A1 | 12/2014 | Debray et al. |
| 2015/0100409 | A1 | 4/2015 | Sterns et al. |
| 2015/0378692 | A1 | 12/2015 | Dang et al. |
| 2016/0132847 | A1 | 5/2016 | Sarris |
| 2018/0024816 | A1 | 1/2018 | Au et al. |
| 2018/0089591 | A1 | 3/2018 | Zeiler et al. |
| 2018/0107478 | A1 | 4/2018 | Codato et al. |
| 2018/0164966 | A1* | 6/2018 | He .................. G06F 40/47 |
| 2018/0216946 | A1 | 8/2018 | Gueye |
| 2018/0217983 | A1* | 8/2018 | Seto .................. G06F 8/60 |
| 2018/0218252 | A1 | 8/2018 | Wu |
| 2019/0001188 | A1 | 1/2019 | Davis |
| 2019/0079741 | A1 | 3/2019 | Makkar |
| 2019/0079780 | A1 | 3/2019 | Coven et al. |
| 2019/0102078 | A1 | 4/2019 | Bhatt et al. |
| 2019/0171446 | A1 | 6/2019 | Bryan et al. |
| 2019/0208112 | A1 | 7/2019 | Kleinbeck |
| 2019/0303136 | A1* | 10/2019 | Chen ................ G06F 9/454 |
| 2020/0064977 | A1 | 2/2020 | Wu |
| 2020/0065891 | A1 | 2/2020 | Kapoor et al. |
| 2020/0104346 | A1 | 4/2020 | Ananthapur Bache et al. |
| 2020/0159498 | A1 | 5/2020 | Bodin et al. |
| 2020/0159499 | A1 | 5/2020 | Bodin et al. |
| 2020/0159500 | A1 | 5/2020 | Bodin et al. |
| 2020/0159501 | A1 | 5/2020 | Bodin et al. |
| 2020/0159502 | A1 | 5/2020 | Bodin et al. |
| 2020/0159507 | A1 | 5/2020 | Bodin et al. |
| 2020/0159950 | A1 | 5/2020 | Bodin et al. |
| 2020/0160270 | A1 | 5/2020 | Bodin et al. |
| 2020/0160377 | A1 | 5/2020 | Bodin et al. |
| 2020/0160458 | A1 | 5/2020 | Bodin et al. |
| 2020/0249919 | A1 | 8/2020 | Makkar |

OTHER PUBLICATIONS

Notice of Allowance dated Jan. 1, 2021 in related U.S. Appl. No. 16/583,592, 11 pages.
Wang et al., "Mining Succinct and High-Coverage API Usage Patterns from Source Code", 2013, IEEE, 10 pages.
Office Action dated Feb. 10, 2021 in related U.S. Appl. No. 16/584,028, 10 pages.
SAP, Building Business Value by Optimizing Digital Experience Using a Platform-as-a-service Approach, 2019 (Year: 2019), 14 pages.
Office Action dated Sep. 10, 2020 in related U.S. Appl. No. 16/583,592, 19 pages.
Office Action dated Sep. 24, 2020 in related U.S. Appl. No. 16/583,602, 33 pages.
Office Action dated Oct. 16, 2020 in related U.S. Appl. No. 16/583,620, 11 pages.
Office Action dated Aug. 13, 2020 in related U.S. Appl. No. 16/583,914, 16 pages.
Office Action dated Sep. 25, 2020 in related U.S. Appl. No. 16/584,028, 32 pages.
Sebastian Proksch et al, Enriched Event Streams: A General Dataset for Empirical Studies on IN-IDE Activities of Software Developers; 2018 ACM/IEEE 15th International Conference on Mining Software Repositories, May 28-29, 2018, ISBN 978-1-4503-5716-6/18/05, 4 Pages.
Thomas Ball et al., Beyond Open Source: The Touchdevelop Cloud-Based Integrated Development Environment; 2015 2nd ACM International Conference on Mobile Sofware Engineering and Systems, 2015, 11 Pages.
Ying Zhang et al., Smarttutor: Creating IDE-Based Interactive Tutorials via Editable Replay; 2009, IEEE, pp. 559-562.
Neumaier et al., Talking Open Data; Conference Paper in Lecture Notes in Computer Science, Nov. 2017, 6 Pages.
Beaton, Eclipse Neon Top Ten; 2016 Eclipse Foundation, Inc., 14 Pages.
Phillipp Tiedt, Building Cheat Sheets in Eclipse V3.2—Learn About V3.2 Enhancements; Jul. 4, 2011 (First Published Aug. 8, 2006), IBM Corporation, 9 Pages.
Jim Murphy et al., Magic Quadrant for Digital Experience Platforms, Published Jan. 17, 2018, Gartner, Inc. 39 Pages.
Office Action dated Mar. 3, 2021 in related U.S. Appl. No. 16/583,920, 22 pages.
Final Office Action dated Apr. 14, 2021 in related U.S. Appl. No. 16/583,620, 17 pages.
W3schools.com, "JSON—Introduction", 2017, retrieved from http://www-db.deis.unibo.it/courses/TW/DOCS/w3schools/json/json_intro.asp.html, (Year: 2017), 4 pages.
Wikipedia., "JSON", 2017, retrieved from https://web.archive.org/web/20170716085553/https://en.wikipedia.org/wiki/JSON, (Year: 2017),12 pages.

* cited by examiner

Integration Points

Interactive Advisor 1205

| | |
|---|---|
| Autonomous Advisor 1210 | Plug-in Architecture 1230 |
| Global Development Trends 1215 | Training/Support Optimization 1235 |
| Development Advisor 1220 | Improves Sales Efficiency 1240 |
| Technical Eminence 1225 | Product Evolution 1245 |

Cognitive Computing for Omni-Channel Platform

Hello, John. Our records show that you are already enrolled in online banking

SYSTEM AND METHOD IMPLEMENTING A TRANSLATION INTERFACE WITHIN AN INTELLIGENT DIGITAL EXPERIENCE DEVELOPMENT PLATFORM

FIELD OF THE INVENTION

The present disclosure relates to digital experience development platforms and, more particularly, one or more components, systems and methods thereof of an intelligent digital experience development platform (IDXDP) configured to assist different users in the development, design and deployment of digital applications.

BACKGROUND

Digital experience, or application, development is the process by which application software is developed for handheld devices, such as personal digital assistants, enterprise digital assistants, mobile phones (e.g., smart phones), tablet computers, embedded devices, virtual personal assistants (VPAs), smart televisions, in-vehicle infotainment systems, appliances, etc. Digital applications (e.g., "apps") can be pre-installed on devices during manufacturing, downloaded by customers from various digital software distribution platforms, or delivered as web applications using server-side or client-side processing to provide an application-like experience within a web browser.

In order to develop such apps, a developer, designer, etc. requires several tools, e.g., toolsets. These tools can include, e.g., integrated development environment (IDE) tools, provided by different studios. These tools can be used to develop applications for different applications and operating systems. These tools can be used by the developer, for example, to create or design different assets such as skins, widgets, platform specific icons, buttons, etc. To complicate matters, though, there is no standard way of creating these different assets, leaving the developer with the need to constantly recreate such assets without knowledge of how other developers or designers have created the same asset. Also, these tools only provide limited assistance to the developer or designer, requiring the customer to request manual support from the service provider. This tends to be a tedious and expensive process.

SUMMARY

In a first aspect of the invention, there is a computer-implemented method for performing the steps/functionality described herein. In another aspect of the invention, there is a computer program product including a computer readable storage medium having program instructions embodied therewith. The program instructions are executable by a computing device to cause the computing device to perform the steps/functionality described herein. In another aspect of the invention, there is system including a processor, a computer readable memory, and a computer readable storage medium. The system includes program instructions to perform the steps/functionality described herein. The program instructions are stored on the computer readable storage medium for execution by the processor via the computer readable memory.

In further aspects of the invention, a computer-implemented method for translation comprises: identifying, by a computing device, text properties of software widgets of a software application that do not have an internationalization key, wherein the text properties show text on a user interface; scanning, by the computing device, source code of the software application to identify strings needed to perform translation capabilities; generating, by the computing device, new internationalization keys which are set to the text properties; replacing, by the computing device, the source code of the software application utilizing an application program interface (API) call with the new internationalization keys based on the scanning; adding, by the computing device, the strings to an internationalization map, along with their respective new internationalization keys; translating, by the computing device, the strings from an initial language to a second language utilizing a translation API to produce translated strings; and adding, by the computing device, the second language and the translated strings to the internationalization map.

In further aspects of the invention, a computer program product comprises a computer readable storage medium having program instructions embodied therewith, the program instructions executable by a computing device to cause the computing device to: identify text properties of software widgets, software forms, software templates and software masters of a software application that do not have an internationalization key, wherein the text properties show text on a user interface; scan source code of the software application to identify strings needed to perform translation capabilities; generate new internationalization keys, wherein the new internationalization keys are set to the text properties; replace the source code of the software application utilizing an application program interface (API) call with the new internationalization keys based on the scanning; add the strings to an internationalization map, along with their respective new internationalization keys; translate the strings from an initial language to a second language utilizing a translation API to produce translated strings; add the second language and the translated strings to the internationalization map; and save in a repository, translated software widgets, software forms, software templates and software masters of the software application generated during the translation of the strings, wherein the repository eliminates the need for users to translate the same software widgets, software forms, software templates and software masters again.

In further aspects of the invention, a translation system comprises: a processor, a computer readable memory and a computer readable storage medium associated with a computing device; a centralized management system of the computing device including: a translation engine configured to implement services of a user interface reader, a JavaScript code reader, and an internationalization reader, wherein the centralized management system is configured to: obtain from a software development tool, by the user interface reader, text properties of software widgets of a software application, wherein the text properties do not have an internationalization key; identify, by the user interface reader, strings in source code of the software application needed to perform translation capabilities; generate, by the user interface reader, new internationalization keys which are set to the text properties; replace, by the JavaScript code reader, the source code of the software application utilizing an application program interface (API) call with the new internationalization keys based on the identifying the strings; send, by the internationalization reader, the strings to the software development tool to be added to an internationalization map along with their respective new internationalization keys; utilize, by the translation engine, a translation API to translate the strings from an initial language to a second language to produce translated strings; and send, by the internationalization reader, the second language and the translated strings to the software development tool to be added to the internationalization map.

BRIEF DESCRIPTION OF THE DRAWINGS

The present invention is described in the detailed description which follows, in reference to the noted plurality of drawings by way of non-limiting examples of exemplary embodiments of the present invention.

FIG. 1C shows an overview of a functional block diagram of the IDXDP in accordance with aspects of the present disclosure.

FIG. 12C shows screenshots before and after translation conversion support as implemented by the system and method of translation application.

FIG. 12D shows screenshots of translation of strings on forms (from English to Mandarin) as implemented by the system and method of translation application.

DETAILED DESCRIPTION

Figure 1A:
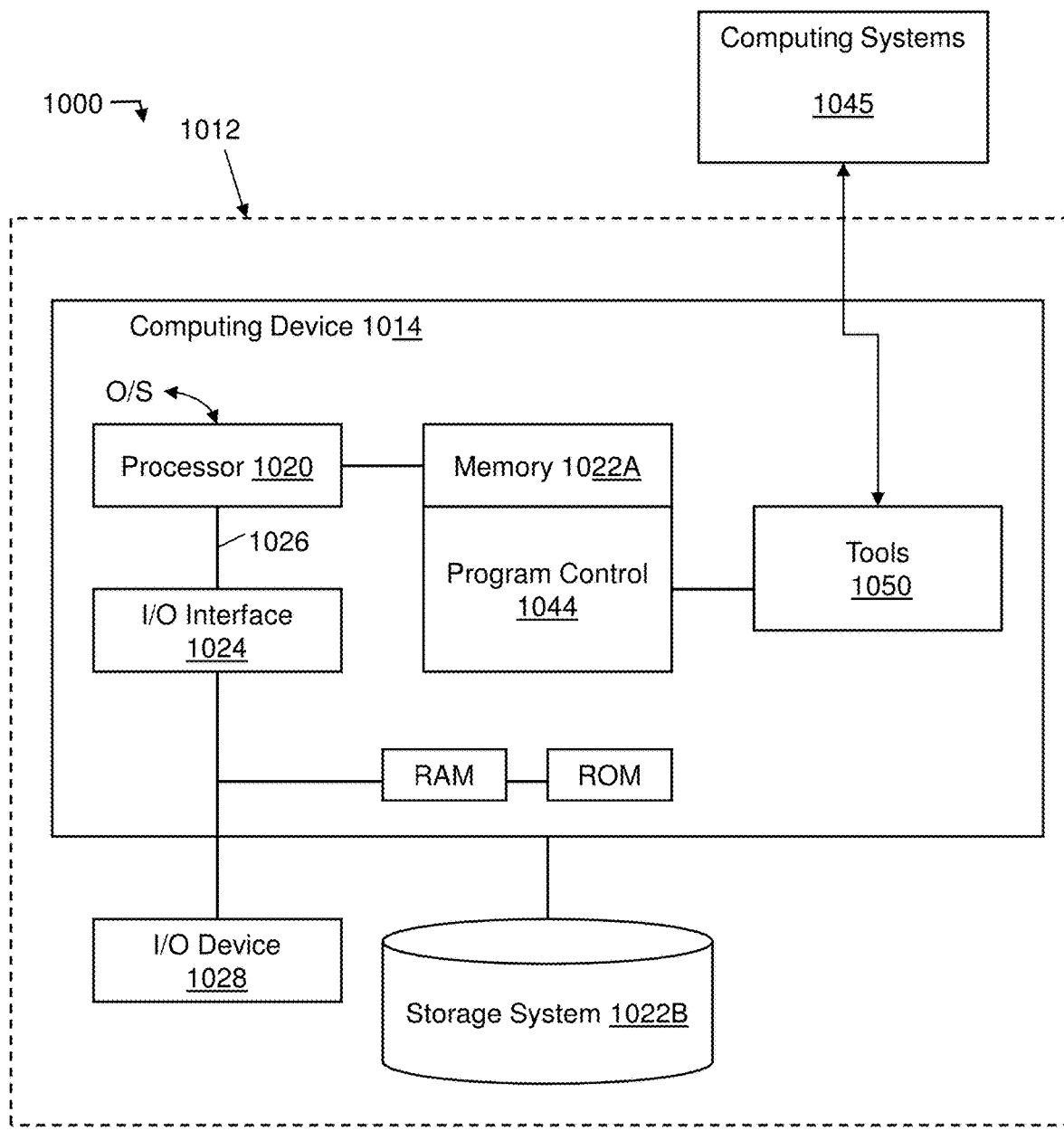
FIG. 1A depicts a computing infrastructure in accordance with aspects of the present disclosure.

The present disclosure relates to digital experience (also referred to as a digital application) development platforms and, more particularly, to an intelligent digital experience development platform (IDXDP) configured to assist different users in the development, design and deployment of digital applications. The term "digital application development platform" or the use of the term "mobile" should not be considered a limiting feature as the scope of the invention is extended to more than cellular telephones, tablets, etc. In embodiments, the platform is extended to produce runtimes for virtual personal assistants (VPA's) (e.g. Alexa® of Amazon Technologies, Inc.), in-vehicle infotainment systems, appliances, etc., beyond mobile. The "digital experience" refers more broadly to areas of enablement, which may not be packaged as a traditional "app" or binary. It broadens the focus to include areas like smart television "apps", appliance-based apps which may be apps or widgets, VPA type services (Alexa® by Amazon Technologies, Inc., Google Home™, Homepod® by Apple Inc.), etc. So generally, IDXDP is a broader aperture for how consumers, enterprise employees, etc. will "experience" technology in the future.

In embodiments, the IDXDP includes a number of discrete, intelligent platforms and/or functionality that constitute a disruptive shift in the capabilities of an application development platform. More specifically, the IDXDP incorporates artificial intelligence (AI) capabilities, e.g., natural language processing (NLP), machine learning processing, and rules engines, with the integration of other functionality to provide a highly granular event queue within an application platform to assist in the development, design and deployment, etc., of digital applications. Advantageously, the AI capabilities will assist different types of users (personas), e.g., digital application developers, digital application designers and enterprise administrators, etc., to improve and assist in the efficient development, design and deployment lifecycle of a digital application.

For example, in embodiments, the IDXDP mines individual actions and aggregates actions on a global user basis to determine how best to suggest methods to achieve an improved outcome. The outcome can range from the development of a digital application, to the design (e.g., look and feel) of the digital application, to the deployment of the digital application within an enterprise, etc. In embodiments, the IDXDP can also interface directly with any third party services, e.g., Salesforce®, to assist in the upsell or other potential actions to improve the performance and/or functionality of the digital application.

In addition, the IDXDP can be integrated with different application platform such as development platforms or development tools or components thereof, e.g., Kony Visualizer® by Kony, Inc. to identify deficiencies within the development tool, to create its own descriptive epics (i.e., large bodies of work that can be broken down into a number of smaller tasks (called stories) using, e.g., project management tools, debugging tools, issue tracking tools, etc. (such as Jira® by Atlassian Pty Ltd), which can then be fed directly to a development or design team to enhance and/or improve the development life cycle, e.g., programming, functionality, testing, etc., of the digital application. More specifically, the IDXDP described herein can be an advanced feature that essentially lives within an application platform, e.g., Kony Visualizer® by Kony, Inc.

It should be understood that the term object, widget, form, template, etc. are used generically herein and, in appropriate instances, each can be interchangeable in implementing the functionality herein. For example, learning of a widget can be equally applicable of learning an object, template or other asset, for the AI to make recommendations for best practices, dead-ending purposes, creating tutorials, upselling, standardizing code, or other functionality described herein with respect to the different modules, components, tools, etc. In addition, the term asset and/or object may be understood to be the most generic terminology for any creation by the user in the development tool, e.g., skin, widget, template, button, etc.; although each of these terms as noted above may be used interchangeably.

System Environment

The IDXDP may be embodied as a system, method or computer program product. The IDXDP may take the form of a hardware embodiment, a software embodiment or a combination of software and hardware. Furthermore, the IDXDP may take the form of a computer program product embodied in any tangible storage medium having computer-usable program code embodied in computer readable storage medium or device. The IDXDP operates by processing user actions, without dependence on a user input widget, or can expose one or more user input methods in which a user can invoke intelligent capabilities. User input methods can be text oriented, speech oriented, or by any other input method as is known to those of skill in the art.

The computer readable storage medium is not a transitory signal per se, and is any tangible medium that contains and stores the program for use by or in connection with an instruction execution system, apparatus, or device. For example, the computer readable storage medium can comprise electronic, magnetic, optical, electromagnetic, infrared, and/or semiconductor systems and/or devices. More specific examples (a non-exhaustive list) of the computer readable storage medium include: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any combination thereof. Accordingly, the computer readable storage medium may be any tangible medium that can contain or store a program for use by or in connection with an instruction execution system, apparatus, or device of the present invention.

The computer readable storage medium can be used in the illustrative environment 1000 shown in FIG. 1A for assisting and/or managing the development, design, deployment and/or other enhancements or functionality of any number of digital applications. In embodiments, the computing environment 1000 includes a server 1012 or other computing system, which can be any platform used for the development, design or deployment of digital applications. For example, server 1012 can be representative of a development tool, e.g., Kony Visualizer® by Kony, Inc. integrated within the Kony MobileFabric® tool by Kony, Inc. or other development tools or platforms for the development, design and deployment of digital applications. The server 1012 can also be representative of a digital backend as a service (MBaaS), maintained by a service provider, e.g., Kony® by Kony, Inc. As should be understood by those of ordinary skill in the art, the MBaaS is a model for providing web and digital application developers with a way to link their applications to backend cloud storage and Application Program Interfaces (APIs) exposed by backend applications, while providing features such as user management and integration.

In embodiments, the server 1012 can be a single, open standards-based digital infrastructure platform. The single, open standards-based digital infrastructure platform can unify multiple infrastructures/platforms together, including mobile application development platform (MADP), mobile backend as a service (MBaaS), API management, and platform as-a-service (PaaS) infrastructures. To this end, for example, the server 1012 can be representative of Kony MobileFabric® by Kony, Inc. which is a converged mobile/digital infrastructure that empowers enterprises to significantly reduce time to market, while providing an interactive guide of best practices using intelligent subsystems, e.g., bots, etc. In this example, the server 1012 can further integrate Enterprise Mobility Management/Mobile Application Management (EMM/MAM) server functions (e.g., management instances), as well as incorporate any number of enterprise stores, e.g., an app store.

Figure 1B:
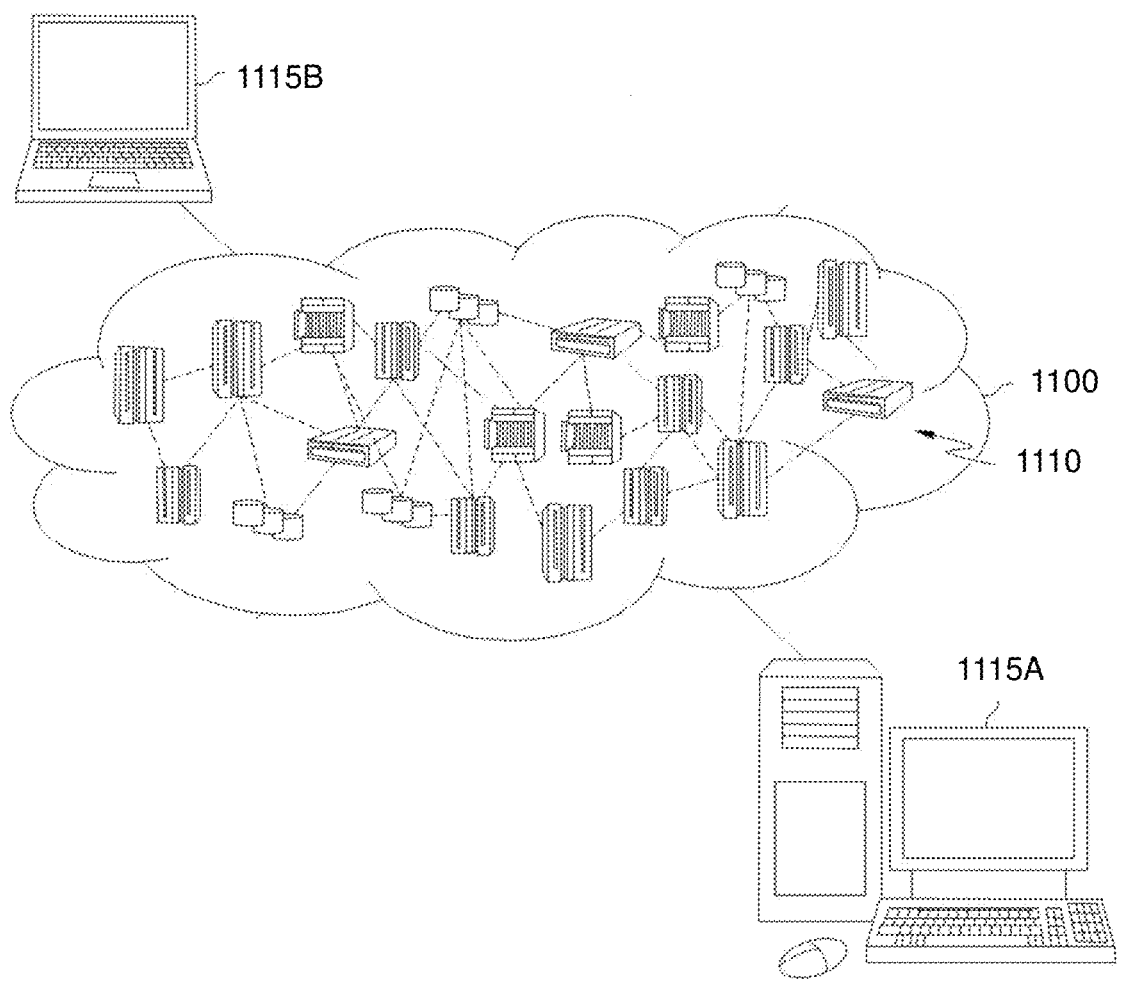
FIG. 1B depicts a cloud computing environment in accordance with aspects of the present disclosure.

The server 1012 and/or processes performed by the server 1012 can be integrated into the networking environment (e.g., cloud environment) such as shown in FIG. 1B or any enterprise management system, development tool or other system also represented in FIG. 1B. The server 1012 can also access and mine the worldwide web or other external computing systems 1045 for best practices in the development, design, deployment, etc., of digital applications using the intelligent systems described herein.

Still referring to FIG. 1A, the server 1012 includes a computing device 1014, which can be resident on a network infrastructure or computing device. The computing device 1014 includes a processor 1020 (e.g., a central processing unit (CPU)), a memory 1022A, an Input/Output (I/O) interface 1024, and a bus 1026. The bus 1026 provides a communications link between each of the components in the computing device 1014. In addition, the computing device 1014 includes a random access memory (RAM), a read-only memory (ROM), and an operating system (O/S). The computing device 1014 is in communication with the external I/O device/resource 1028 and a storage system 1022B. The I/O device 1028 can comprise any device that enables an individual to interact with the computing device 1014 (e.g., user interface) or any device that enables the computing device 1014 to communicate with one or more other computing devices (e.g., devices 1045, etc.) using any type of communications link.

The processor 1020 executes computer program code (e.g., program control 1044), which can be stored in the memory 1022A and/or storage system 1022B. In embodiments, the program control 1044 of the computing device 1014 of the server 1012 controls the tool(s) (e.g., modules) 1050 described herein which can be program modules, etc., comprising program code adapted to perform one or more of the processes described herein. The program code can include computer program instructions stored in a computer readable storage medium. The computer program instructions may also be loaded onto the computing device 1014, other programmable data processing apparatus, or other devices to cause a series of operational steps to be performed on the computer.

The tools 1050 can be implemented as one or more program code in the program control 1044 stored in memory 1022A as separate or combined modules. Additionally or alternatively, the tools 1050 may be implemented as separate dedicated special use processors or a single or several processors to provide the functionality described herein. While executing the computer program code, the processor 1020 can read and/or write data to/from memory 1022A, storage system 1022B, and/or I/O interface 1024. In this manner, the program code executes the processes of the invention. By way of non-limiting illustrative example, the tool(s) (e.g., modules) 1050 are representative of the following functionality of systems and methods associated with a development tool, e.g., Kony Visualizer® by Kony, Inc.

Intelligent Mobile Application Development Platform

The IDXDP can represent complex widgets, object services or other components created within an integrated development environment (IDE). The IDE is a software application that provides comprehensive facilities to computer programmers for software development. An IDE normally includes of a source code editor, build automation tools, and a debugger. In more specific embodiments, the IDXDP facilitates a system and method for representing objects by implementing a granular event process, and representing user actions, object component settings, field values and other metadata. That is, the IDXDP lays a foundational event queue, which can be used with the additional functionality described herein.

In embodiments, the event oriented representation and syntax provided in the IDXDP captures a full fidelity and accurate depiction of a widget, service or other software component (known generally as an "asset"). Its structure can be used as a content feed for AI, machine learning and analytics based engines (or other cognitive platforms) to determine how developers and other users are constructing components and ultimately developing and/or designing digital applications. The AI and machine learning are able to acquire insight into programming techniques to determine how to improve design and development practices and techniques.

In embodiments, the system and method implements a highly IDXDP capable of representing complex widgets, object services or other components created within an IDE. This event queue serves as a rolling record of the events, which go into creating a component of a digital application. By monitoring this event queue (or stream), the IDXDP is able to determine the intent of the developer, which can be later used to provide recommendations of best practices for building components, tutorials or other functionality described herein. Several related actions can be invoked as a result of this monitoring process.

The IDXDP also lays the foundation for further functionality described herein which allows AI (e.g., cognitive computing) to suggest better ways to achieve an outcome (e.g., building assets, service definition, etc.). The IDXDP does this by relating current actions to outcomes, which already exist, either in the developer's local workspace, a software marketplace or other repository.

Event Processing System and Method

The event processing system and method is a system and method for processing an event queue comprised of IDE user actions and constructing an object or service from the data within that queue. For example, the event processing system and method uses the event queue as described herein to drive recommendations to developers, designers, and other personas using the IDXDP described herein. In embodiments, when implementing the event processing system and method, natural language narrations can be dynamically formed and rendered to the user to create a depth of understanding related to the component or object composition and capabilities or other assets. In addition, a machine learning component continuously optimizes design assets and offers the latest embodiment to the user.

Autonomous Advisor

The autonomous advisor is a system and method for analyzing an event queue to derive repetitive actions and refactor those actions into specific application components. These application components can include but are not limited to forms, master templates (masters) or macros, widgets, services, or other assets, etc. By way of example, the autonomous advisor creates a cognitive development environment capable of learning from a single user or multiple users, and creates suggested actions based on a global community of users. The autonomous advisor is also capable of determining the class of user (e.g., designer, developer, citizen developer, business stakeholder, etc.) and adapting the guidance and suggestions to the particular competency level of the class of user.

Systems and Methods of Converting Actions Based on Determined Personas (Users)

The systems and methods of converting actions based on determined personas (users) captures and aggregates multi-role user actions (e.g., designers, developers, etc.) performed within a platform into a data repository. The systems and methods of converting actions based on determined personas (users) will also perform analytics capable of determining future enhancements needed to that platform. These enhancements will be used to more efficiently assist a user (e.g., designers, developers, etc.) in the development, design and/or deployment of an application. Systems and methods within the IDXDP eliminate the need for a user of the intelligent digital experiences development platform to specify their persona of architect, designer, developer, integrator, or other persona. The intelligent digital experiences development platform accomplishes this by examining the user's actions via the users Individual Developer Stream (IDS) and comparing that with the list of actions from a Team Developer Stream (TDS) coming from users with well-known or algorithmically derived personas. This enables the intelligent digital experiences development platform to infer persona in cases where the user has not self-identified. This also allows the intelligent digital experiences development platform to support Dynamic Persona Shifting (DPS).

DPS applies to users that work across multiple personas when working on tasks, but within a specific task, they are almost always acting within a single persona. DPS enables the intelligent digital experiences development platform to identify a user's current persona based on the individual developer stream and personalize the experience for that user for their current task.

Additionally, an End User Usage Stream (EUS) is client side (application) functionality, which optionally collects the event activity stream for end-users of applications or other digital experiences. The EUS helps the application developer by tracking high usage features, slow functions/services, areas of positive or negative feedback, and alerts users of the intelligent digital experiences development platform of the user experience associated with their current code or the impact of their changes in a particular component or module. The Autonomous Advisor (AA) acts on a single user, but also across the entire team or global community to identify duplicate/repetitive tasks. The AA or Autonomous Advisor Module (AAM) reduces rework through repetition elimination by scanning across IDS, TDS and clinical decision support (CDS) repositories, identifying similar components, code snippets, services and other assets. The AAM, for example, can act on a single user, but also across the entire team to identify duplicate/repetitive tasks across the team or full community. The AAM consumes IDS, TDS and CDS, analyzing and routing data to the Autonomous Advisor and other end points.

System and Method of Generating Actionable Intelligence
Based on Platform and Community Originated Data The system and method of generating actionable intelligence based on platform and community originated data is a system and method for aggregating platform and community originated tasks into events and further evaluating these events into actionable sales intelligence. For example, the system and method creates an AI capability, which determines if the usage (either by a single person or by an enterprise group) suggests that a further sales action should be taken, e.g., an upsell for instance.

Interactive Tutorial Platform and Related Processes

The interactive tutorial platform is a system and method for the dynamic conversion of a software component, comprised of data and meta-data, into a real-time playback of component creation. This system provides the capability to use components within a component library or marketplace, to educate a designer, developer or other associated skills role in the functionality, the runtime characteristics and the end to end integration of a software component.

In embodiments, the interactive tutorial platform and related processes allows for components to tell a story about themselves. In conventional systems and methods, a story was often told via self-help videos, which shows a user manually walking through the relevant steps of the development and/or design process. The self-help video is a non-interactive video, which simply shows a user going through creation steps. In contrast, the interactive tutorial platform and related processes shows each step of its creation and behaves similar to another developer or designer taking the user through the creation of the component. For example, the methods and intelligence of developing or designing a digital application or component thereof, for example from Kony Marketplace™ by Kony, Inc., can now be imported into the workspace of development tool, e.g., Kony Visualizer by Kony, Inc., and subsequently "played", resulting in the component (or service) informing the user how it was actually created. This includes optional narration tags, which can specifically be rendered as balloon text or spoken words, thereby essentially performing a dynamic technology transfer to the user. In embodiments, a system allowing for ratings to be associated with interactive renderings is also contemplated herein.

System and Method of Real-Time Collaboration

The system and method of real-time collaboration is a system and method for real-time collaboration between developers (or other personas) within the enterprise, and also connecting with a community of developers. By implementing the system and method of real-time collaboration, system administrators can define collaboration rules across the enterprise of users or at the developer level, for example.

System and Method for Connecting End Users to Business Systems

The system and method for connecting end users to business systems is a system and method, which enhances service and generates business leads. In embodiments, the system will allow the users with certain roles (e.g., managers, lead developers, etc.) to request help for professional services, buy products, proposals, etc., through a chat interface. In embodiments, the system and method for connecting end users to business systems routes these requests to customer relation management systems and/or through the business systems, which logs the requests. The system will also autonomously respond back to the users when the previously sent requests are updated by the interested parties. Though a chat interface is referred to previously, this intelligent system also facilitates communication through other service calls or services integrations to third party software components and applications.

Registration System

The registration system is a system and method, which allows vendors to register themselves using an administrative portal/website. In embodiments, the system and method allows third party vendors to plug in through the administrative portal, which will assign each vendor a unique handle. This unique handle is used by the end users to communicate with external vendors through the systems described herein. In embodiments, the system and methods can define the communication contract for the external vendors.

System and Method to Campaign Products and Services

The system and method to campaign (e.g., identify and sell) products and services have the ability to run marketing campaigns for product/professional services with a targeted audience. The system and method provides the user with an option for the user to turn on/off campaigns, record and submit the results of the campaign to a central repository, and run analytics on the response received from the campaigns.

Cloud Computing Platform

FIG. 1B shows an exemplary cloud computing environment 1100 which can be used to implement the IDXDP. The cloud computing is a computing model that enables convenient, on-demand network access to a shared pool of configurable computing resources, e.g., networks, servers, processing, storage, applications, and services, that can be provisioned and released rapidly, dynamically, and with minimal management efforts and/or interaction with a service provider. In embodiments, one or more aspects, functions and/or processes described herein may be performed and/or provided via cloud computing environment 1100.

As shown, cloud computing environment 1100 comprises one or more cloud computing nodes 1110 with which local computing devices are used by the developer, design, administrator of an enterprise, etc. It is understood that the types of computing devices 1115A, 1115B shown in FIG. 1B are intended to be illustrative only and that the cloud computing nodes 1110 and the cloud computing environment 1100 can communicate with any type of computerized device over any type of network and/or network addressable connection (e.g., using a web browser). These local computing devices can include, e.g., desktop computer 1115A, laptop computer 1115B, and/or other computer system. In embodiments, the cloud computing nodes 1110 may communicate with one another. In addition, the cloud computing nodes 1110 may be grouped (not shown) physically or virtually, in one or more networks, such as Private, Community, Public, or Hybrid clouds or a combination thereof. This allows cloud computing environment 1100 to offer infrastructure, platforms and/or software as services for which a cloud consumer does not need to maintain resources on a local computing device.

The cloud computing nodes 1110 can include a variety of hardware and/or software computing resources, such as servers, databases, storage, networks, applications, and platforms as shown, for example, in FIG. 1A. The cloud resources 1110 may be on a single network or a distributed network across multiple cloud computing systems and/or individual network enabled computing devices. The cloud computing nodes 1100 may be configured such that cloud resources provide computing resources to client devices through a variety of service models, such as Software as a Service (SaaS), Platforms as a service (PaaS), Infrastructure as a Service (IaaS), and/or any other cloud service models. The cloud computing nodes 1110 may be configured, in some cases, to provide multiple service models to a client device. For example, the cloud computing nodes 1110 can provide both SaaS and IaaS to a client device.

Functional Block Diagram for Implementing Features of the Intelligent Mobile

Application Development Platform

FIG. 1C shows an overview of a functional block diagram of the IDXDP (also referred to as Kony IQ™ by Kony, Inc.) in accordance with aspects of the present disclosure. The IDXDP includes several modules as described below, which are provided in a cognitive computing environment for omni-channel platforms. The IDXDP implements the different AI and natural language learning components described herein to provide the different functionality as described throughout the disclosure, e.g., recommendations of best practices, tutorials, upselling actions, etc. As should be understood by those of skill in the art, omni-channel is a multichannel approach to sales that seeks to provide the customer with a seamless experience. Cognitive computing involves self-learning systems that use data mining, pattern recognition and NLP. The goal of cognitive computing is to create automated information technology (IT) systems that are capable of solving problems without requiring human assistance or intervention.

In embodiments, the functional blocks described herein can be implemented in the computing environment 1000 of FIG. 1A and/or the exemplary cloud computing environment 1100 of FIG. 1B. It should be understood that each block (and/or flowchart and/or swim lane illustration) can be implemented by special purpose hardware-based systems that perform the specified functions or acts or carry out combinations of special purpose hardware and computer instructions. Moreover, the block diagram(s), flowcharts and swim lane illustrations described herein illustrate the architecture, functionality, and operation of possible implementations of systems, methods, and computer program products according to various embodiments of the present disclosure. In this regard, each block in the flowchart or step in the swim lane illustrations or block diagrams may represent a module, segment, or portion of instructions, which comprises one or more executable instructions for implementing the specified logical function(s).

Interactive Advisor Module

The interactive advisor module 1205 is configured to answer questions of any particular user, whether it be the developer, designer, administrator, etc. So, by implementing the interactive advisor module 1205, the user has the ability ask questions, e.g., "do you have any login templates?", "can you clean up my project?", "can you deduplicate or can you eliminate unused skills or unused actions?", etc., and these questions will, in turn, invoke search capabilities which will return pertinent answers within an interactive chat window. In this way, the interactive advisor module 1205 allows for multi-persona from across a number of technical backgrounds or even non-technical backgrounds to use the platform. This provides the ability to interact with and optimize the advice and how it is given to any one of those personas. The functionality also includes an opted in/opted out capability.

The interactive advisor module 1205 determines the actions of the user, e.g., whether or not a user is creating a form (or other asset) in a workspace or is collaborating with others to create such a form, and determines that such actions are similar or the same as another user who already successfully created the form (or other asset) using its machine learning perspective. The IDXDP can then make suggestions to complete the tasks, giving examples of things that can speed up the development. These provided examples might be further along than the current user, which can then be implemented immediately by the user from a backend conductivity point right away.

Autonomous Advisor Module

The autonomous advisor module 1210 allows the IDXDP to go from an interactive advisor to an autonomous advisor, which functions in the background to provide guidance to the user. For example, the autonomous advisor module 1210 continuously looks for things, e.g., completion of a certain activity, where the user is creating a certain asset form in a digital application that represents a product list, a scrollable product list, etc. The autonomous advisor module 1210 can then manage the static assets using labels, image holders, etc. In embodiments, the autonomous advisor module 1210 can be implemented to perform other functions including providing recommendations of best practices, generating and providing tutorials, etc., in addition to the other capabilities described herein.

Another example of implementation of the autonomous advisor module 1210 is a designer using color palettes. In this example, a designer may be using particular colors to represent particular buttons, particular backgrounds, and forms, etc. The autonomous advisor module 1210 is able to make recommendations so that the designer stays within a particular approved color palette in order to comply with specific guidelines or best practices, in general. This allows the outcome from the designer to look and feel consistent.

Global Developer Trends Module

The global developer trends module 1215 is configured to obtain global trends within any particular industry. For example, in implementation, the global developer trends module 1215 is not simply obtaining intelligence from one person, but on a global basis. This global knowledge may be obtained through other applications within the platform or from external systems including the scraping of the internet or other third party applications, i.e., global developer pool. These global trends, in essence, are provided from a developer population across the globe and then applied locally. These trends can then be used to improve the outcome locally in the design, development and/or deployment of the application. These trends can include, e.g., how to use specific code or a highly customized code in a particular application.

With this noted, the global developer trends module 1215 is configured to gather information from a global population of developers/designer in real time using machine learning to distill their particular actions into consequences. Also, the global developer trends module 1215 can relate what is found, e.g., what they are doing and how they did it, to then implement such new techniques, etc. into the productivity of the current user.

Development Advisor Module

The development operations (DevOps) advisor module 1220 is configured to provide the ability to not just look at the tools that are available, e.g., tools that are currently in the developer kit, but a global set of tools for the development, design and deployment of the application. In other words, the DevOps advisor module 1220 can include embedded text editing, program editing features, built panels, and various configurability to assist the user in their particular tasks. More specifically, the DevOps advisor module 1220 provides the ability to look at what developers are using as peripheral utilities and peripheral features around the application platform, e.g., Kony Visualizer® by Kony, Inc., so that when asked a question, or autonomously, the DevOps Advisor 1220 can recommend different tools to improve efficiency of the particular user, e.g., developer, designer, etc. The recommendation can be from sampling a broad array of development environments and in real-time keeping up with these environments.

Technical Eminence Module

The technical eminence module 1225 is an overhead task most of the time, e.g., packaging an asset for marketplace, which can be made part of the marketplace. For example, the technical eminence module 1225 is configured to provide an enterprise or team to share assets back and forth. These assets can be shared between private and public marketplaces, to publicly or privately accessible repositories (e.g., Stack Overflow® by Stack Exchange, Inc., GitHub® by GitHub, Inc. or others), as well as amongst teams or people with a team setting, as examples. In embodiments, the technical eminence module 1225 provides configurations and administrative capabilities that allow a team lead, for example, of a particular group of technical resources to use different resources within the constraints of a large-scale enterprise.

To enforce particular authentication routines, e.g., a particular look and feel of a widget that is being used/shared, the IDXDP, e.g., the technical eminence module 1225, can be the orchestrator between the asset just created on the public marketplace or private marketplace, stack overflow, or other kind of publication site. This is very beneficial to the enterprise, in general, so that the user can implement reusable assets that are essentially approvable and usable, with the approval or preauthorization from the enterprise administrator.

Plug-in Architecture Module

The plug-in architecture module 1230 is configured to incorporate multiple "cognitive brains" into the flow of processing. In essence, the plug-in architecture module 1230 allows plug in capability of different bots, e.g., a meta-bot, chat bots, and other tools provided herein (e.g., each of the different discrete components, systems and methods described herein such as any of the engines described herein, e.g., recommendation engine, autonomous advisers, managers (event manager), modules of FIG. 1C, etc.) and provides the orchestration of such plug-ins. In this way, the plug-in architecture module 1230 allows the IDXDP to be enhanceable and extendable over time.

In embodiments, the plug-in architecture module 1230 allows multiple brains (e.g., bots having certain AI) that can be configured in such a way that the handoff between those can be orchestrated and orderable, etc. In this way, it is now possible to chain intelligence, e.g., bots, from boutique level or industry-specific or enterprise specific development tools to the IDXDP to take advantage of their intelligence. This will allow cross team intelligence, which a particular brain may offer in order to benefit from the utility for a particular need.

The different developer or utility specific bots, e.g., AI, may then be hosted locally on the development platform, e.g., Kony Visualizer® by Kony, Inc. For example, there can be many different AI including a specific type of DevOps brain that is written around the use of a particular tool that has just emerged. Or, there may be a particular security brain that is making the developer aware of particular security paradigms when they build their digital application.

Training/Support Optimization Module

The training/support optimization module 1235 is configured to create and view an interactive type of tutorial for training a user in the construction or use of different assets, e.g., widgets, micro applications, mobile and digital applications, etc. These different assets can be constructed internally as objects and name values and pairs, etc., or externally. For example, the training/support optimization module 1235 provides the ability to assemble an object (asset) in real-time using the IDE so that the object can actually be constructed by the user.

More specifically, in embodiments, the training/support optimization module 1235 creates a new way of creating an interpreter for the application platform that will allow the developer, designer or other user to see how something is being constructed, in real time. This instruction set is provided within the context of the IDE. Also, in the context of the training/support optimization module 1235, an editor function allows the user to edit and create different content, i.e., building of a particular asset such as a skin, widget, button, attributes or objects, or other assets, etc., with natural pauses in the playback of that particular asset on the IDE.

The training/support optimization module 1235 also supports the injection of speech or graphics or pop-up bubble text as examples. The training/support optimization module 1235 also provides the ability to inject metadata around a particular asset so that it is now possible to convey messages to a person that is looking at the real-time rendering of that asset within the IDE.

The support optimization portion of the training/support optimization module 1235 is also configured to assist the developer in a path of best practices, versus just an infinite amount of re-creating of an asset over again. In addition, the support optimization portion comes in terms of data mining and machine learning where developers or other users (e.g., designers) are dead-ending in their development processes or giving up on a certain approach. In these scenarios, the support optimization portion of the training/support optimization module 1235 can capture and catalog the approach and provide alternative suggestions, i.e., provide appropriate autonomous advice to continue their project. Accordingly, the support optimization provides a type of trouble ticket avoidance approach. The functionality within the training/support optimization module also provides users with the ability to record and annotate personally developed assets.

Improve Sales Efficiency Module

The improve sales efficiency module 1240 is configured to identify an uptake in use of the application platform within a certain class of individual or a certain enterprise, etc. In these cases, an intelligence quotient (IQ) engine (e.g., Kony IQ™ by Kony, Inc.) of the improve sales efficiency module 1240 has the ability to feedback these kind of metrics into a salesforce service or a salesforce database which, in turn, is provided to a member of a sales support team informing them of potential upsell opportunities. Accordingly, the improve sales efficiency module 1240 can identify and alert the user to particular upselling outside of the enterprise. In addition, the improve sales efficiency module 1240 can identify specific upgrades to service levels directly within the application platform, e.g., Kony Visualizer® by Kony, Inc.

Product Evolution Module

The product evolution module 1245 is configured to keep track of feature requests, and how to make enhancements to the application platform. Often times, enhancements to an application platform are based on customer feedback, written customer feedback, emails, etc. This feedback is now to be automated, broken down into epics and different DevOps actionable entities, to create an engineering effort around such suggestions. These functions also include the ability for the intelligent digital experience platform to suggest to users that they enhance a given widget or module as it would then include extended functions found in feature requests or epic repositories, making their efforts more universally or broadly applicable.

For example, the product evolution module 1245 is configured to determine when a developer or other users (e.g., designers) are dead-ending in their development processes or giving up on a certain approach and dynamically creating a story (e.g., using Jira® software). In this way, there is no guessing as to the needs of the customer and, instead, the product evolution module 1245 can identify in real-time a particular problem in order to then evolve the product to address that particular issue. In addition, a weighting can be provided to the problem based on the amount of times such problem has been encountered, and placed in a prioritized queue of a project engineering based on such weighting. This will allow the project engineering the ability to prioritize the engineering of certain problems.

In addition, the product evolution module 1245 is used to provide updates to certain requirements or issues or other types of updates. For example, when a new patch has been issued for a piece of software product, a story can be automatically generated, e.g., "Please update a component in your application platform" and sent to the appropriate personas (e.g., developer, designer, etc.). As another example, the product evolution module 1245 is configured to notice when a same component keeps causing problems such that such problem can be handed to the analytics engine (e.g., AI) for automatically putting together a fix. In this scenario, the fix is automatically targeted to those users for those stories, letting them know that there is a fix. In embodiments, Jira® software can open a story to fix such a problem.

In another scenario, the product evolution module 1245 can detect that a customer (e.g., user) has created a solution to a problem. So, if the same error or problem is seen numerous times, the product evolution module 1245 can automatically alert other users to the solution. Alternatively or in addition, the product evolution module 1245 can automatically open a support ticket on behalf of customers, with the backend service provider, e.g., Kony® by Kony, Inc., providing a fix to the problem, taking it to the internal story so that the product evolution module 1245 knows that this fix goes to particular clients that had the particular problem.

In embodiments, the product evolution module 1245 (as with any of the components or modules described herein) can be a social listener, essentially data-mining a particular operating system (OS) that may have a deprecating a function (or to find other problems and solutions in the Ethernet that were encountered by a particular type of client). In this case, the product evolution module 1245 might trigger a different way of performing a task by the user, e.g., developer, or it may necessitate a platform change by a third party service provider, e.g., Kony® by Kony, Inc., making sure that the developer can rebuild using an alternative process or when a product feature may need updating within the application platform.

Intelligent Mobile Application Development

Platform and Related Processes

Figure 2A:
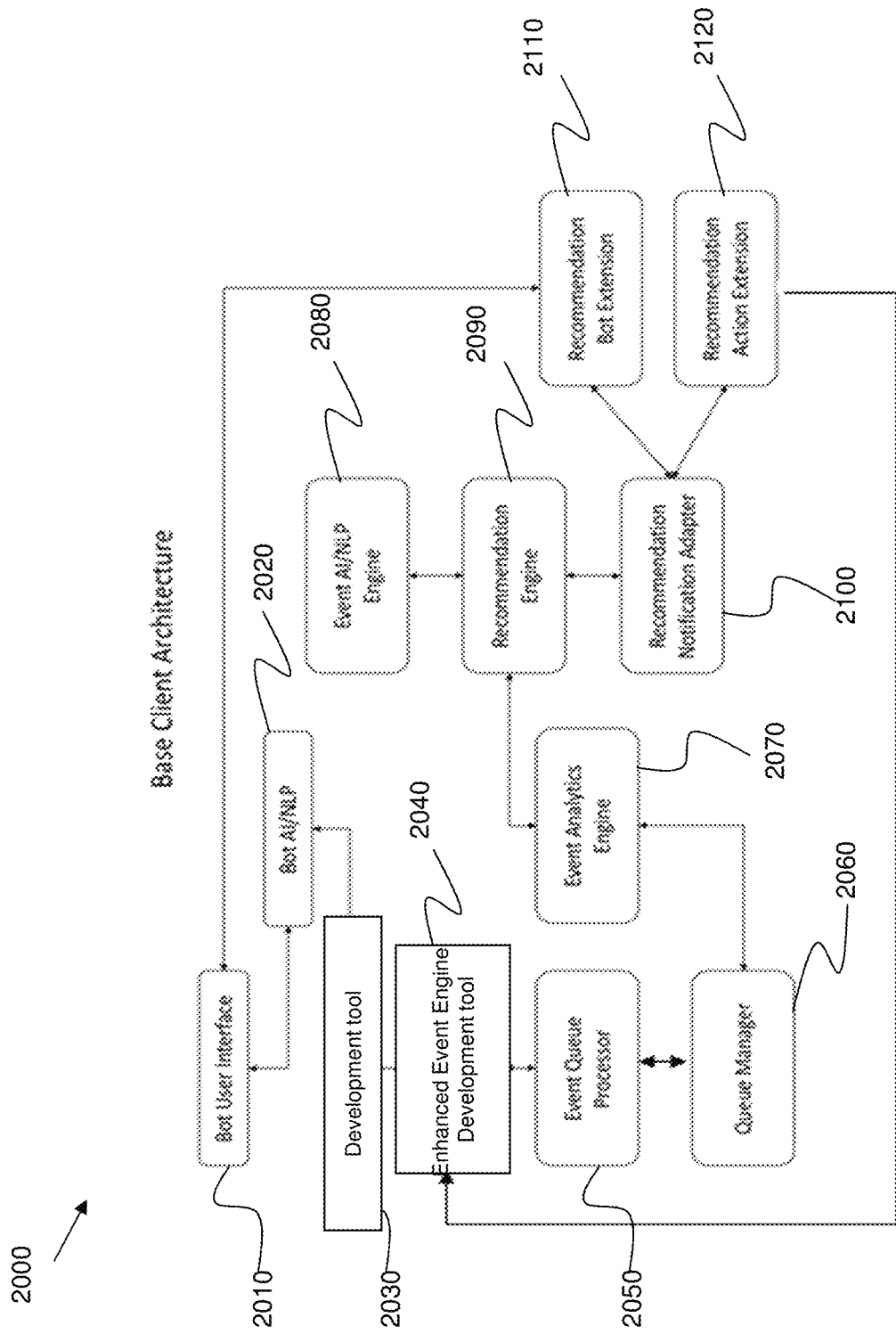
FIG. 2A depicts a computing architecture in accordance with aspects of the present disclosure.

FIG. 2A illustrates a computing architecture 2000 for the IDXDP and related processes implemented in the illustrative environment 1000 of FIG. 1A. In embodiments, the IDXDP and related processes are utilized within an Interactive Development Environment (IDE) as a user develops a digital application. That is, the IDXDP lives within a context stream of IDE interactions, i.e., actions by the user within the IDE to develop the digital application. In this way, the intelligent digital application development platform can determine what interactions are occurring between the user and the IDE in order to assist a user in completing the developer's objectives in an efficient manner, i.e., by implementing the different modules, components, sub-systems and related functionality described herein.

For example, in embodiments, the IDXDP and related processes are able to determine what is being built or structured by the user, e.g., object components, field values, and other metadata, and use this information to provide recommendations or other assistance. After determining the user actions, the IDXDP and related processes is able to derive an intent of the user from the user actions. By considering the intent of the user, the IDXDP and related processes are able to provide recommendations and/or actions to the user that matches the intent of the user, amongst other functionality as described herein. These recommendations can be, e.g., best practices, building tutorials, event processing, implementing the functionality of an autonomous advisor, building and/or recommending different templates, etc.

Various techniques, e.g., AI, NLP and machine learning, amongst others, are implemented by the IDXDP and related processes to provide the features described herein. This may include, e.g., match the extrapolated user actions with user intents and then provide the related recommendations or other functionality as requested by the user or anticipated by the systems and methods described herein. For example, by gathering the actions and intents of the user and matching them together, the IDXDP and related processes are able to make key recommendations on the likelihood that a similar object or component already exists and, using the existing object, etc., make suggestions to the user. This allows a user to create a digital application in an accurate and efficient manner by providing outcomes directly within the IDE during the development of the digital application to the user based on the user's intent.

In further embodiments, the intelligent digital application development platform can represent objects, components or actions by implementing a granular event process. In embodiments, this granular event process represents user actions, object component settings, field values and other metadata, which tell a story of what a user is implementing and trying to achieve within the IDE. More specifically, the granularity provided by the granular event process comprises an event-oriented representation, i.e., the representation of user actions performed within the IDE, and the accompanying syntax associated with the user actions. In this way, a full fidelity and accurate depiction of a widget, service or other software component is captured directly from the actions of the user.

Also, the IDXDP serves as a content feed for AI, machine learning and analytics based engines to determine how developers and other users are constructing components, and ultimately digital applications. More specifically, the AI and machine learning algorithms of these various engines are able to determine insight into user actions, such as programming techniques, to determine improvements in design, development practices and techniques, amongst other areas. The IDXDP also provides an evolution of a particular object from the collection of events and any physical user interactions, e.g., dragging and dropping carried out by a user, that are applied to the object. This results in a logical object of its own, e.g., like an authentication user name field, which evolves from the collected information.

In embodiments, the computing architecture 2000 can determine an intent of a user by capturing user actions, e.g., colorization of an object, and/or other events, e.g., physical interactions with the IDE, at a relatively high level during the development of a digital application. The capture of these events allows for key recommendations or other functionality described herein, e.g., advising of certain actions, tutorials, upselling, determining development issues (e.g., dead ending, etc.), standardizing code, etc. to be provided to and received by the user in response to these events within the IDE itself, allowing the user to see the recommendations and implement them immediately.

Referring still to FIG. 2A, the computing architecture 2000 includes a bot user interface 2010, which correlates with the interactive advisor 1205 of FIG. 1C. The bot user interface 2010 can be a visual interface that lives within the context of the IDE and provides recommendations, answers, actions, or other information desirable to the user. For example, if a user is utilizing a particular IDE on a laptop, and the IDE is being viewed as a full-screen on the laptop, the bot user interface 2010 is configured to be movable outside of the IDE. Alternatively, the bot user interface 2010 can be independent of the IDE. For example, if the IDE is being utilized as a full screen on one monitor and the user is also using an auxiliary monitor, the bot user interface 2010 can be presented on the auxiliary monitor outside of the context of the IDE. In this way, the bot user interface 2010 is configurable to the computing real estate available to the user.

The bot user interface 2010 interacts with a bot AI/NLP 2020. In embodiments, the bot AI/NLP 2020 comprises AI and NLP engines configured to determine insight into programming techniques of users for the improvement of design and development practices and techniques. The AI and NLP can be used in any of the modules or components described herein in order to provide the related functionality as described in the respective sections of this disclosure. In embodiments, the AI and NLP processing engines of the bot AI/NLP 2020 are seeded by specific utterances and intents of the user. For example, a user can utter "show me authentication forms in marketplace," which results in a pop-up window displaying a web browser, with the web browser directed to a market place, e.g., Kony Marketplace™ by Kony, Inc. In further embodiments, the web browser shows a specific filter of authentication routines within the marketplace. The results will be fetched via integration API's and shown in a visualizer tool (e.g., Kony Visualizer® by Kony Inc.) or other development tool. In embodiments, direction to a market place should not occur until the point of download.

A development tool (e.g., Kony Visualizer® by Kony, Inc.) 2030 within the IDE provides a means and apparatus to create assets such as forms, labels on forms, browser widgets and other widgets within forms, amongst other examples, for the development of digital applications. In embodiments, the development tool 2030 can be any development tool within or outside of the IDE, as a non-limiting example. Accordingly, hereinafter the development tool 2030 should be understood to be used in terms of any generic development tool, with a preference for the Kony Visualizer® tool being implemented in the environments described herein.

The development tool 2030 can be used by a citizen developer (e.g., a salesperson), a developer with a highly specialized background (e.g., a program manager of an enterprise), a designer or other user. Accordingly, the IDXDP and related processes can accommodate and accumulate information on a variety of backgrounds and abilities. As the user is performing different actions, i.e., events, in the development tool 2030, these actions are tracked and evidence of these actions is collected by the development tool 2030 and its related components, in addition to, in embodiments, the AI for analysis and implementing of the desired functionalities of the different modules (e.g., modules of FIG. 1C or other components or systems described herein). Specifically, as the user performs actions within the IDE, assets, e.g., design elements such as a login form, are playing back onto the IDE and rendering themselves out. This is referred to as a granular event process.

In embodiments, any action taken by the user within the IDE can result in creation of a fully described widget action (or other asset) having format syntax and context. It is this syntax and context that is collected and analyzed by the IDXDP and related processes. As a non-limiting example, as a user drags and drops a widget (or other asset) into a form within the development tool 2030, the state of this action is collected so that a determination can be made of how a specific object is being built. In this way, the IDE is extended by development tool 2030 in such a way that the IDXDP and related processes is able to tap into the event stream within the IDE, learn from this event stream and provide recommendations based on this event stream. Therefore, the IDXDP utilizes assets as a means for learning about the assets.

In particular embodiments, the IDXDP collects and processes user actions as events, which further represent the construction of a logical object. In embodiments, the construction of objects comprises various actions and/or various levels. As a non-limiting example, the object can be created by a user dragging and dropping a particular widget into an IDE through the development tool 2030, or a user clicking onto a text box to add text within the object. In embodiments, the user may further refine that particular text object or text box in many ways. For example, the user may change a foreground color or a background color or a font used for any text within that box or change the style of the text, e.g., boldness, italicization etc. By collecting and processing these and other user actions, over time, the IDXDP can determine what a user's intent is and how the user is building that particular object. This information can also be used as seed information of the AI, provided to and by the different bots, AI or other modules or tools to provide the functionality described herein.

Depending on the textual content of the object, some degree of assertions can be made about what that particular object will do and what it will be used for. As a non-limiting example, if the object is a text box, and the text box is pre-initialized with a term, e.g., a username, then the IDXDP knows that the form is affiliated with authentication. In this way, the IDXDP considers all actions done by the user. Acquiring the context via an event system and general scan of the visualizer state is an objective of the IQ event system. The context could come not necessarily from the widgets but also from what is named a particular form or module as within the visualizer. Therefore, assumptions can be made and further recommendations can be made based on these assumptions. A further example would be that of anticipating the resizing of an object such that it matches the symmetry of pre-existing objects. In this example, when a user begins to resize an object, the object then snaps to a virtual grid line. This grid line would be either horizontally or vertically oriented as determined by the AI subsystem.

Still referring to FIG. 2A, the development tool 2030 can include multiple sub-systems, each of which cooperate in a coordinated fashion to perform specific tasks in collecting and processing the user's actions. The sub-systems include the enhanced event engine 2040, the event queue processor 2050 and the queue manager 2060. These various sub-systems can also be stand-alone systems or integrated systems or combinations thereof within the IDXDP, any of which combination will communicate with one another through events. Specifically, one sub-system raises an event to which the other sub-systems subscribe, i.e., triggered when the event is fired, and react according to the needs of the development tool 2030. In embodiments, the development tool 2030 is a subscriber to all the events raised by various sub-systems, modules, processes and tools described herein.

In embodiments, the enhanced event engine 2040 collects evidence of the user's actions, while the event queue processor 2050 receives the collected evidence from the enhanced event engine 2040. In embodiments, as the user performs various actions in the development tool 2030, e.g., adding a text box, the enhanced event engine 2040 collects evidence of these actions and places this information within a queue of the event queue processor 2050. Specifically, all events, i.e., user actions in the development tool 2030, are queued asynchronously into the queue of the event queue processor 2050. In embodiments, the enhanced event engine 2040 includes logic to perform the actions described herein. For example, the enhanced event engine 2040 may include natural logic, e.g., NLP, to determine that a user has entered text within the development tool 2030 and to collect this action.

The event queue manager, i.e., queue manager 2060, pops out each event from the queue of the event queue processor 2050, and processes those events into structured objects. As should be understood by those of skill in the art, an event can be any creation of an asset, e.g., object, template, widget, etc. In embodiments, the queue manager 2060 collects the information, i.e., evidence of user actions, in a style such as JavaScript object notation (JSON) format. These structured objects can then be used to comparison, matching and recommendations, in addition to the actually seed for learning by the AI.

The queue manager 2060 will take the collected evidence out of the queue and provide it to the event analytics engine 2070 for further processing. In this way, each user action performed within the bot user interface 2010 and/or the development tool 2030 essentially results in the enhanced event engine 2040 interpreting the user action, storing collected information regarding the user action in a queue of the event queue processor 2050, removing and processing the collected information by the queue manager 2060, evaluating the processed information through the event analytics engine 2070 and the event AI/NLP engine 2080, and then providing a recommendation or other functionality provided herein, which can be implemented in the modules of FIG. 1C or the other components described below.

The information collected from the evidence includes, e.g.:

1) user actions to create, rename, delete forms, skins, widgets or other assets, etc.;
2) corresponding actions/events raised by various sub-systems described herein;
3) captured information like the name of the form, skin, specific user activity, channel that the user is building the application for;
4) additional contextual information about the application, e.g., app name and domain, for example; and
5) JavaScript source code changes.

With this information, a widget, an object, or other asset, e.g., a slider, a control, a label, a flex form or a browser widget, amongst other examples, has a complete representation that is not ambiguous. More particularly, the IDXDP provides a clear representation in a non-ambiguous form in a specific style, e.g., JSON. In this way, a software syntactical definition of a logical object such as a component or widget, is provided, which can then be used to provide the different features described herein such as providing recommendations of best practices, tutorials, standardizing code, etc., or other functionality described herein. In embodiments, a widget, object services or other asset can be described as name values or value pairs, for example, in JSON.

Further, the information collected can have metadata associated therewith, which can be used for additional purposes such as date information, identification information, etc. In embodiments, the metadata can be editable, can be logical or can be immutable, amongst other examples. In embodiments, the ancillary metadata can be used as an executable component to recreate a particular object by analyzing the metadata. For example, by knowing the user intent as determined by the AI and/or bots described herein, the IDXDP can understand the goal of the user and use this information to implement the functionality of the different modules, components and subsystems described herein. For example, by analyzing the metadata, an object can be constructed and/or reconstructed in line with the user's intent, thereby allowing the IDE to act as a visual renderer, a teacher at the same time, by playing back the construction/reconstruction of the object and, if needed, providing an appropriate recommendation.

The metadata can also be used to create a profile of the component or collection of services and components, etc. that makes the object easier to interpret through AI techniques and other machine learning techniques. For example, the metadata surrounding the object may be embedded with a message conveying information about the object. Accordingly, the systems and processes described herein allow for a method for interpreting the component data and associated metadata to allow processing within an AI and machine learning layer.

As another example, the metadata around a particular object may be encoded with a message for another user, with the message being conveyed to the other user as a real-time rendering of the object occurs within the IDE. As another example, the metadata may be provided by an individual(s) that created the object. In the scenario that multiple individuals contributed to creating the object, the IDXDP provides the ability to rate those component editorial metadata collections in the case where one might be clearly a five-star, while another one might be a four star and two of them might be three stars, etc. In further embodiments, the various ratings can be filtered, depending on the user's needs. Accordingly, the processes described herein can provide a format and an extensibility syntax, which will allow the functional component or object to be extended by related or supportive metadata.

In embodiments, the processed information is stored in a database, e.g., non structured query language (NoSQL) database, and provided to the event analytics engine 2070 for analysis and further use in accordance with the many aspects of the present disclosure. In embodiments, the database can be the storage system 1022B shown in FIG. 1A.

The event analytics engine 2070 is responsible for analyzing the above information to determine whether there are other steps to perform, if any, and the outcomes, which match the actions of the user. In embodiments, the event analytics engine 2070 is organic to the types of events that are being generated through the IDE. Particularly, the event analytics engine 2070 makes sense of the events that are flowing through the IDE by analyzing the processed information. For example, the event analytics engine 2070 can analyze the information to determine whether the user is not providing standard code, not practicing best practices, dead-ending, etc., in order to thus provide certain recommendations.

In conjunction with the event analytics engine 2070, the event AI/NLP engine 2080 determines what types of actions were undertaken by the user in order to determine an appropriate recommendation, e.g., action to be taken by the user or an answer that a user desires, amongst other examples. These recommendations can be coding recommendations, design recommendations, etc., as described herein. In embodiments, the event AI/NLP engine 2080 comprises AI, machine learning and NLP engines configured to determine the intent of the user. The event analytics engine 2070 and the event AI/NLP engine 2080 can be referred to as the brains of the computing architecture 2000, in addition to the overall brain of the IDXDP. If desired, further "brains" can also be chained to the event analytics engine 2070 and/or the event AI/NLP engine 2080. For example, an additional brain (AI) can be chained in which the additional brain only serves to notify when a particular build is available. As another example, a security module (AI) can be chained that informs the user of particular security paradigms as they build their application, or coupling in paid licenses for other system tool kits (STKs) or software development kits (SDKs) that keep the end application secure.

In embodiments, the AI/NLP engine 2080 can be used as a content feed of events for AI, machine learning and analytics based engines for determining how developers and other users are constructing components, and ultimately digital applications. Specifically, the AI and machine learning algorithms are able to determine insight into programming techniques to determine how to improve design and development practices and techniques. This can then be used to learn best practices or most efficient means of performing a certain action, and to subsequently provide recommendations to the user based on their intent.

By way of a more specific example, the event analytics engine 2070 and event AI/NLP engine 2080 can determine whether a certain action taken by the user is a preferred action (e.g., most efficient way of performing an action) and, if not, provide recommendations of different actions to be taken which may be more preferred, e.g., placement or look of a widget, etc., as taken by another user tasks with a similar issue. As a non-limiting example, if a slider widget is selected by the user, the event analytics engine 2070 and the event AI/NLP engine 2080 know that this widget is a slider because of the syntax of the object. As another example, if a user clicks on a slider widget, the event analytics engine 2070 together with the event AI/NLP engine 2080 can determine that a slider widget was clicked. These different user actions can then be analyzed by the event analytics engine 2070 and event AI/NLP engine 2080 to determine whether such actions match with approved and/or standard actions, and whether any recommendations are required to provide insight (tutorials) and/or assistance (recommendations) to the user.

In embodiments, the AI engine of the event AI/NLP engine 2080 can match user actions with intents, while the NLP engine matches phrases and utterances with the intents of the user. For example, the AI engine recognizes that the user is implementing a textbox pre-initialized with a "username," while the NLP engine recognizes the utterances of the user asking for authentication routines. The event AI/NLP engine 2080 will make a determination that the user is attempting to create a security related objected based on the recognitions of the AI engine and the NLP engine. In this way, the event AI/NLP engine 2080 provides a step-by-step analysis of what a user, such as a developer, is doing within the IDE by considering and understanding all of the actions performed by the user.

In still further embodiments, the recommendation may be from other sources (e.g., users) obtained from or learned by the event AI/NLP engine 2080. More specifically, the event analytics engine 2070 and event AI/NLP engine 2080 are configured to receive and analyze "big data," i.e., data from any and/or all users of the IDE, including users within and outside of an enterprise. In this way, the IDXDP can provide recommendations not only based on the actions of a single user, but also recommendations based on the actions of many users or a community of users. For example, the recommendations may have been performed by other community members and may have been determined to be best practices in the industry. Accordingly, the event analytics engine 2070 and the event AI/NLP engine 2080 can obtain and analyze a global or local community of data.

In further embodiments, the computing architecture 2000 can include a dispatcher, i.e., a bot director, which can manage the journey of the analytics all the way from the bot user interface 2010, through a chainable infrastructure, or a chainable architecture comprising a particular chain of brains, resulting in a certain output, i.e., recommendation. In embodiments, any of the brains of the IDXDP and related processes can be relatively simple, can be relatively complex, and can be reordered in their processing order so that certain brains may tend to return a value closer to a top of the stack of values that a user may be interpreting or receiving in the bot user interface 2010.

As shown in FIG. 2A, a recommendation engine 2090 filters all the way through to the queue architecture, i.e., the event queue processor 2050 and the queue manager 2060, and all the way back to the bot user interface 2010, to provide a recommendation, answer or other information to the user. The recommendation aides the user in their digital application development by providing the functionality described herein. As a non-limiting example, if the event analytics engine 2070 and/or the event AI/NLP engine 2080 find redundancies in the digital application development, the recommendation engine 2090 can provide a recommendation for a pre-existing instance of an object and/or outcome which matches the intent of the user, and directly to a point where the object should be inserted. In this way, the user is able to directly implement the recommendation within the IDE.

As another example, if a user is at a third step of a process, the recommendation engine 2090 can provide recommendations which match the remaining steps the user intended to pursue and/or the outcome the user intended and, in embodiments, inject the remaining steps directed into the development tool. For example, the recommendation engine 2090 can make recommendations, such as the remaining steps in a process of constructing an object, which were compared and matched from other forms based on a historical perspective of previous user actions or as found within a community of users (e.g., as searched through blogs or other development tools, databases storing digital application information, etc., for example). Specifically, the steps and/outcome may already be in the user's workspace or a shared team workspace within an enterprise, a marketplace full of items, or a couple of instances across the Internet that exist, amongst other examples. In addition, the recommendation engine 2090 may provide the user with recommendations they were not aware of.

The event analytics engine 2070 and/or the event AI/NLP engine 2080 also provide information concerning the user to the recommendation engine 2090, for determining the appropriate recommendation. As a non-limiting example, the recommendation can be highly technical if the user is a developer. For example, if the event analytics engine 2070 and/or the event AI/NLP engine 2080 determines that the objects in the development tool 2030 are in a horizontal and a vertical orientation, a determination is made that the user is trying to create a calculator. Since the user is a developer, the recommendation engine 2090 can recommend a technical object like a padding manager, which provides equal spacing and padding management to the widgets already laid out in the development tool 2030. The padding manager recommendation would be understood by the user, since the user has an extensive background in application development. Other recommendations include refactoring code, or defect tracking, for example. In this way, the recommendations provided by the recommendation engine 2090 can be wide, broad and deep, or can be specific and narrow, specifically tailored to the user and the user's needs.

A recommendation notification adapter 2100 is configured to gauge how a particular recommendation should be serviced, i.e., provided to the user so that the user is given the best opportunity to understand the recommendation (whether to provide a script or a speech response detailing the instructions within the script). Specifically, the recommendation notification adapter 2100 can coordinate with the event AI/NLP engine 2080 to determine in what order a particular recommendation is displayed or how the recommendation is weighted.

In embodiments, a confidence level for the recommendation is calculated and used to determine if the recommendation should be presented to a user. The confidence level can be calculated by considering various parameters along with weighting the parameters. Examples of parameters include hierarchy of flexes, orientation of widgets, method names, skins with images, and data of the widgets, amongst other examples. Further, different widgets can have different thresholds, which are also taken into consideration. As a non-limiting example, basic widgets within container widgets need siblings to attain a threshold. All of these parameters can be considered in determining the confidence level.

For an identified pattern to be shown as a recommendation by the recommendation engine 2090, the recommendation can stream through a number of various filters, namely hierarchical, visual, textual and domain related. The confidence of a particular recommendation can be calculated by the following formula shown in equation (1) using the recommendation notification adapter 2100:

$$\text{Total Confidence} = 1 - (a^*H_D + b^*V_D + c^*T_D) \qquad (1)$$

where $H_D$=hierarchical difference between target and source, $V_D$=visual difference between target and source, $T_D$=textual difference between target and source, and a, b, c are the weightings given for each difference. In embodiments, a measurement of total confidence is the measurement that is attained once all the differences are eliminated from a hypothetical exact match. For example, when the hierarchical differences, the visual differences and the textual differences are all equal to zero, the total confidence will be 1, i.e., 100%. When the total confidence level of a specific pattern overcomes a predetermined confidence threshold, that pattern can be considered as a recommendation and ranked on its confidence level.

The difference in each filter is calculated only when certain criteria are met with precedent calculations, i.e., in calculating the visual difference $V_D$ there should a certain hierarchical difference $H_D$. Specifically, the hierarchical difference $H_D$ should be less than a provided threshold $H_T$, because having a relatively large hierarchical difference can render calculating the visual difference moot. Therefore, the difference considerations should be performed as shown in equation (2).

$$\text{Hierarchical}(H_D < H_T) \rightarrow \text{Visual}(V_D < V_T) \rightarrow \text{Textual} \qquad (2)$$

where $H_T$=hierarchical threshold and $V_T$=visual threshold.

Calculating the hierarchical difference is shown in equation (3).

$$H_D = \frac{\text{len}(\text{Matched}_{pattern})}{\max((\text{len}(\text{Source}_{pattern}), \text{len}(\text{Target}_{pattern}))} \qquad (3)$$

Specifically, equation (3) provides the percent of a pattern that is matched, and will be carried forwards to calculate the visual difference if $H_D < H_T$.

Calculating the visual difference is shown in equation (4).

$$V_D = \frac{\sum_{i=0}^{N} X_i}{2*(N-1)} \qquad (4)$$

where $X_i$=visual difference of each widget and N=number of widgets in the identified pattern. When calculating the visual difference for each widget, if two widgets are of a same type, then a difference is taken between their properties. If a property is the same for both widgets, then there is no visual difference between the widgets. However, if there is a difference in their properties, then the predetermined weighting is added to the visual difference of that widget and continued for the rest of the properties. In this way, a visual difference is calculated for each widget present in the identified pattern and the visual difference $V_D$ for the complete pattern is calculated.

In calculating the textual difference $T_D$, each widget tree can be represented as a list of all the words present in text, placeholder, etc., properties. In embodiments, this list can be referred to as a sentence. In calculating the similarity between two words, it is assumed that each word is represented by a vector of some fixed length. This fixed length may result in a problem of finding a metric of difference between two clusters of points in an n-dimensional space, where each cluster is a sentence and each point is the vector representation of the word in the sentence. Therefore, multiple approaches can be undertaken. In the first approach, the closest point difference is calculated. For this approach, each point in the first cluster is iterated over, while the closest point in a second cluster is found. In embodiments, a Euclidean distance between these two points is taken to find the textual difference $T_D$. The point from the second cluster is removed and the process is repeated if need be. Under this first approach, some edge cases may need to be given more thought, like when the clusters have a different number of points and some of the points are outside a boundary of the cluster.

For the second approach in calculating $T_D$, a mean point of each cluster is calculated, and the difference between the mean points of each cluster equals the textual difference $T_D$. The difference between the mean points of each cluster can be a Euclidean distance or a cosine similarity, amongst other examples. In the case of marketplace recommendations, another parameter called domain is considered. In embodiments, domain filtering is taken prior to hierarchical or visual filtering.

Referring to equation (1), after calculating the respective differences, i.e., hierarchical, visual and textual, all of the differences are accumulated by multiplying each difference with their respective weightings. This value is then subtracted from "1" to get a total confidence of the identified pattern. In the situation where a pattern does not meet a confidence threshold, that pattern is not provided as a recommendation and is taken out from the recommendations queue of the recommendation engine 2090. In this scenario, the recommendation engine 2090 can generate a new recommendation, which will then go through the confidence level process just described. The new recommendation can be based on the actions of the user, which were used for the original recommendation, or other actions, such as subsequent user actions after the recommendation did not pass the threshold. The recommendation can also be an extrapolation of the user's current action, or a request that the user take a further action, different than the current action being taken.

The recommendation bot extension 2110 and the recommendation action extension 2120 are configured to operate with the bot user interface 2010, providing the user with a tailored experience. In embodiments, the recommendation bot extension 2110 is configured to provide the user with recommendations in verbal, textual or audio formats. The recommendations of the recommendation bot extension 2110 are offered to the user through a digital user interface, either through the bot user interface 2010 or spoken word using a speech technology, for example.

In embodiments, the recommendation action extension 2110 is configured to complete an action on-screen. More specifically, the recommendation action extension 2110 not only provides textual output back to the bot user interface 2010, but is also configured to be able to either populate a form of a widget or some other real tangible action. In this way, rather than simply conveying something back in written form to the user, the recommendation action extension 2110 takes a recommendation from the recommendation engine 2090 and can actually fulfill it. In this way, the recommendation action extension 2110 can provide a particular recommended action on-screen and within the project a user is currently developing, or can fulfill the action while the user is developing their digital application.

In embodiments, for a natural language component, such as if a user asks a question through the bot user interface 2010, the question goes to the AI/NLP layer and comes back through the recommendation engine 2090 by being routed through either the recommendation bot extension 2110 or the recommendation action extension 2120. For example, an utterance by the user of "can you show me authentication forms in marketplace?" would return a result to a marketplace with a specific search filter for authentication routines. As a further example, a user could type into the bot user interface 2010 "show me some of the forms that exist in my workspace." The bot AI/NLP 2020 then takes a look and searches through a user's own workspace to find a basic similarity between what the user is currently doing and what it has done in the past. Alternatively, the bot AI/NLP 2020 can search marketplaces on the Internet, intranet or other extranet (e.g., the cloud computing nodes 1110 shown in FIG. 1B), looking at forms and widgets and fully formed applications that are similar to what a user is producing and suggest incorporation of prewritten forms into the user's own digital application.

In embodiments, the user can opt out of the IDXDP at any point. By opting out, the IDXDP and related processes will not track and collect information concerning the user's actions within the development tool 2030. Further, the user will not receive any recommendations. If a user does opt out, the IDXDP can encourage a user to opt in by providing detailed information on how others are benefiting from the IDXDP. For example, the IDXDP provides a story to the user of how other user within the enterprise are benefiting from the features of the IDXDP.

Figure 2B:
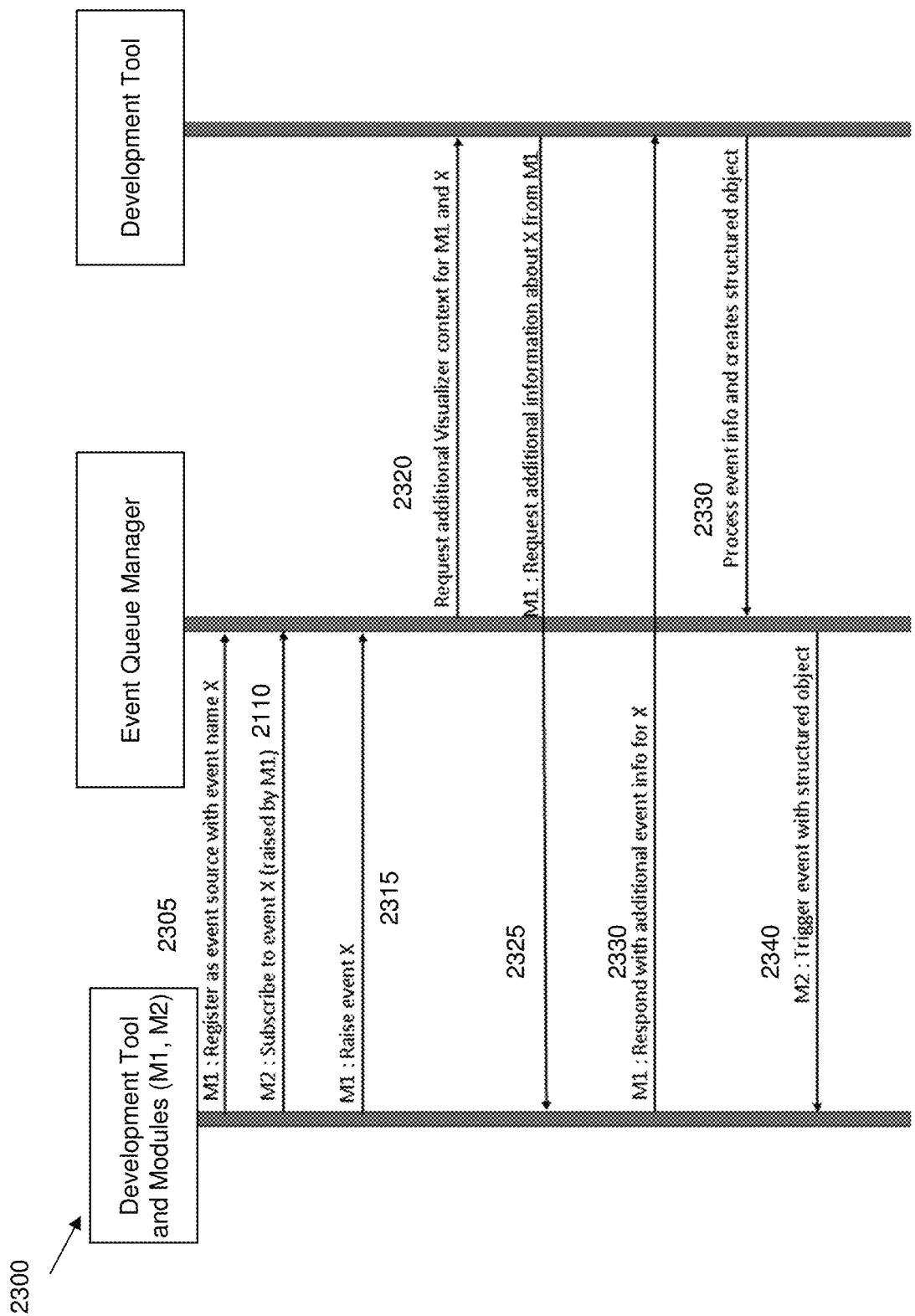
FIG. 2B depicts a swim lane diagram for implementing the steps associated with the intelligent application in accordance with aspects of the present disclosure.

FIG. 2B illustrates a swim diagram 2300 with the following actors: the development tool (including modules M1 and M2) 2030, enhanced event engine development tool 2040, event queue processor 2050, and queue manager 2060 from FIG. 2A. As the user performs actions in the development tool 2030, the actions are collected and the information provided by the actions are then utilized to determine an intent and provide a recommendation to the user based on the intent. For example, at step 2305, the first module M1 of the development tool 2030 registers an event X, i.e., user action, with an event name. At step 2310, the second module M2 of the development tool 2030 subscribes to the event X, i.e., is triggered when the event X is fired, that is raised by the first module M1, i.e., fired. At step 2315, the first module M1 will then raise the event X to a visualizer event queue manager, i.e., the queue manager 2060. At step 2320, the visualizer event queue manager requests additional context for the first module M1 and the event X. At step 2325, the development tool 2030 will respond with the additional information about the event X that is requested from the first module M1. At step 2335, the development tool 2030 will process the event information and create a structured object. At step 2340, the second module M2 will trigger the event X with the structured object.

Event Processing System and Method

The event processing system and method is a system and method capable of utilization within an IDE as a user develops a digital application. In embodiments, the event processing allows for datamining in order to determine if a similar object or component or other asset as defined herein already exists, which can then be used to provide recommendations, etc. Specifically, the systems and processes described herein allow for processing an event queue of the event queue processor 2050 shown in FIG. 2A.

In embodiments, the event queue is comprised of IDE user actions with the ability to construct an object or service from that data within that event queue. In this way, the event queue can drive recommendations to developers, designers, and all other users using the IDXDP as described herein. In embodiments, the recommendations can take the form of textual content, spoken content or even actions, e.g., running an authentication script.

In further embodiments, natural language narrations are dynamically formed and rendered to the user to create a depth of understanding related to the composition and capabilities of a component or object or other asset type described herein. In still further embodiments, the machine learning component continuously optimizes designs of assets and offers the latest embodiment to the user. In this way, the IDXDP can provide current recommendations applicable for the user now with respect to developing a digital application.

The systems and processes described herein continuously monitor the complexity of a code used in the construction of an object or other asset type to determine if the code is becoming too complex, i.e., having code snippets which are unnecessary to create a particular outcome. In embodiments, if a determination is made that the code is too complex, the AI of the IDXDP can suggest how to optimize the code in order to reduce complexity, i.e., providing a code snippet that allows the user to achieve the desired outcome.

The systems and processes also continuously monitor the code for best practices or coding standards. In embodiments, for example, if the user does not follow a best practice, the system is configured to use a chat interface or an audio interface, amongst other examples, to inform the user that they are not following the best practice. The best practice can be determined from industry practices or an enterprise team of developers, amongst other examples. In further embodiments, the system, using code optimization intelligence built therein, i.e., machine learning logic, can provide suggestions to the user for correcting the code in order to maintain best practices. In further embodiments, the systems and processes can develop a common coding style based on monitoring the practices of team members or other community of users. The systems and processes can use this and other information to suggest ways for the team to standardize their coding in order to make the code more maintainable. For example, the system can establish a best practice based on feedback from the team or other user community.

Additionally, the systems and methods can store common coding styles across all developers (or other users) to suggest best practices on an enterprise level, as well as within a sub-group within the enterprise. In addition, the systems and processes described herein can suggest a component in a marketplace that may be a good fit, i.e., allows the user to achieve their desired outcome, for a component the user is developing. In embodiments, the suggestion can be based on analyzing the object or visual component names being used by the developer or other user, and by inspecting the behaviors of the user who created the component, amongst other examples.

Figure 3A:
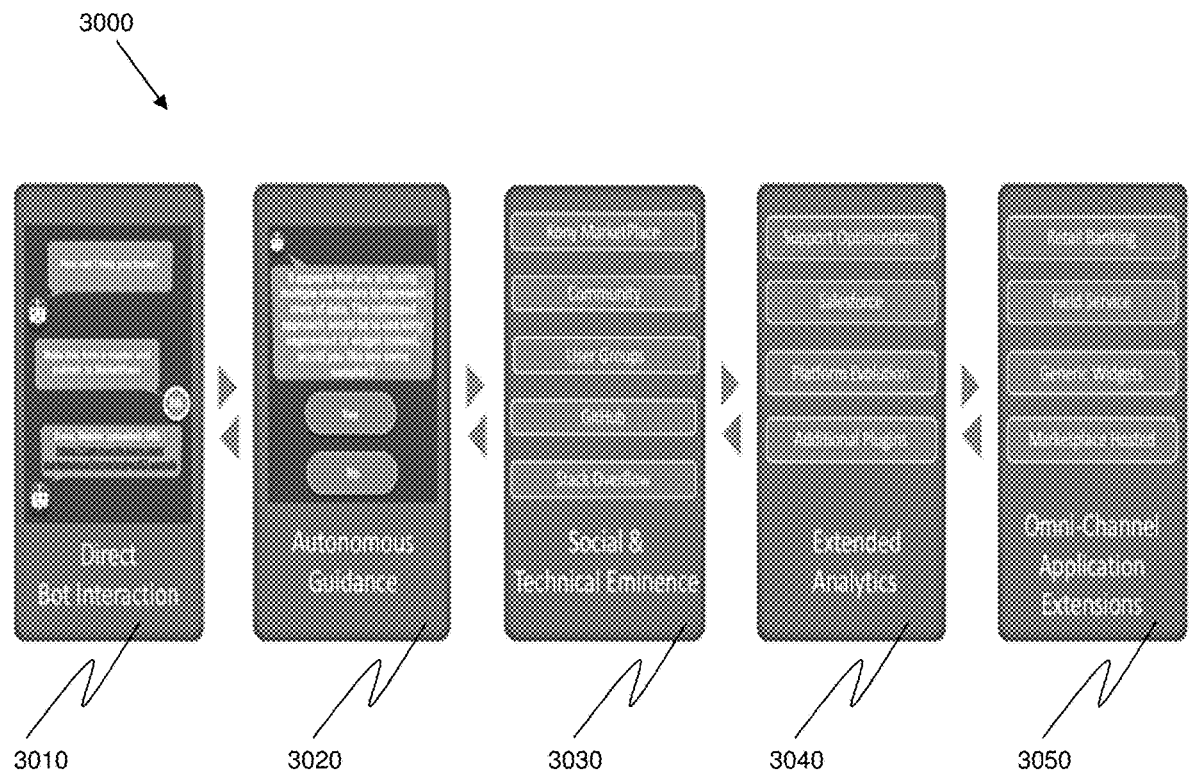
FIG. 3A illustrates several screen shots showing capabilities provided by an event queue processor in accordance with aspects of the present disclosure.

FIG. 3A illustrates several screen shots 3000 showing the capabilities provided by the event queue of the event queue processor 2050 in accordance with aspects of the present disclosure. During the development of a digital application within an IDE, for example, a user can utilize a direct bot interaction interface 3010 capability of the bot user interface 2010 of the interactive advisor module 1205 as shown in FIG. 2A. In embodiments, the user can type questions, comments or requests into the user interface and expect a reply, e.g., a pop-up window taking a user to a marketplace, as shown in FIG. 3A. As a non-limiting example, the user may type into the direct bot interaction interface 3010 "make this form a master." The interactive advisor module 1205 of FIG. 1C is configured to respond to this request, through the direct bot interaction interface 3010, by responding that the request is done. For example, the direct bot interaction interface 3010 may respond with a uniform resource locator (URL) where the master is located, e.g., a marketplace. This form can also imported into the user's library or distributed within the enterprise, amongst other examples.

Alternatively, a user may forego directly typing into the direct bot interaction interface 3010 and may utilize the autonomous guidance interface 3020 capability of the bot user interface 2010. The autonomous guidance interface 3020 capability of the bot user interface 2010 may be implemented with the autonomous advisor module 1210 shown in FIG. 1C.

In using the autonomous guidance interface 3020 capability of the bot user interface 2010, a user may be constructing an object in the IDE through the development tool 2030, while the autonomous advisor module 1210 functions in the background. The autonomous guidance interface 3020 has the capability of providing recommendations to the user based on the actions undertaken by the user during the development of the digital application. As a non-limiting example, the autonomous guidance interface 3020 may provide a pop-up communication box in the IDE, informing the user that what they are constructing a component similar to another component previously constructed.

The autonomous guidance interface 3020 can query the user, e.g., ask if the user desires to explore this previously constructed component, and provides the ability for the user to answer as "yes" or "no" as shown in FIG. 3A. In this way, the autonomous guidance interface 3020 can save a user a substantial amount of time, by providing an object or recommendation desired by the user, in addition to providing these options without an explicit request that needs to be generated by the user through the bot user interface 2010. Further, the autonomous guidance interface 3020 allows a user to explore the suggested component without having the component automatically implemented within the IDE.

Still referring to FIG. 3A, the social and technical eminence interface 3030 can invoke the technical eminence module 1225 of FIG. 1C. More specifically, the social and technical eminence interface 3030, for example, allows an enterprise, a team, or other user, to share assets. For example, the technical eminence interface 3030 allows users to interact in a marketplace, e.g., the Kony Marketplace™, amongst other examples. Alternatively, users may interact with one another through a community, e.g., a developer community, or user groups. In addition, users may share assets at specific locations, such as a web-based hosting service, e.g., GitHub, or websites which offer developer tips, e.g., Stack Overflow.

The extended analytics interface 3040 helps eliminate issues and create opportunities for an enterprise during the digital application development. For example, the extended analytics interface 3040 provides support optimization by helping to eliminate trouble tickets using the product evolution module 1245 of FIG. 1C. Specifically, a user can be provided with an answer to a problem they have encountered, or may encounter based on their actions. For example, a user may encounter a problem concerning the colorization of a widget. The product evolution module 1245 of FIG. 1C would recognize the problem and provide a solution for coloring the widget through the extended analytics interface 3040. In embodiments, the solution may be obtained from a database within the enterprise, or a community of users, amongst other examples. In this way, the user is provided with a solution before the need to create a trouble ticket and can continue developing their digital application.

The extended analytics interface 3040 also provides a benefit of third party integration capabilities, e.g., salesforce integration, by listening/searching entire enterprises and determining the breadth with which an enterprise is utilizing the IDXDP. For example, the extended analytics interface 3040 may recognize that certain groups within the enterprise are utilizing the IDXDP, while another group may have yet to implement the IDXDP. This information can be used to make a specific recommendation up to Kony® of Kony, Inc. or other service provider for other opportunities, e.g., an upsell opportunity as described with respect to FIG. 11A.

The extended analytics interface 3040 also assists in the evolution of the IDXDP, and any of its associated components. Specifically, the IDXDP may require a modification at some point in order to meet the changing needs of programmers, designers, and other users. For example, the extended analytics interface 3040 has the capability to run a user journey and send the results of the journey to an engineering team for evaluation and correction of any issues or update of components based on the user actions. In this way, the IDXDP is not a static platform, but an ever-changing platform to meet the needs of current users. The Additional Plugins aspect of the extended analytics interface 3040 allows for various plugins, i.e., brains, to be implemented into the IDXDP for further enhancements.

The omni-channel application extensions interface 3050 provides the capability of AI to be applied directly to industry specific vertical applications. As a non-limiting example, the AI elements can be applied to retail banking. Further aspects of the omni-channel application extensions 3050 include Field Service, Generic Widgets and Marketplace Hosted, i.e., marketplace hosting.

Figure 3B:
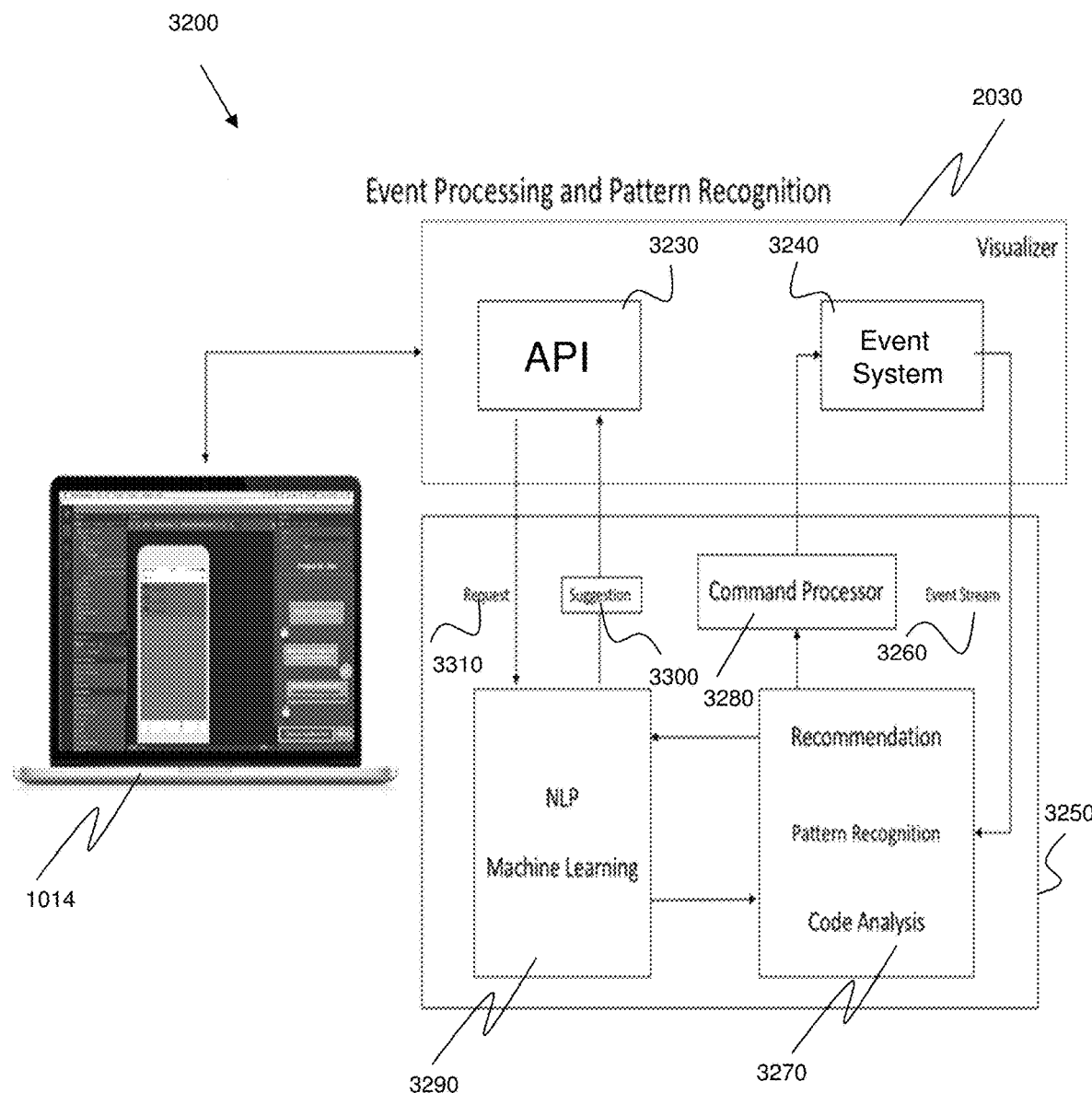
FIG. 3B depicts an implementation in a computing device in accordance with aspects of the present disclosure.

FIG. 3B shows an illustrative architecture of the event processing and pattern recognition module 3200. In embodiments, the event processing and pattern recognition module 3200 implements equations (1)-(4) in order to determine specific recommendations and/or actions. For example, the event processing and pattern recognition module 3200 can determine where specific widgets or other assets are placed within forms. As another example, the event processing and pattern recognition module 3200 can make use of the recommendation module 3250 to realize, e.g., existing assets are similar to what the user is currently developing within the IDE by analyzing the user's own workspace.

More specifically, as shown in FIG. 3B, the event processing and pattern recognition module 3200 comprises a development tool 2030, e.g., Kony Visualizer® by Kony, Inc, and recommendation module 3250. In embodiments, the development tool 2030 is comprised of an API 3230 and event system 3240. The recommendation module 3250 comprises a recommendation component 3270, a command processor 3280 and an NLP/machine learning component 3290.

In operation, an event stream 3260 comprising user actions performed within the development tool 2030 is sent from the event system 3240 to the recommendation component 3270 of the recommendation module 3250. The recommendation component 3270 takes the information within the event stream 3260 and determines whether a recommendation should be provided to a user. Specifically, the recommendation component 3270 communicates with a command processor 3280 and the NLP/machine learning component 3290 in order to determine and provide the recommendation.

In embodiments, the recommendation component 3270 determines a recommendation by utilizing the pattern recognition and code analysis provided in equations (1)-(4), in conjunction with the NLP and machine learning features of the NLP/machine learning 3290 component. In order to accomplish these tasks, the recommendation component 3270 comprises the recommendation engine 2090, while the NLP/machine learning component 3290 comprises the event AI/NLP engine 2080. For example, the machine learning feature from the event AI/NLP engine 2080 may take the information from the event stream 3260 to learn recognition of an object. By way of example, the machine learning can learn that the object is a widget and make recommendations related to widgets. In this way, the best recommendation is determined based on what has already been learned. In further embodiments, recommendations based on learned features are given a heavier weight, i.e., a further weight added to the calculations for Total confidence in equation (1).

The command processor 3280 takes system information and determines whether the recommendation should be made. For example, the command processor 3280 is configured to discriminate between whether an action needs to take place or whether a textual content recommendation should surface through a bot, i.e., the recommendation bot extension 2110. Further, the command processor 3280 is configured to execute equations (1)-(4) to calculate the total confidence of the recommendation, and also to determine if the calculated total confidence surpasses a threshold set for approving recommendations. In this way, the command processor 3280 takes the recommendation to a system level and makes the recommendation, which is then forwarded to the event system 3240 for implementation.

The event system 3240 comprises the recommendation notification adapter 2100, which is configured to gauge how a particular recommendation should be serviced, e.g., which format the recommendation should be presented to the user. In embodiments, the event system 3240 comprises the recommendation action extension 2110, which provides not only textual output back to the bot user interface 2010, but is also configured to populate a form of a widget or other tangible action. In even further embodiments, the event system 3240 comprises the recommendation action extension 2120, which is configured to provide specific actions within the development tool 2030 without a user needing to interact with the bot user interface 2010. In this way, the recommendation can be an actual action or textual content or other suitable content.

Still referring to FIG. 3B, the API 3230 communicates between the development tool 2030 and the NLP/machine learning component 3290 to provide requests 3310 to and receive suggestions 3300 from the NLP/machine learning component 3290. In embodiments, the API 3230, through the interactive advisor module 1205, is configured to answer questions of the particular user, whether it be the developer, designer, administrator, etc. using the AI. The requests can be generated by the user during the development of their digital application through the user interface 2010, as a non-limiting example. The suggestions can be provided to the user through the API 3230 as textual content or spoken content, amongst other examples.

The recommendation module 3250 will continuously monitor the complexity of a code used in the construction of an object or other assert type to determine if the code is becoming too complex, i.e., having code snippets which are unnecessary to create a particular outcome, through the recommendation component 3270. In embodiments, if a determination is made that the code is too complex, the AI of the IDXDP, and particularly the AI of the event AI/NLP engine 2080, can suggest how to optimize the code in order to reduce complexity. Complexity is determined by comparing the code to a library of machine learning outcomes stored in a database, e.g., storage system 1022B of FIG. 1A. For example, a snippet of code from a machine learning outcome can be compared to the code being developed by the developer.

When the code becomes too complex, the AI of the recommendation module 3250 and/or recommendation component 3270, e.g., the NLP/machine learning component 3290 through the event AI/NLP engine 2080, provides suggestions for optimizing the code in order to reduce complexity. For example, a suggestion from the recommendation module 3250 and/or recommendation component 3270 may run a script through the recommendation action extension 2120, which essentially thins the code directly as an action. Further, the recommendation module 3250 and/or recommendation component 3270 can suggest to run this script automatically so that the code complexity can be reduced in an efficient manner. As another example, a suggestion through the recommendation bot extension 2110 and shown through the bot user interface 2010 to the user may be examples of a plurality of routines that provide the same outcome the user desires, but do so at a much greater degree of efficiency, in terms of the code running, or a much higher degree of maintainability.

The recommendation module 3250 and/or recommendation component 3270 also continuously monitors the code for best practices or coding standards. In embodiments, if a user does not follow a best practice, the recommendation module 3250 and/or recommendation component 3270 uses a chat interface or audio interface, e.g., through the bot user interface 2010 through the API 3230, to inform the user they are not following a best practice. In further embodiments, the recommendation module 3250 suggests how to correct the problem to maintain best practices using code optimization intelligence built into the recommendation component 3270.

The best practices can be found in manuals or learned practices, amongst other examples, stored in databases, e.g., storage system 1022B of FIG. 1A. For example, a best practice in JavaScript realm suggests that a user terminate particular executable lines with a semicolon. In this way, the best practices could be things as simple as initializing variables from a front end, eliminating the use of global variables, providing the right degree of syntactical correctness, e.g., semicolons, at the end of lines. Alternatively, the best practices may be more complex, depending on the technical capability of the user. A chat window can be provided through the bot user interface 2010 to inform the user they are not following a best practice. For example, the chat window may suggest how to correct the code to be consistent with best practices. Specifically, a bot associated with the chat window, i.e., the through the bot user interface 2010, can provide a chat box indicating best practices. In embodiments, a user can click "yes" or "no" in response to a prompt to either accept changes to be made or to deny the changes.

In further embodiments, the recommendation module 3250 and/or recommendation component 3270 can develop or recommend a common coding style based on monitoring the practices of team members (or other communities) and suggest ways for the team to standardize their coding to make the code more maintainable. For example, a majority of the team may use tabs to indent their code, while only a few members use spaces. Since the majority of team members use tabs, the recommendation module 3250 and/or recommendation component 3270 would suggest that everyone use tabs in order to accomplish a common coding style across all users.

The recommendation module 3250 and/or recommendation component 3270 can also establish a best practice based on feedback from the team or a global community on a proposed best practice. For example, when there is a team of enterprise developers that are coding a certain project, it is desirable for the code to look the same from all user contributions for future users. In this way, the IDXDP has the ability to analyze the code associated with an entire enterprise in order to derive the best practices or common practices that that enterprise uses.

In further embodiments, the recommendation module 3250 and/or recommendation component 3270 can store common coding styles across all developers to suggest best practices on an enterprise level, as well as other levels, such as all users within a group of the enterprise. In embodiments, the recommendations/suggestions from the recommendation module 3250 can match the technical level of the specific user, e.g., a padding manager recommendation for a developer. In addition, the recommendation module 3250 and/or recommendation component 3270 can suggest a component in the marketplace as a substitute for a component being written by a developer, based on analyzing the object or visual component names being used by the developer and inspecting the behaviors the user is creating for the user created component. These assets can be assets that live on the World Wide Web, amongst other examples.

Figure 3C:
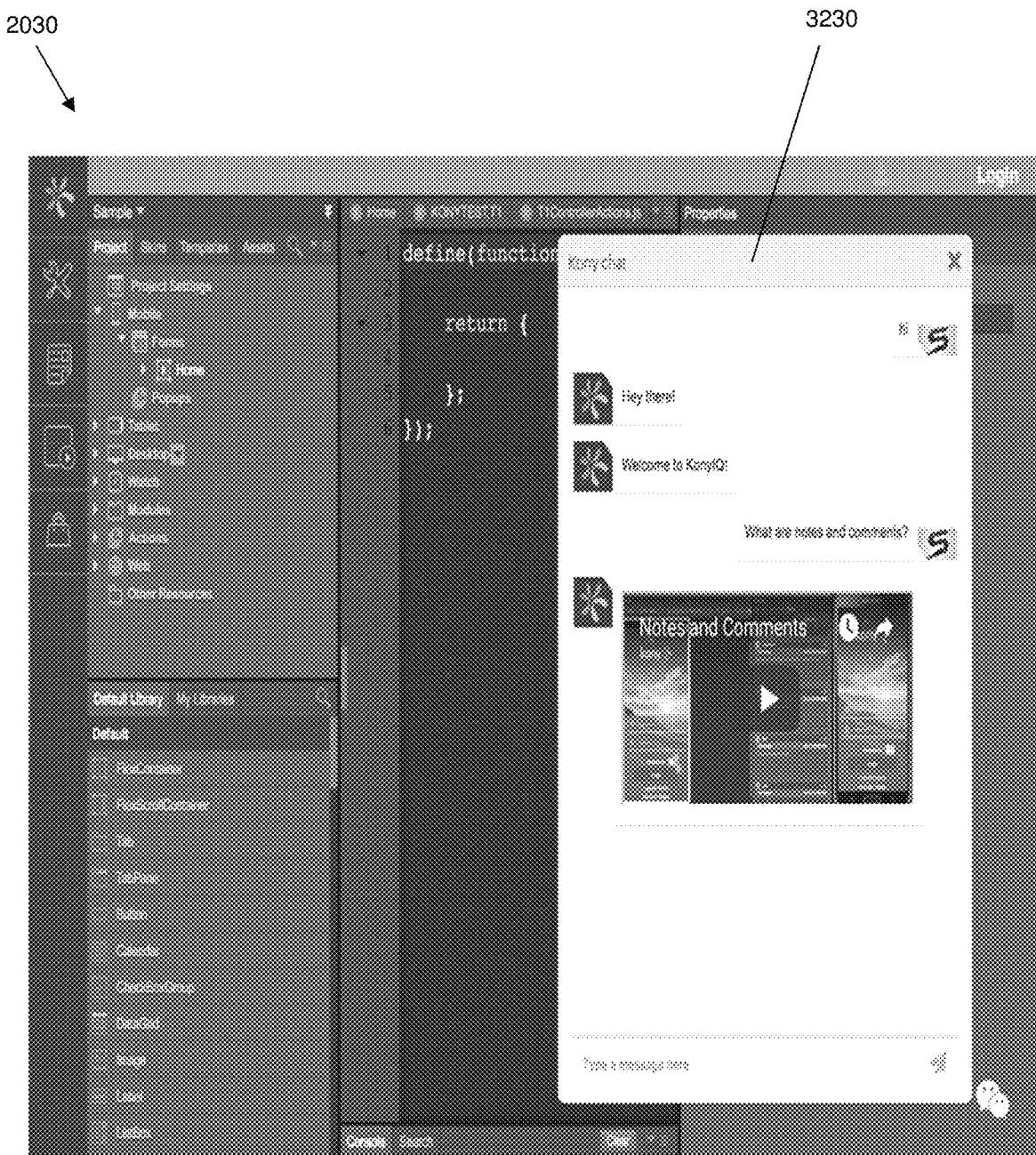
FIG. 3C depicts an application programming interface (API) of a development tool (e.g., Kony Visualizer® by Kony, Inc.) in accordance with aspects of the present disclosure.

FIG. 3C illustrates a chat client, i.e., the API 3230, within the development tool 2030. In embodiments, the API 3230, through interfaces such as the bot user interface 2010, allows developers and other users to communicate with one another and bots of the IDXDP. Specifically, the API 3230 allows for direct communication with bots, e.g., Kony® of Kony, Inc. bots, e.g., the bot AI/NLP 2020, recommendation bot extension 2110, and third-party bots, through the bot user interface 2010. These bots can provide suggestions based on events of the development tool 2030, which are triggered for each user action within the development tool 2030. In embodiments, the bots can broadcast messages to all registered chat clients using the API 3230, which is configured for direct communication amongst an entire community of users.

In embodiments, the API 3230 displays all configured third-party bots. In further embodiments, a developer can select a target bot and open new conversation window. Since the API 3230 can be embedded into the development tool 2030 and can establish a communication medium with the development tool 2030, the API 3230 code should preferably be written in JavaScript.

In addition, the API 3230 is configured as a conversation-based chat window that can be embedded in the development tool 2030, which can interact with various interfaces of the IDXDP, e.g., the bot user interface 2010. The API 3230 will communicate with the NLP/machine learning component 3290 to provide requests 3310 for material concerning notes and comments. The API 3230 will then receive suggestions 3300 from the NLP/machine learning component 3290, which are relayed to the user.

As further shown in FIG. 3C, the suggestions may be in the form of a playback video which provides an explanation for comments and forms. In this way, assets can be played back onto the IDE through the development tool 2030. In embodiments, the API 3230 can be opened as a separate window (popup) when a user taps on a chat icon within the development tool 2030. In further embodiments, tapping on the icon can toggle the visibility of a user interface (UI) of a specific interface for the API 3230, or other user interfaces, e.g., the bot user interface 2010.

Figure 3D:
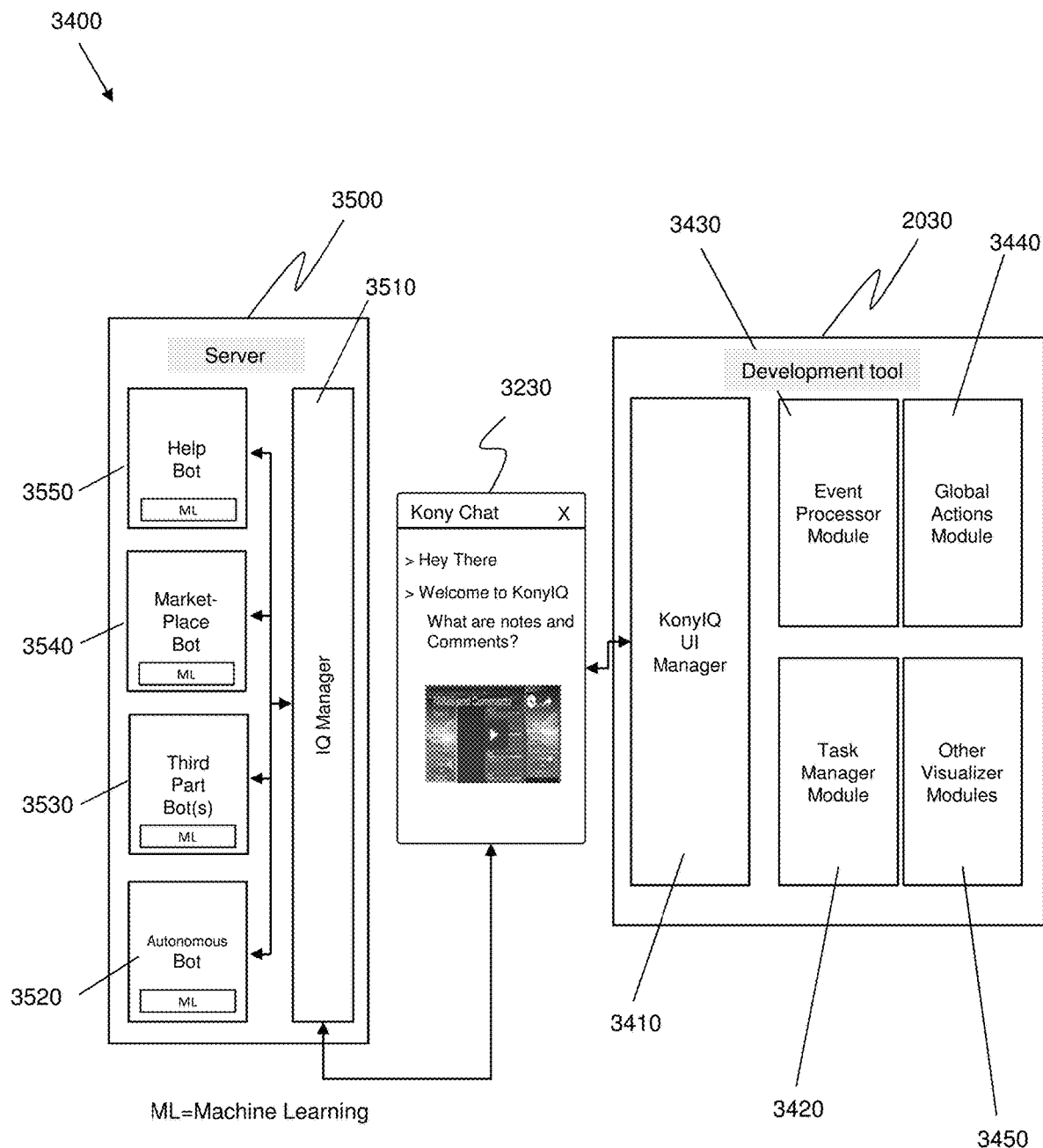
FIG. 3D depicts a computing environment between the development tool and a server system in accordance with aspects of the present disclosure.

FIG. 3D illustrates a computing environment 3400 implementing the API 3230 and development tool 2030 with the server 3500. The computing environment can also be representative of the computing environment shown in FIG. 1A. In embodiments, the API 3230 provides a mechanism to search and add a new bot and also list all added third party bots. Further, a default conversation window within the bot user interface 2010 can interact with Kony® by Kony, Inc. bots only, and a developer can select a target bot and can open a new conversation window for each bot through the bot user interface 2010.

The API 3230 can analyze the message response received from the server 3500 and render the user interface, e.g., the bot user interface 2010, appropriately. The API 3230 is also responsible for sending/receiving the commands to/from the development tool 2030 and supports attaching raw files, displays images, links, and text and inbuilt playback of audio and video. Specifically, the API 3230 can support rendering of buttons and choice boxes, which enables user interaction with the queries/suggestions. Further, the API 3230 can restore the chat history of a logged in user from previous development tool 2030 sessions, and also allows anonymous user chat history.

The development tool 2030 comprises the user interface (UI) manager 3410, which acts as a gateway from the development tool 2030 to the API 3230 and the various interfaces in communication with the API 3230, e.g., the bot user interface 2010. All the communication between the development tool 2030 and the API 3230 can occur via this UI manager 3410. For example, in embodiments, the UI manager 3410 creates/receives commands to/from the development tool 2030 and the API 3230. Specifically, UI manager 3410 module has intelligence to analyze the events flowing from the development tool 2030 and suggest actions to the user to be performed in the context of at least the recommendation module 3250 and/or recommendation component 3270 as described herein. In embodiments, the UI manager 3410 can comprise the event analytics engine 2070, which comprises intelligence to analyze the events flowing from the development tool 2030.

As further shown, the UI manager 3410 communicates with a tasks manager module 3420. In embodiments, the tasks manager module 3420 is a place, which stores all the tasks to be implemented in the development tool 2030, which shall be called by the API 3230. The following tasks can be implemented by the tasks manager module 3420:

1) import Project (Local/Cloud);
2) export Project (Local/Cloud);
3) create a component with or without contract, such as selected widget info that should be passed to the chat window or multi widget selection with form;
4) export the component to the market place, such as asking the details about the library name;
5) generic publishing to the market place, even when the user does not specify the component name;
6) import from Market place, such as obtaining a mechanism to do a pattern match against place components;
7) run programs, such as running maps to current development tool 2030 behavior or running programs on specific channels as requested by the user;
8) create skins, such as using a getting started model;
9) unused skins identification and deletion of them; and
10) unused actions identification and deletion of them.

The UI manager 3410 also communicates with the event processor module 3430, which comprises the event queue processor 2050, queue manager 2060, and event analytics engine 2070. In embodiments, the event analytics engine 2070 can be incorporated with the recommendation module 3250 and/or recommendation component 3270 to provide analysis of the assets, actions, etc. of the user and provide appropriate recommendations to the user.

In embodiments, the UI manager 3410 is registered to the event processor module 3430, which further analyzes the events received from it. In embodiments, a global actions module 3440, which, together with the global developer trends module 1215, is configured to obtain global trends within any particular industry as described with respect to FIG. 7A. The development tool 2030 also includes the other modules 3450, which assist the development tool 2030 in functioning as should be understood by those of skill in the art such that no further explanation is required. In embodiments, all user actions in the development tool 2030 are captured by the event processor module 3430.

As with all servers and AI described herein, the server 3500 uses Node.js, which is a server-side JavaScript. The bots can be implemented using Node.js with wit.ai as the AI engine, as an illustrative example. As should be recognized by those of skill in the art, wit.ai is an open and extensible natural language platform that learns human language from all interactions, and leverages the community such that anything that is learned is shared across developers. Third party bots can be developed by developers in any of their preferred technology areas, with the third party bots being consumed seamlessly with the Node.js of the server 3500. In embodiments, the server 3500 is hosted on a remote/local system or on a cloud, i.e., cloud computing environment 1100 comprising one or more cloud computing nodes 1110.

In embodiments, the API 3230 is automatically opened when the development tool 2030 is launched for the first time, with the API 3230 preserved for future development tool startups. Specifically, upon starting the development tool 2030, the API 3230 sends a handshake request to the server 3500. This handshake request shall contain information such as:

1) user details token (if user is logged-in in a previous visualizer session);
2) internet protocol (IP) address;
3) development tool instance ID; and
4) default conversation window ID.

The server 3500 responds back with a unique token to identify the user's default conversation window. In embodiments, the API 3230 will send same details as the initial connection for this new conversation window to server 3500 and receives a unique token for this conversation window. The API 3230 can preserve all of the tokens from the conversation windows and send a token with every message to the server 3500. In embodiments where any action requires a user login, the API 3230 requests user login before executing the action in order to have the ability to complete the action.

The server 3500 comprises an autonomous bot 3520, third-party bot(s) 3530, market place bot 3540 and help bot 3550 (amongst other bots described herein), which all communicate with the bot user interface 2010. The autonomous bot 3520 provides commands to the development tool 2030, such as build code, import/export component, etc. The third-party bot(s) 3530 includes at least two types of third-party chat bots. For example, the third party bots include chat bots built for the IDXDP, where these bots are directly added to IQ manager 3510 using an admin console. The developers can communicate with these bots once they add a bot to their API 3230 through an interface such as the bot user interface 2010, which can understand the requests to the bots from the intelligence, e.g., AI and NLP, within the bot AI/NLP 2020. A second bot includes chat bots already built for other providers. If required, a developer can write a connector, which makes these chat bots work with the IDXDP as should be understood by those of ordinary skill in the art.

The market place bot 3540 is a chat bot that helps with the market place component search and make appropriate suggestions. The help bot 3550 is a chat bot that provides help information consolidated from Kony® documentation, forums and the local or global community. The help bot 3550 can respond with detailed help with images, video, text, links and sample code as detailed with respect to real-time collaboration and tutorials as described herein.

In embodiments, an application developer or other user can communicate directly with the Development tool 2030 or with the server 3500 through various interfaces, e.g., the bot user interface 2010. For example, a developer may choose to issue a command to the development tool 2030 directly from the API 3230 by typing the command within the bot user interface 2010. Specifically, the user may type "Convert the selected Flex to master" into the API 3230 through the bot user interface 2010, which can be recognized by the intelligence of the bot AI/NLP 2020. In this scenario, the raw text entered into the Visualizer API 3230 follows a "Direct Communication with bots" approach to interact with the autonomous bot 3520. The autonomous bot 3520 can then respond with an action message through the bot user interface 2010 to the API 3230. Specifically, this action is analyzed by API 3230, which sends the commands to development tool 2030. The UI manager 3410 inside development tool 2030 receives the command and executes the command in the development tool 2030 using the tasks manager module 3420.

Alternatively, a developer may communicate directly with the server 3500, and specifically with the informative bots within the server 3500 through the bot user interface 2010. These cots can be any of the bots as described herein. In embodiments, an application developer can type a raw message into the conversation window e.g., bot user interface 2010 in communication with the API 3230. The Visualizer API 3230 converts this raw message using the intelligence provided by the bot AI/NLP 2020 into a predefined template request and sends this request to the server 3500.

The request is received by the IQ manager 3510, which sends the request to the appropriate chat bot, i.e., autonomous bot 3520, third-party bot(s) 3530, market place bot 3540 or help bot 3550. In embodiments, the chat bot can apply NLP, if required. The chat bot responds with intents or commands in a predefined response format/template. The intents or commands are passed back to the user's chat window by the IQ manager 3510. The API 3230 analyzes the response template and displays it in the appropriate format, e.g., spoken, visual, or textual, to the developer. The API 3230 can also broadcast messages to all registered users. In embodiments, the IQ manager 3510 can identify all available users and send the same message to all the users.

The requests and messages provided to and by the API 3230 can be in a number of formats. For example, a body of a hypertext transfer protocol (HTTP) request can be sent in JSON format, requiring the properties of messaging_type, recipient and message. In embodiments, the messaging_type property provides the purpose of the message being sent, the recipient property identifies the intended recipient of the message, and the message property defines the message to be sent. Examples of the messaging_type property can be a message in response to a received message, or a message that is being sent proactively and not in response to a received message. Examples of the recipient property include a page-scoped user identification (PSID) of the message recipient. Optionally, the recipient property can be a user name from any third party cloud, e.g., the cloud computing environment 1100 comprising one or more cloud computing nodes 1110 as shown in FIG. 1B. Examples of the message property include a message text or an attachment object. Properties can also include a message state displayed to the user, with the properties of typing_on and typing_off.

The typing_on property indicates a display of the typing bubble, while typing_off property indicates a removal of the typing bubble. In further embodiments, there can be an optional push notification having various types. The push notification type can be regular, which is represented by sound. Alternatively, the push notification type can be a silent_push, which is represented by an on-screen notification only, or a no_push, which is represented by no notification. The regular push notification type is the default.

In embodiments, an attachment object is a component used to send messages with media or structured messages, where the text or attachment is set. The following can be included in the attachment object: rich media messages including images, audios, videos, or files; and templates including generic templates, button templates, receipt templates, or list templates, etc. Attachment types include audio, video or image file. To send an attachment from a file, a POST request can be submitted to a Send API with the message details as form data, with the following fields:

recipient: A JSON object identifying the message recipient;

text: an optional text message to send with the asset;

message: A JSON object describing the message. Includes the asset type, and a payload. The payload is empty; and filedata: The location of the asset on your file system and multi-purpose internet mail extensions (MIME) type.

For attaching a template, the body of the request can follow a standard format for all template types, with a message.attachment.payload component containing the type and content details that are specific to each template type. The available templates include generic templates, list templates button templates, receipt templates, media template, code templates, amongst other examples.

Generic Templates:

The generic template allows a user to send a structured message that includes an image, text and buttons. For example, a generic template with multiple templates described in the elements array will send a horizontally scrollable carousel of items, each composed of an image, text and buttons. For the message.attachment.payload component of the generic template, the template_type property value may be generic. The image_aspect_ratio property is optional and represents an aspect ratio used to render images that can be specified by element.image_url. The elements property represents an array of element objects that describe instances of the generic template to be sent. In embodiments, specifying multiple elements will send a horizontally scrollable carousel of templates. In embodiments, the generic template supports a maximum of 10 elements per message, although other elements are also contemplated herein.

The message.attachment.payload.elements component of the generic template can include a title property with an 80-character limit (as a non-limiting example) that is to be displayed in the template. A subtitle property is optional and can also have an 80-character limit (as a non-limiting example) that is to be displayed in the template can be included. Other optional elements for the message.attachment.payload.elements component of the generic template include the URL of the image to display in the template, and a default action executed when the template is tapped. The default action can be provided by the following command:

```
{
"type": "web_url",
"url": "<URL_TO_OPEN_IN_WEBVIEW>",
}
```

Another optional property is a buttons property, which represents an array of buttons to append to the template. A maximum of 3 buttons per element is supported, as an example.

List Template:

The list template allows a user to send a structured message with a set of items rendered vertically. For the message.attachment component, the value property can be a template with the payload property representing the payload of the template. For the message.attachment.payload component, the value property can be list. An optional property is the top_element_style property, which sets the format of the first list items. The messenger web client can render compact, where compact renders a plain list item and large renders the first list item as a cover item. Also, the buttons property is optional, and represents the button to display at the bottom of the list. Maximum of 1 button is supported, as a non-limiting example.

The elements property of the message.attachment.payload component represents an array of objects that describe items in the list, with a minimum of two elements required (as a non-limiting example) and maximum of four elements supported (as a non-limiting example). For the message.attachment.payload.elements component, the title property represents the string to display as the title of the list item, with an 80-character limit (as a non-limiting example). In embodiments, the title may be truncated if the title spans too many lines, and must also have one or both of image_url or subtitle set. The subtitle property is optional and represents a string to display as the subtitle of the list item and an 80-character limit as a non-limiting example. In embodiments, the subtitle may be truncated if the subtitle spans too many lines. The subtitle and should also have one or both of image_url or subtitleset. The image_url property is also optional and represents the URL of the image to display in the list item. Further, the default action property is optional, with a URL button that specifies the default action to execute when the list item is tapped.

Button Template:

The button template includes the message.attachment component that has a value property, which could be a template. Further, the payload property represents a payload of the template. For the message.attachment.payload component, the value property must be button. The text property of the message.attachment.payload component can be UTF-8-encoded text of up to 640 characters as a non-limiting example, with the text appearing above the buttons. For the buttons property of the message.attachment.payload property, a set of 1-3 buttons that appear as call-to-actions.

Receipt Template:

The receipt template allows a user to send an order confirmation as a structured message. The message.attachment component includes a value property, which must be template, while the payload property represents a payload of the template. The message.attachment.payload component includes the template_type property where the value must be receipt. The recipient_name property represents the recipient's name. The merchant_name property is optional, and, if present, is shown as logo text. The order_number must be unique, while the currency of the message.attachment.payload property represents the currency of the payment.

The payment_method represents the payment method. Providing information for the customer to decipher which payment method and account they can use includes, for example, a custom string, such as, "creditcard name 1234". The timestamp property is optional and is in the order in seconds. The elements property of the message.attachment.payload component represents an array of a maximum of 100 element objects (as a non-limiting example) that describe items in the order. Sort order of the elements is not guaranteed. The address property is optional and represents the shipping address of the order. The summary property represents the payment summary. The adjustments property is optional and represents an array of payment objects that describe payment adjustments, such as discounts.

For the message.attachment.payload.address component of the receipt template, the street_1 property represents the street address, line 1. The street_2 property is optional and represents the street address, line 2. The city property represents the city name of the address, while the postal_code property represents the postal code of the address, the state property represents the state abbreviation for U.S. addresses, or the region/province for non-U.S. addresses, and the country property represents the two-letter country abbreviation of the address.

For the message.attachment.payload summary component of the receipt template, the property values of the summary object should be valid, well-formatted decimal numbers, using '.' (dot) as the decimal separator. It is noted that most currencies only accept up to 2 decimal places. The subtotal property is optional and represents the sub-total of the order. Also optional is the shipping_cost property, which represents the shipping cost of the order, and the total_tax property, which represents the tax of the order. The total_cost property represents the total cost of the order, including sub-total, shipping, and tax. For the message.attachment.payload.adjustments component of, the name property is optional and represents a name of the adjustment. The amount property is also optional and represents the amount of the adjustment.

For the message.attachment.payload.elements component, the title property represents the name to display for the item. The subtitle property and the quantity property are both optional, with the subtitle property representing the subtitle for the item, usually a brief item description, and the quantity property representing the item purchased. The price property represents the price of the item. For free items, a '0' is allowed. The currency property and the image_url property are both optional, with the currency property representing the currency of the item price and the image_url property representing the URL of an image to be displayed with the item.

Media Template:

The media template allows a user to send a structured message that includes an image or video, and an optional button. The message.attachment component of the media template includes a type property where the value is template. The payload property is the payload of the template. The message.attachment.payload component of the media template includes a template_type property, where the value must be media. The elements property of message.attachment.payload component represents an array containing 1 element object that describes the media in the message. The message.attachment.payload.elements component of the media template includes a media_type property, which represents the type of media being sent—image or video is supported. Further, the URL property represents a URL of the image, and the buttons property represents an array of button objects to be appended to the template. A maximum of 1 button is supported.

Code Template:

The code template includes the message.attachment component, which includes a type property where the value must be template, and a payload property which is a payload of the template. The message.attachment.payload component of the code template has a template_type property where the value must be code and the code is a JavaScript code to be displayed.

Buttons are defined by objects in a buttons array, with message templates supporting buttons that invoke different types of actions. Examples of buttons include a postback button, a URL button a call button, a share button, a buy button, log in button, a log out button, and a game play button. When the postback button is tapped, a messenger platform can send an event to a user's postback webhook. This is useful when a user wants to invoke an action in their selected bot. This button can be used with the button template and the generic template. Properties of the postback button include a type, which represents the type of button. Another property is a title, which represents a button title with a 20-character limit as a non-limiting example. A further property of the postback button is a payload, which represents data that will be sent back to the user's webhook. The payload has a 1000-character limit.

The URLbutton opens a webpage in the messenger webview. This button can be used with the button and generic templates. The properties of the URL button include a type, which represents a type of button and must be web_url. The title represents the button title and has a 20-character limit. The URL property represents the URL that is opened in a digital browser when the button is tapped and must use hypertext transfer protocol secure (HTTPS) if the messenger_extensions is true. The webview_height_ratio is optional and represents a height of the webview. Valid values are compact, tall and full, with defaults to full.

The messenger_extensions property is optional and needs to be true if using Messenger Extensions. The fallback_url property represents the URL to use on clients that do not support Messenger Extensions. If this is not defined, the URL will be used as the fallback. It may be specified if messenger_extensions is true. The webview_share_button is optional, and is set to hide to disable the share button in the Webview (for sensitive info). This does not affect any shares initiated by the developer using Extensions.

Quick Replies allow for obtaining message recipient input by sending buttons in a message. When a quick reply is tapped, the value of the button is sent in the conversation, and the messenger platform sends a messages event to the user's webhook. The properties of the quick replies include a content_type, which must be text: sends a text button, or location: sends a button to collect the recipient's location. Another property is title, which represents the text to display on the quick reply button with a 20-character limit as a non-limiting example. This is required if a content_type is 'text'. The property of payload represents custom data with 1000-character limit (as a non-limiting example) that will be sent back via a messaging_postbackswebhook event. The payload is required if content_type is 'text'. The image_url property is optional and represents the URL of an image to display on the quick reply button for text quick replies. In embodiments, the image should be a minimum of 24 px×24 px. Larger images will be automatically cropped and resized.

Figure 3E:
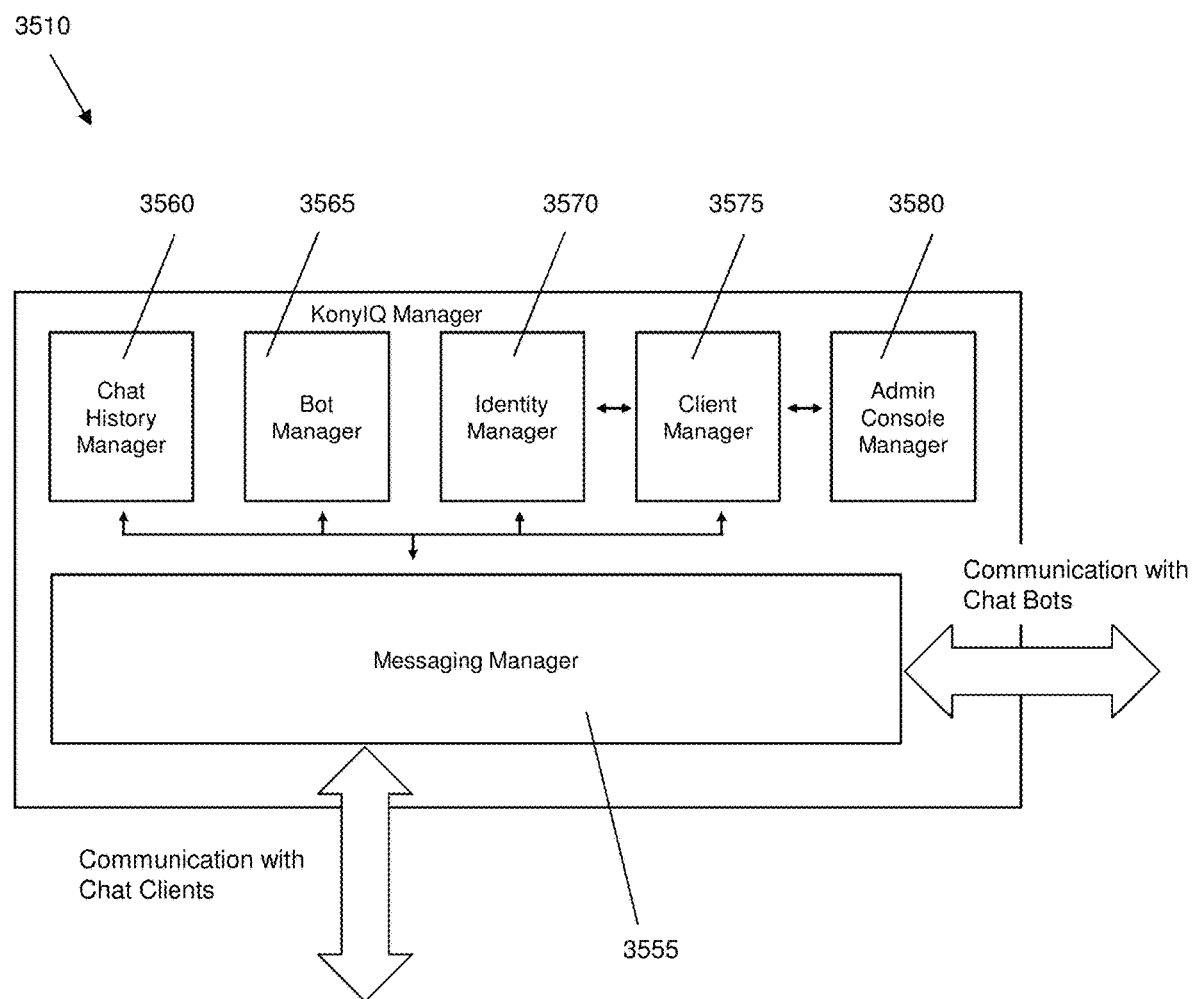
FIG. 3E depicts components of a server system in accordance with aspects of the present disclosure.

FIG. 3E represents the IQ manager 3510, which communicates with chat clients, i.e., the API 3230, and the chat bots, e.g., the autonomous bot 3520, third-party bot(s) 3530, market place bot 3540 and help bot 3550. The IQ manager 3510 comprises a Messaging manager 3555, a Chat History manager 3560, a bot manager 3565, an Identity manager 3570, a client manager 3575 and admin console manager 3580. In embodiments, the UI manager 3410 acts as a gateway to the IQ manager 3510.

In embodiments, the IQ manager 3510 authenticates the user by using an identity service module of the Identity manager 3570. In embodiments, this can be the same authentication as is currently used in the Kony Cloud™ of Kony, Inc. user authentication or other cloud computing environment, e.g., cloud computing environment 1100. In embodiments, the Identity manager 3570 analyzes the user details, IP address, and conversation window details and produces a unique token to identify the chat client, i.e., the user. The IQ manager 3510 provides a unique identification (ID) to each registered bot, e.g., autonomous bot 3520, third-party bot(s) 3530, market place bot 3540 and help bot 3550, with each request and response containing both chat client token and the bot ID. In embodiments, the information of the registered bots' is saved as meta info (typically JSON), which is used by the IQ Manger 3510 to generate the same ID. Further, all the registered bots can communicate with the IQ manager 3510.

By default, all messages are routed to Kony® chat bots; although communications can be provided to any of the chat bots as desired by the administrator. For example, if a developer selects a third-party chat bot conversation window, the messages can be routed to the corresponding third-party chat bot only. The chat history of all users for all conversation windows can be monitored and recorded by the Chat History manager 3560. The bot manager 3565 is responsible for preserving the existing bot information and providing the same to the IQ manager 3510 for the communications. The client manager 3575 primarily deals with storing the client information, which includes both active and inactive user sessions. This information can be stored in the storage system 1022B as shown in FIG. 1A, for example.

The admin console manager 3580 can be a web page or other interface from which admin settings can be configured in the server 3500. The admin console manager 3580 can be responsible for, amongst other functions:

1) registering a new bot (Kony® or third party) with the IQ manager 3510;

2) unregistering an existing bot;

3) disabling a bot, where the bot can be public or enterprise. It can also be private bot during development phase;

4) listing out existing client sessions. (both active and inactive sessions); and 5) viewing and clearing chat history.

Figure 3F:
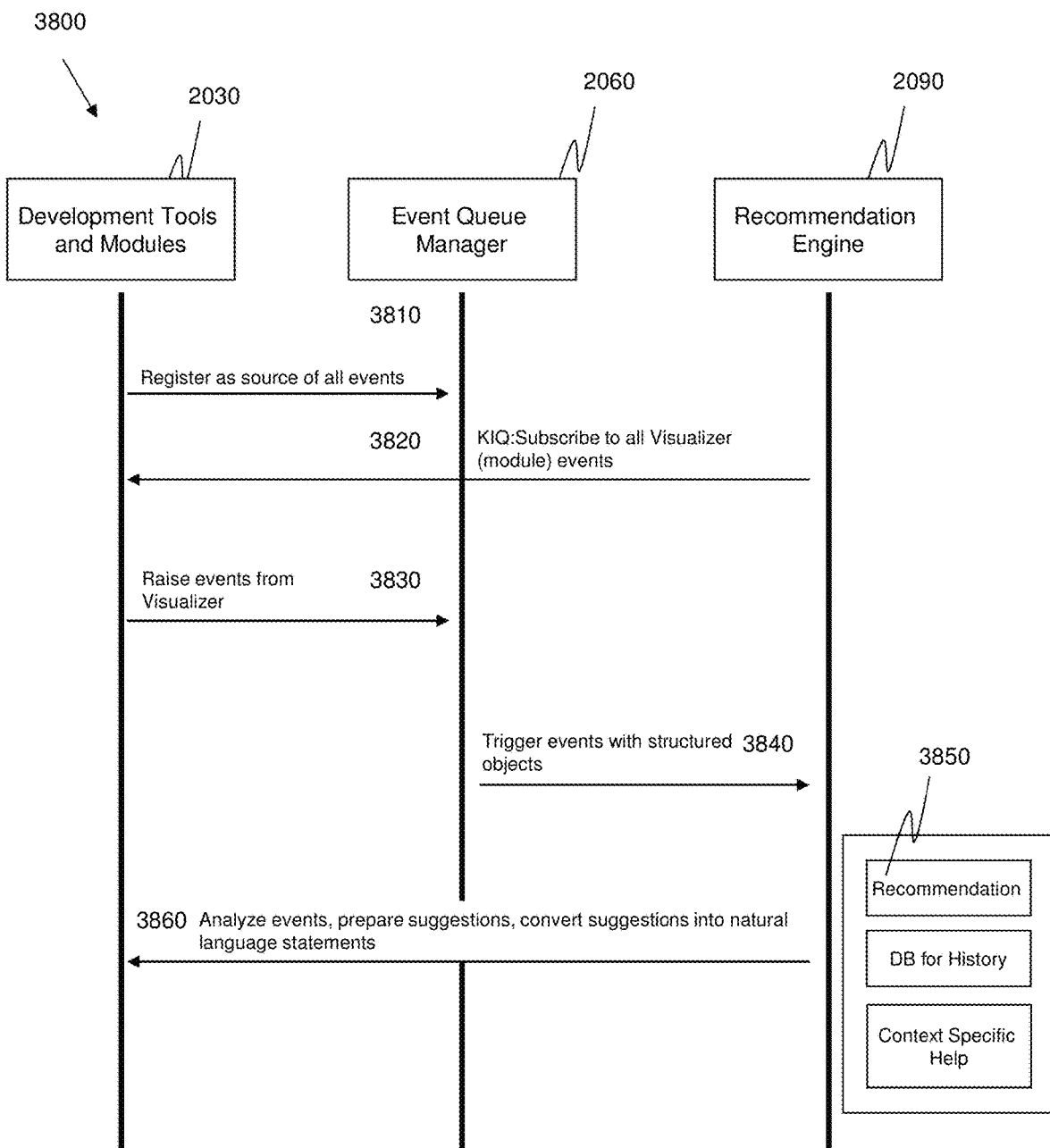
FIG. 3F depicts a swim lane diagram for implementing processes in accordance with aspects of the present disclosure.

FIG. 3F illustrates a swim diagram 3800 for implementing processes in accordance with aspects of the present disclosure. In embodiments, the sub-systems or actors can include the development tool 2030 and related modules (modules of Kony Visualizer® by Kony, Inc), the queue manager 2060 and the recommendation engine 2090. As the user performs actions in the development tool 2030, the actions are collected and the information provided by the actions are then utilized to determine an intent of the user and provide a recommendation based on the intent. For example, the event queue manager, i.e., queue manager 2060 is responsible for providing meaningful event information coupled with context from the development tool 2030 in a structured object notation. The IQ recommendation engine, i.e., the recommendation engine 2090, shall process the events and provides suggestions to developers or other users. The recommendation engine 2090 registers itself as a subscriber to all the events raised by various sub-systems of the development tool 2030. In the process, it collects the information in JSON format. The information collected includes:

1) user actions to create, rename, delete forms, skins, widgets etc.;

2) corresponding actions/events raised by various sub systems with in the development tool 2030;

3) captures information like the name of the form, skin, specific user activity, channel that user is building the application for;

4) additional contextual information about the application, e.g., app name, domain, etc.;

5) the information so captured is stored in a NoSQL database; and

6) JavaScript Code changes by users.

As shown in FIG. 3F, the development tool 2030 registers as a source of all events, i.e., user actions, at step 3810. At step 3820, the queue manager 2060 subscribes to the recommendation engine. At step 3830, the development tool 2030 raises, i.e., fires, the events. This causes a triggering of events with structured objects at step 3840, i.e., components being constructed in response to user actions. With this information, the recommendation engine 2090 analyzes the events, prepares suggestions and converts those suggestions into natural language statements at step 3850. In embodiments, the suggestions 3850 can comprise a recommendation context specific help, amongst other examples.

Autonomous Advisor

As described herein, the IDXDP may include an autonomous advisor functionality that is implemented, for example, using the autonomous advisor module 1210 described with respect to FIG. 1C. In accordance with aspects of the present disclosure, the autonomous advisor functionality automatically determines an intent of a user who is working in the IDE, and automatically makes recommendations to the user for actions to take in the IDE, where the recommendations are based on comparing the user's intent to insights determined from big data using analytics and machine learning.

For example, as described with respect to FIG. 2A, modules of the system (e.g., the event analytics engine 2070 and the event AI/NLP engine 2080) may be configured to determine an intent of a user working in the IDE 2030 based on applying cognitive analysis and AI techniques to the events that the user performs in the IDE 2030. Moreover, portions of the system (e.g., the event AI/NLP engine 2080) may be configured to determine insights about the ways that other users are performing tasks in the IDE 2030 by continuously obtaining and analyzing big data using cognitive analysis and AI techniques. The determined insights may include, for example, patterns, correlations, trends, and preferences associated with ways that others are using the IDE 2030. In embodiments, the recommendation component 3270 (e.g., the recommendation engine 2090) uses the insights to automatically generate recommendations that the system provides via the bot user interface 2010 to the user working in the IDE 2030. In this manner, implementations of the invention may make intelligent recommendations to a user by: (i) determining the user's intent in the IDE; (ii) comparing the user's intent to determined ways that other users are performing the same or similar tasks in the IDE; and (iii) recommending to the user that the user accomplish their intent by using one of the determined ways that other users are performing the same or similar tasks in the IDE.

In embodiments, the big data used in determining the insights includes internal data (e.g., platform data) gathered from other users working with instances of the IDE that are connected to the IDXDP. For example, the big data may include data obtained from respective IDEs of plural other users (potentially worldwide) who are all using the platform (e.g., the Kony® platform of Kony, Inc., including Kony Visualizer®). For example, the system may be configured to continuously monitor and track every action (e.g., every keystroke, mouse input, etc.) taken by every user in their respective IDE, and to provide this data to the IDXDP for analysis as part of the big data. Such actions may include, for example and without limitation: menu items in the IDE that the user selects; text typed by the user in a field in the IDE; and names applied by a user to objects, widgets, forms, etc., in a project in the IDE. The internal data may also include apps that are created using the IDE and that are published to a marketplace (e.g., the Kony Marketplace™ by Kony, Inc.).

The big data may also include data that is not generated by an IDE associated with the IDXDP. For example, the big data may include external data (e.g., community data) such as: social media sources (user social media posts, comments, follows, likes, dislikes, etc.); social influence forums (e.g., user comments at online blogs, user comments in online forums, user reviews posted online, etc.); activity-generated data (e.g., computer and digital device log files including web site tracking information, application logs, sensor data such as check-ins and other location tracking, data generated by the processors found within vehicles, video games, cable boxes, household appliances, etc.); Software as a Service (SaaS) and cloud applications; and transactions (e.g., business, retail, etc.). Such external data may be obtained using data mining, web scraping, etc., of publicly available (e.g., Internet) data and/or enterprise data from other third party applications.

In accordance with aspects of the present disclosure, the system uses cognitive analysis techniques (e.g., NLP, sentiment analysis, etc.) and AI techniques (e.g., machine learning, neural networks, etc.) to analyze the big data to determine insights about how users are performing tasks in the IDE. For example, the system may analyze the internal data of thousands of worldwide users of the IDE and learn from this analysis that when a user performs a specific set of events in the IDE (e.g., a series of mouse clicks, typing, drag and drops, etc., in the IDE), the user is creating a particular object (e.g., an authentication object for a digital app). As another example, the system may analyze external data including blog posts, comments, and ratings of published digital apps and may learn from this analysis that the current best practice for permitting a user to select between two options in a digital app is to use a visual toggle switch (that requires a single input) instead of a drop down menu (that requires at least three inputs). These two examples are merely for illustration, and implementations of the invention may be used to determine any number of and any type insights (e.g., patterns, correlations, trends, preferences, etc.) about using the IDE.

The system is not limited to analyzing the internal data separately from the external data, and instead both internal data and external data may be included in a set of big data that is analyzed to determine insights, which may include patterns, correlations, trends, and preferences associated with using the IDE. Moreover, the big data is not static, but instead is ever growing due to the system continuously obtaining new data (e.g., both internal and external) as it becomes available. In this manner, since the big data changes over time, any determined insights (e.g., patterns, correlations, trends, preferences, etc.) may also change over time as a result of the change in the big data. As a result, something that is determined as a best practice today (e.g., using a visual toggle switch instead of a drop down menu) may be superseded by a different best practice determined from the big data in the future.

In embodiments, the analysis of the big data may be performed by the event AI/NLP engine 2080 as described with respect to FIG. 2A. Big data, by definition, involves data sets that are so large or complex that traditional data processing application software is incapable of obtaining and analyzing the data. As such, it follows that the event AI/NLP engine 2080 is necessarily rooted in computer technology since the processes involved are impossible to perform without computer technology (i.e., the processes involved in obtaining and analyzing big data cannot be performed in the human mind). In embodiments, the event AI/NLP engine 2080 may include a plurality of computer devices (e.g., servers) arranged in a distributed network (e.g., a cloud environment).

In embodiments, autonomous recommendations as described herein are presented to the user of the IDE via the bot user interface 2010 of FIG. 2A. The system may present the recommendation in a visual form (e.g., a chat box with text, images, etc.) and/or or audible form (e.g., using text to speech and an audio speaker). Embodiments in accordance with aspects described herein may be implemented in the cloud computing environment 1100 of FIG. 1B, with the architecture 2000 of FIG. 2A comprising one or more cloud computing nodes 1110 as described with respect to FIG. 1B, plural user computer devices communicating with the architecture 2000 (e.g., accessing the IDE 2030) comprising plural other cloud computing nodes 1110, and plural computer devices from which the external data (e.g., community data) is obtained comprising still other cloud computing nodes 1110.

As described herein, autonomous recommendation (or a recommendation made autonomously) refers to a recommendation the system presents to the user without having been solicited by the user. This stands in contrast to intelligent advisor systems in which the user first asks for help or assistance, and the systems only provide a recommendation in response to such a user request for help or assistance. All of the recommendations described in this section are autonomous recommendations unless explicitly stated otherwise.

This section describes a number of examples of autonomous recommendations that may be provided with implementations of the present disclosure, including: customized recommendations based on determined user persona; repetitive action recommendations; shortcut recommendations; automatic completion recommendations; style advisor recommendations; style evaluator recommendations; padding manager recommendations; image advisor recommendations; design time testing recommendations; app testing recommendations; defect tracking recommendations; workflow assistant recommendations; standards adherence recommendations; best practices recommendations; DevOps advisor recommendations; refactoring recommendations; performance recommendations; code cleanup and linting recommendations; upsell advisor recommendations; automated client success recommendations; automated Mobile Test Automation (MTA) recommendations; and feature request (FTR) advisor recommendations. These examples are not intended to be limiting, and implementations of the invention may be used to make other types of autonomous recommendations to users of the IDE based on insights determined from big data.

Customized Recommendations Based on Determined User Persona

In accordance with aspects of the present disclosure, the autonomous advisor functionality determines a persona of a user and customizes the recommendations described herein based on the determined persona of user. Different users may act under different personas (e.g., roles) within an enterprise when working in the IDE, and the system may customize the vocabulary, complexity, and/or frequency of a recommendation based on the different personas. For example, a first user may be a designer who has a relatively low understanding of coding, and a second user may be a developer who has a relatively high level of understanding of coding. In this example, when generating a recommendation for the first user, the system would avoid using references to coding vocabulary and coding concepts since the first user is likely to not understand such a recommendation. On the other hand, when generating a recommendation for the second user in this example, the system would include coding vocabulary and coding concepts in the recommendation.

In embodiments, the system determines the user's persona either from an indication by the user of by analyzing a user's actions in the IDE. In one method, a user may indicate their persona in a user profile associated with the IDE. In this implementation, when the user logs in to the IDE with their credentials, the system accesses the user profile associated with these credentials and determines the persona of this user from the data in the user profile. The IDE may be configured such that a user can select from a set of predefined personas when editing their profile in the IDE. The system may use the persona determined in this manner when customizing recommendations in the manner described herein.

Another method of determining a persona of a user is for the system to prompt the user while the user is working in the IDE. For example, when a user logs in to the IDE with their credentials, the system may prompt the user (e.g., visually and/or audibly) to provide user input to indicate their current persona. In this manner, the system provides the user with the ability to indicate a different persona each time they log in to the IDE, which can be helpful for users who perform different roles at different times within the enterprise. The system may use the persona determined in this manner when customizing recommendations in the manner described herein.

Another way of determining a user persona is for the system to analyze the actions the user performs in the IDE and to designate a persona for the user based on this analysis. For example, the system may store data that defines different actions in the IDE as being associated with different ones of the available personas. In embodiments, a module of the system (e.g., the event analytics engine 2070) analyzes the actions (e.g., events) performed by the user in the IDE 2030, compares these actions to the data that defines different actions in the IDE as being associated with different ones of the available personas, and determines a persona for the user based on this comparison. This described method of analysis is merely illustrative, and other methods of automatically determining a user's persona may be employed. In this manner, the system may automatically determine a persona for a user based on actions performed by the user in the IDE. The system may use the persona determined in this manner when customizing recommendations in the manner described herein.

Figure 4A:
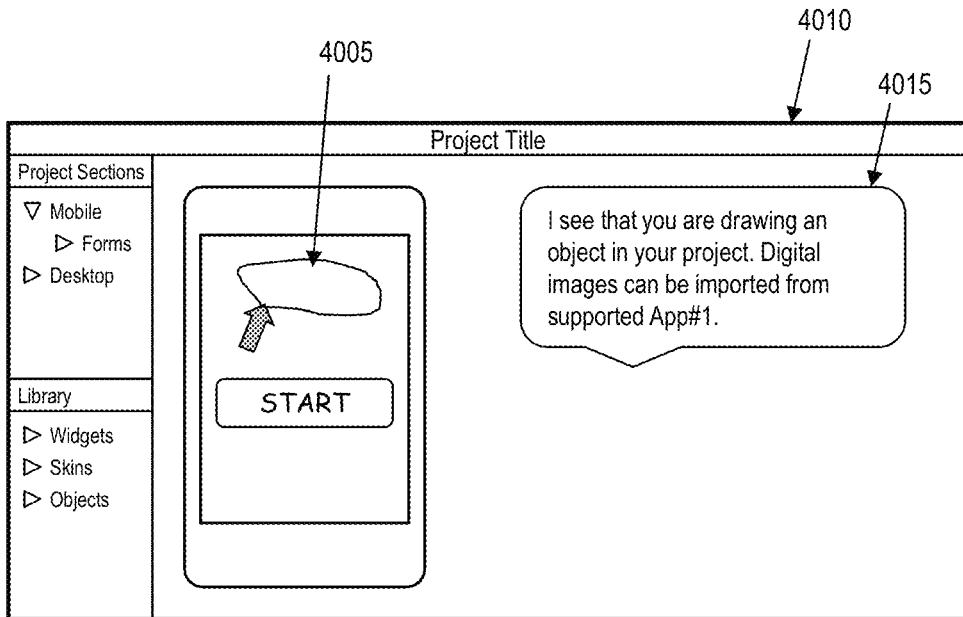
FIGS. 4A and 4B illustrate screen shots of recommendations for users in accordance with aspects of the present disclosure.
Figure 4B:
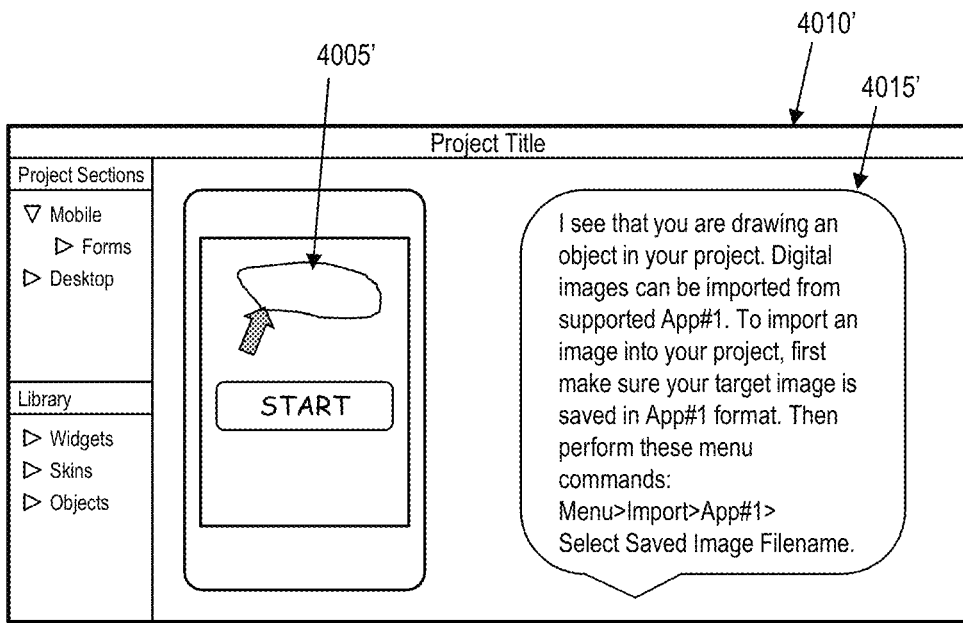

FIGS. 4A and 4B illustrate the system providing different recommendations for different users based on the different determined personas of the users. For example, FIG. 4A shows a workspace 4010 (e.g., a UI in the IDE 2030 of FIG. 2A) of a first user that the system determines has the persona of a developer. On the other hand, FIG. 4B shows an illustrative workspace 4010' (e.g., a UI in the IDE 2030) of a second user that the system determines has the persona of a designer. In these workspaces, each of the users is manually drawing an object 4005 and 4005'.

Using methods described herein with respect to the autonomous advisor functionality, the system automatically determines the intent of each user, i.e., drawing an object. Using methods described herein with respect to the autonomous advisor functionality, the system automatically determines a recommendation for each user based on the determined intent, and provides the recommendation 4015 and 4015' to the users via a chat window (e.g., as part of the bot user interface 2010 of FIG. 2A). The core of the recommendation is the same for each user, e.g., that images can be imported from another application instead of the user manually drawing images in the workspace. However, the content of each recommendation is customized based on the different persona of each respective user.

For example, as shown in FIG. 4A, the recommendation 4015 to the first user is customized to the persona of a developer by making the recommendation 4015 concise (e.g., based on a presumption that a developer knows how to import images without instruction). As shown in FIG. 4B, the recommendation 4015' to the second user is customized to the persona of a designer by making the recommendation 4015' more elaborate (e.g., based on a presumption that a designer would benefit from step by step guidance for importing images). In this manner, the recommendations for the two different users are customized to use different complexity based on the different personas.

Recommendations may also be customized based on other factors, such as the frequency with which a particular recommendation is made. Using the example of FIGS. 4A and 4B, the system may further customize the recommendation 4015 for the first user (i.e., the developer) by showing this recommendation only once even if the system determines the same intent from this same user in the future (e.g., based on a presumption that a developer does not want to be told multiple times). Similarly, the system may further customize the recommendation 4015' for the second user (i.e., the designer) by showing this recommendation every time the system determines this same intent by the user (e.g., based on a presumption that a designer would benefit from this repeated information). In this manner, the recommendations for the two different users are customized to use different frequencies based on the different personas.

Other types of customization based on personas may be used. For example, the system may use different vocabularies for different personas. Specifically, the system may employ jargon and/or code syntax in recommendations to developers, while avoiding including jargon and/or code syntax in recommendations to designers.

In an illustrative example, the system may determine a user to have a persona selected from the group consisting of: designer, developer, business owner, sales, marketing, and platform. These exemplary personas are not intended to be limiting, however, and any number and any types of personas may be defined by in implementations of the invention for use in customizing recommendations to users.

In embodiments, rules that define how to customize different types of recommendations for each of the different types of personas may be stored and used by the system when determining how to customize a recommendation for a particular user. The rules described in the example of FIGS. 4A and 4B (e.g., a presumption that a developer knows how to import images without instruction, and a presumption that a designer would benefit from step by step guidance for importing images) are merely illustrative, and any types and any number of rules may be defined for use by the system in customizing the recommendations.

Autonomous Recommendations Based on Repetitive Actions

In accordance with aspects of the present disclosure, the autonomous advisor functionality provides autonomous recommendations to a user based on determining the user is performing repetitive actions that can be performed in a more efficient manner In embodiments and as previously described herein, the system continuously monitors the actions made by the user in the IDE (e.g., the event data). In embodiments, the system analyzes the event data to determine repetitive actions being performed by a user in the IDE, and automatically (or with user permission after prompt) refactors those repetitive actions into specific application components. The specific application components can include but are not limited to forms, master templates (e.g., masters), macros, widgets, services, etc.

As described herein, and with reference to the elements and architecture shown in FIG. 2A, the event queue manager 2060 manages communications between different modules of the IDE 2030 via events, and provides event information coupled with IDE context information in a structured object notation. As additionally described herein, the system continuously monitors every event (e.g., action) that a user performs in the IDE and analyzes the stream of events (e.g., using the event analytics engine 2070) to determine an intent of the user.

According to aspects of the present disclosure, the event analytics engine 2070 is configured to analyze the event data from the event queue manager 2060 to determine when a user is performing a repetitive action in the IDE. When the event queue manager 2060 determines a user is performing a repetitive action in the IDE, and when the determined insights reveal there is a less repetitive approach that satisfies the user's determined intent, then the recommendation engine 2090 makes a recommendation to the user via the bot user interface 2010 to use the less repetitive approach that satisfies the user's determined intent.

For example, the system may determine (e.g., from analyzing the user's event data from the event queue manager) that the user's intent is creating a scrollable form that implements product level detail, e.g., for an online shopping functionality of a digital app. In particular, the system may determine from the event data that the user has manually created source code for each of ten horizontal rows on each of three pages, where each row has the same type of widgets (e.g., an image widget, a ratings widget, and a product description widget). The system may determine from the insights that a less repetitive approach to satisfy this intent is to use a SegmentedUI widget that is available in the IDE and that includes multiple segments (rows or records), in which each segment (row or record) can have multiple child widgets, and which is adapted for menus and grouped lists. Based on these determinations, the system makes a recommendation to the user to use the SegmentedUI instead of manually creating the repetitive components of the scrollable form.

Figure 4C:
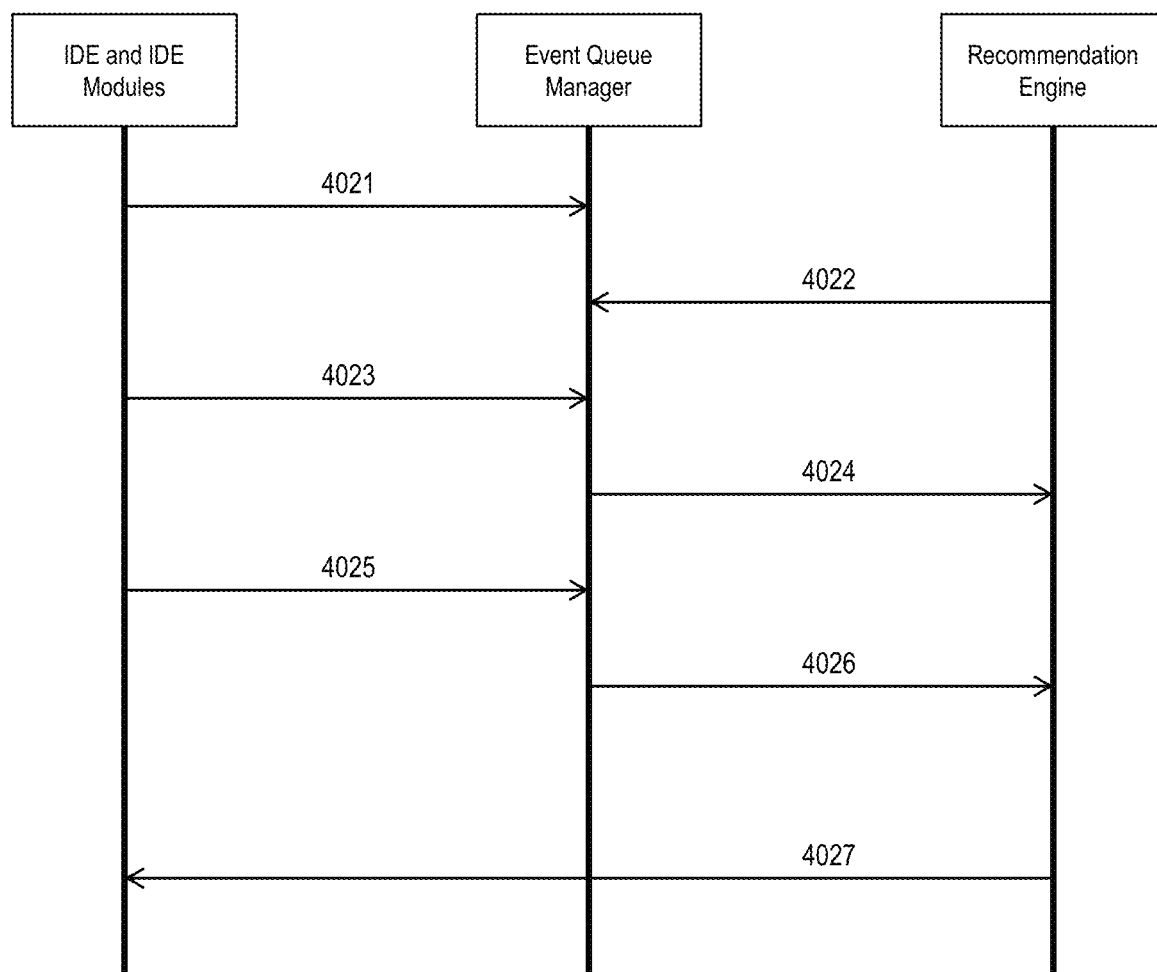
FIG. 4C shows a swim lane diagram illustrating exemplary processes in accordance with aspects of the present disclosure.

FIG. 4C shows a swim lane diagram illustrating a method in accordance with aspects of the present disclosure that are directed to autonomous recommendations based on repetitive actions. The steps of FIG. 4C may be carried out in the architecture of FIG. 2A and are described with reference to elements shown in FIG. 2A.

At step 4021, the IDE 2030 registers with the event queue manager 2060 as a source of all events in the event stream. At step 4022, the recommendation engine 2090 registers itself as a subscriber to all the events raised by the IDE 2030 (e.g., raised by the various modules and/or subsystems of the IDE). At step 4023, the event queue manager 2060 raises event "x" from the IDE 2030. At step 4024 and in response to step 4023, the event queue manager 2060 triggers event "x" to the recommendation engine 2090 including structured objects such as form, widget, service, code snippet, etc. At step 4025, the event queue manager 2060 again raises event "x" from the IDE 2030. At step 4026 and in response to step 4025, the event queue manager 2060 triggers event "x" to the recommendation engine 2090 including structured objects such as form, widget, service, code snippet, etc. At step 4027, the recommendation engine 2090 analyzes the repetitive sequential events (e.g., event "x"), and makes a recommendation to the user for a different approach that does not involve as many repetitive events. As described herein, the different approach may be determined based on the determined intent of the user and the insights determined from the big data. As described herein, the recommendation may be presented to the user in the IDE 2030 via the bot user interface 2010.

Autonomous Recommendations for Shortcuts

In accordance with aspects of the present disclosure, the autonomous advisor functionality provides autonomous recommendations for shortcuts to a user. In embodiments and as previously described herein, the system continuously monitors the actions made by the user in the IDE (e.g., the event data). Based on this monitoring, the system is configured to determine when a user repeats an action with a number of events when a shortcut (e.g., to perform the same action with less events) is available to be used. Based on this determining, the system automatically presents a recommendation to the user to use the shortcut.

Sometimes there are a plurality of different ways to perform the same function in the IDE. For example, a first approach for performing a certain task may involve the user performing a series of keystrokes and mouse input actions for navigating through the UI of the IDE. A second approach for performing the same task may involve the user initiating a macro programmed into the UI of the IDE, where the second approach is a shortcut because it involves less user input to perform the same task. In accordance with aspects of the present disclosure, the system monitors and analyzes the event data (e.g., from the event queue manager 2060) to determine when the user is repeatedly performing the first approach. In response to determining that the user is repeatedly performing the first approach, the system (e.g., the recommendation engine 2090) automatically generates a recommendation to the user to suggest using the second approach. As described herein, the recommendation may be presented to the user in the IDE 2030 via the bot user interface 2010.

Autonomous Recommendations to Automatically Complete

In accordance with aspects of the present disclosure, the autonomous advisor functionality provides autonomous recommendations to automatically complete actions for a user based on the determined intent of the user and the determined insights. In embodiments, the system recommends completing a user's action with a similar action that has been performed by another user.

As described herein, the system continuously monitors every event (e.g., action) that a user performs in the IDE and analyzes the stream of events (e.g., using the event analytics engine 2070) to determine an intent of the user. The intent may be, for example, to create a portion of a digital app such as a splash screen, an authentication field, etc. The intent may be determined before the user has performed all the actions to achieve the intent, in which case the system may determine (from the insights) how other users have achieved this same intent, and suggest one or more of these existing solutions to the current user.

Figure 4D:
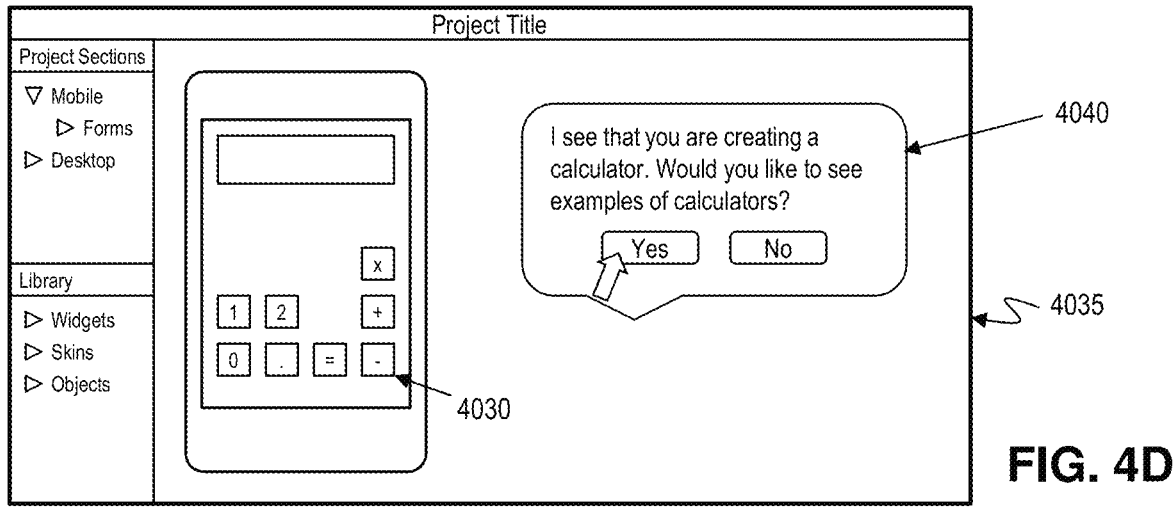
FIGS. 4D, 4E, and 4F illustrate providing autonomous recommendations to automatically complete actions in accordance with aspects of the present disclosure.
Figure 4E:
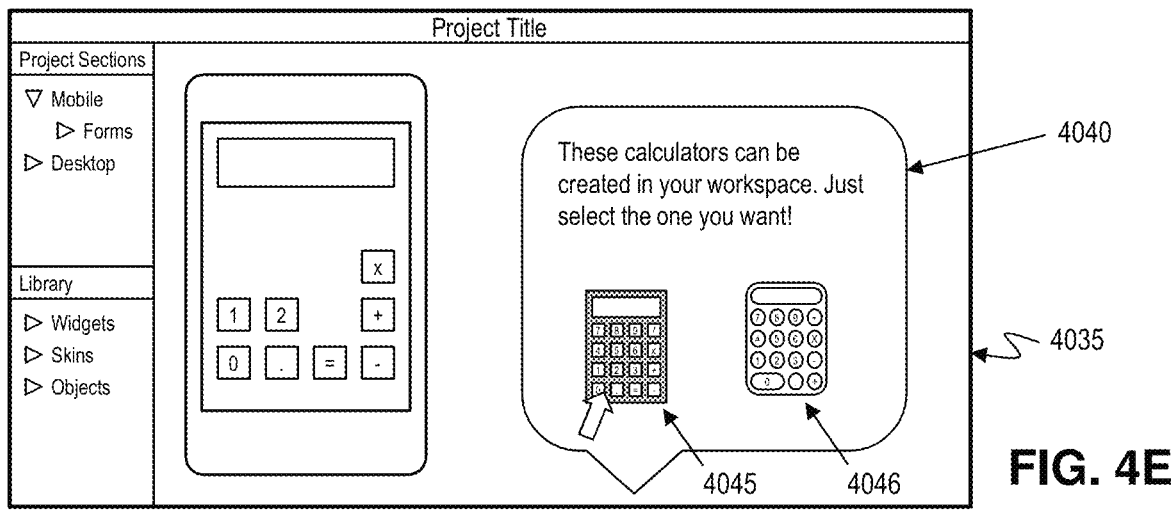
Figure 4F:
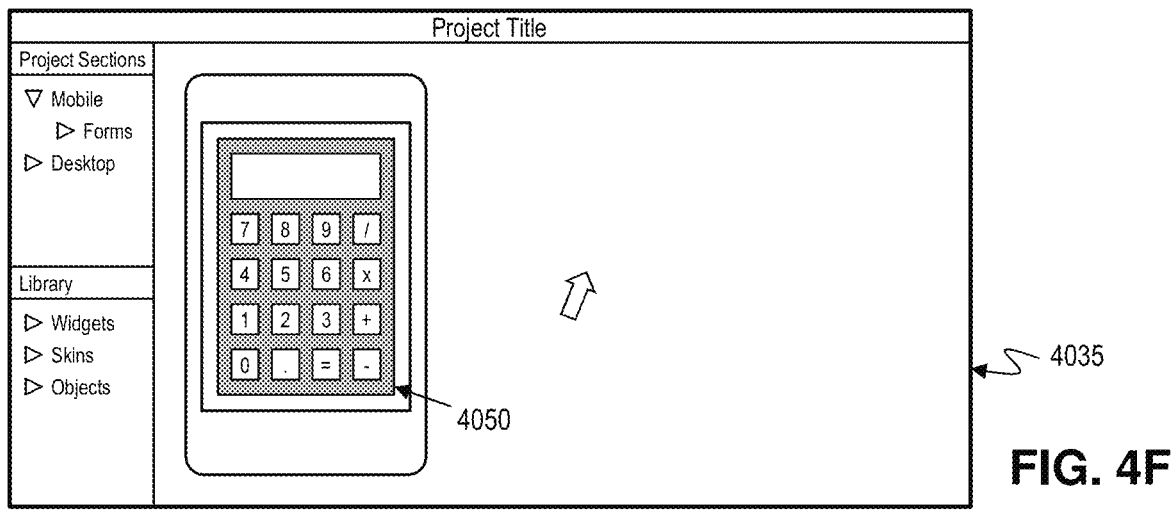

FIGS. 4D, 4E, and 4F illustrate this functionality. As shown in FIG. 4D, the user is creating a calculator 4030 in their workspace 4035 in the IDE, the calculator 4030 being only partially complete. Using the techniques described herein (e.g., analyzing the event data from the IDE using cognitive analysis and AI), the system may determine that the user's intent is to create a calculator. As shown in FIG. 4D, based on determining the user intent, the system may present a recommendation 4040 to the user to see examples of calculators. The recommendation 4040 may have fields for the user to provide input to accept or decline the recommendation.

In response to the user providing input to accept the recommendation 4040, then as shown in FIG. 4E the system may modify the recommendation 4040' to include images (e.g., thumbnails) 4045, 4046 of completed calculators that have been made by other users. The system may find the completed calculators in the big data (e.g., in the internal data of other users of the IDE), and may use the insights to determine which one or more completed calculators best matches this user's intent.

For example, the system may determine that plural apps published in a marketplace each include a calculator, and the system may obtain and analyze data about these plural apps in order to determine which one or more of the calculators to present to the user in the recommendation 4040'. As an illustrative example, such data might include: ratings data (e.g., number of stars out of five) of each of the apps from the marketplace; review data (e.g., user comments in text form) of each of the apps from the marketplace; similarity of appearance of each of the calculators (e.g., in the respective plural apps) to the calculator started and partially completed by the user (e.g., by comparing dimensions, spatial relations, colors, fonts, functions, etc., of objects, widgets, forms, etc., included each of in the calculators); social media posts that tag, like, dislike, thumbs-up, thumbs-down, or plus-one an image and/or a textual description of the calculator included one of the plural apps; and articles, blogs, forum discussions that include an image and/or a textual description of the calculator included one of the plural apps. Based on analyzing this data (or similar data) in the manner described herein (e.g., using cognitive analysis and/or AI techniques), the system may determine a relative score for each calculator in the respective plural apps, and may present a predefined number of the highest scoring calculators to the user in the recommendation 4040'.

As shown in FIG. 4F, based on the user selecting the image 4045 in the recommendation 4040', the system automatically replaces the user's partially complete calculator 4030 with a calculator 4050 that corresponds to the selected image 4045. In embodiments, the system is configured to automatically execute commands in the IDE to generate the objects included in the calculator 4050, such that the calculator 4050 is functional in the IDE in the same manner as if the user had constructed the calculator 4050 themselves in the IDE. In this manner, aspects of the present disclosure provide autonomous recommendations to automatically complete actions for a user based on the determined intent of the user.

Autonomous Recommendations to Revise

In accordance with aspects of the present disclosure, the autonomous advisor functionality provides autonomous recommendations to a user based on determining that a more appropriate component may be used in a project. As described herein, the big data that is analyzed to determine insights is dynamic as opposed to static. Since the big data may change over time, it follows that the determined insights may also change over time as a result of the changes to the big data. As a result, something that is determined as a best practice today may be superseded by a different best practice determined from the big data in the future.

In embodiments, the system is configured to continuously obtain new data in the set of big data, to continuously analyze the big data to determine new insights, and to determine whether any of the new insights apply to the user intent that was the basis of a previous recommendation. In embodiments, the system makes a new (e.g., revised) autonomous recommendation to a user in response to determining that a new insight applies to a user intent that was the basis of a previous recommendation.

To illustrate this functionality, consider the aforementioned example in which the user is manually creating source code for an app containing ten horizontal rows on each of three pages, where each row has the same type of widgets (e.g., an image widget, a ratings widget, and a product description widget). In this example, the system determined the user's intent is creating a scrollable form that implements product level detail. In this example, the system autonomously recommended using a SegmentedUI instead of manually creating the repetitive components of the scrollable form, e.g., based on a combination of the determined intent and the insights determined from the big data that existed at the time the recommendation was made. Continuing this example, consider the situation where the user accepts the recommendation by implementing a SegmentedUI in the app, and then completes and publishes the app. Sometime later, i.e., weeks or months after the app has been published, the system may determine a new insight that a different widget is the new best practice for achieving the user's intent. Based on this determined new insight, the system may make a new recommendation to the user to revise the app using the different widget.

The new recommendation may be presented to the user in a number of ways. For example, in one embodiment the system automatically presents the new recommendation to the user the next time the user logs in to the IDE after the determination of the new recommendation. In another embodiment, the system presents the new recommendation to the user by pushing an alert to the user via a communication channel outside the IDE, such as sending an email or a text message to the user. In this manner, implementations of the invention are configured to autonomously make revised recommendations to a user even after the user's app is completed, such that the user may choose to modify their app based on the new recommendation.

Other Autonomous Recommendations

In accordance with aspects of the present disclosure, the autonomous advisor functionality is configured to provide a "style advisor" recommendation in the IDE based on best practices learned from other apps. In embodiments, the system is configured to compare style aspects of a user's app in the IDE to best practices of these same style aspects learned from other apps (e.g., determined from analyzing the big data as described herein). The style aspects may include, for example, the size, placement, and intended use of elements within the app. For example, the system may determine from analyzing the event stream that an element displayed in the user app is intended to be reachable by a thumb of an end user using the app on their digital device. In this example, the system may compare the location of the element in this app to the location of similar elements in other apps, and determine based on this comparison that the element in this app should be moved to another location in order to more easily accessible by the thumb of the end user. The recommendation engine 2090 may generate this recommendation and the bot user interface 2010 may present the recommendation to the user. If the user provides user input to accept the recommendation, then the system may provide input to the IDE to change the user's app in accordance with the recommendation.

In accordance with aspects of the present disclosure, the autonomous advisor functionality is configured to provide a "style evaluator" recommendation in the IDE based on best practices learned from other apps. In embodiments, the system is configured to use pattern recognition to determine that a form included in a user app is similar to forms included in plural apps published in the marketplace. The system may obtain and analyze data about these plural apps in order to determine a respective efficiency score for each of the plural apps. The efficiency score may be determined based on cognitive analysis of data associated with each of the plural apps. As an illustrative example, such data might include: ratings data (e.g., number of stars out of five) of each of the apps from the marketplace; review data (e.g., user comments in text form) of each of the apps from the marketplace; social media posts that tag, like, dislike, thumbs-up, thumbs-down, or plus-one an image and/or a textual description of the form included one of the plural apps; articles, blogs, forum discussions that include an image and/or a textual description of the form included one of the plural apps; and metadata that defines a level of efficiency.

Based on analyzing this data (or similar data) in the manner described herein (e.g., using cognitive analysis and/or AI techniques), the system may determine an efficiency score for each form in the respective plural apps. In accordance with aspects of the present disclosure, the system determines an efficiency score of the form in the user's app by comparing aspects of the form in the user's app to the same or similar aspects in the forms of the plural apps, and by assigning score weightings based on the efficiency scores of the forms of the plural apps. For example, if an aspect of a form of the user's app is the same as an aspect of a form of one of the plural apps that has a high efficiency score, then this determination will increase the efficiency score of the user app. On the other hand, if an aspect of a form of the user's app is the same as an aspect of a form of one of the plural apps that has a low efficiency score, then this determination will decrease the efficiency score of the user app. In embodiments, the efficiency score of the user app, e.g., determined in this manner, may be visually displayed in the IDE (e.g., in the bot user interface 2010) as a needle or other gauge that indicates determined efficiency score.

In accordance with aspects of the present disclosure, the autonomous advisor functionality is configured to provide a "padding manager" recommendation in the IDE based on best practices learned from other apps. In embodiments, the system is configured to compare padding aspects of a user's app in the IDE to best practices of these same padding aspects learned from other apps (e.g., determined from analyzing the big data as described herein). The padding aspects may include, for example, the amount of space between objects displayed on a screen of a digital device running the app, the alignment of edges of objects displayed on a screen of a digital device running the app. In embodiments, the system is configured to determine a recommended change in one or more padding aspects of the user's app based on the comparing the padding aspects of a user's app project the best practices learned from other apps. The recommendation engine 2090 may generate a recommendation including the recommended change, and the bot user interface 2010 may present the recommendation to the user. If the user provides user input to accept the recommendation, then the system may provide input to the IDE to change the user's app in accordance with the recommended change.

In accordance with aspects of the present disclosure, the autonomous advisor functionality is configured to provide an "image advisor" recommendation in the IDE based on best practices learned from other apps. In embodiments, the system is configured to determine a category of an image in user's app in the IDE, and to compare the user's image to best practices of the determined category of images learned from other apps (e.g., determined from analyzing the big data as described herein). In embodiments, the system is configured to determine a recommended change to the user's image based on the comparing the user's image to images included in other apps that are in the same category as the user's image, wherein the images included in other apps are selected for comparison based on insights determined from the big data. The recommendation engine 2090 may generate a recommendation including the recommended change, and the bot user interface 2010 may present the recommendation to the user. If the user provides user input to accept the recommendation, then the system may provide input to the IDE to change the user's app in accordance with the recommended change.

In accordance with aspects of the present disclosure, the autonomous advisor functionality is configured to provide a "design time tester" recommendation in the IDE based on best practices learned from other apps. In embodiments, the system is configured to test the flow and execution of a user's app in the IDE, and to compare the flow and execution of the user's app to flow and execution of other apps. The flow and execution may include a quantitative measure of how an app flows from one field to another field, or between forms in the app. In embodiments, the system is configured to determine a recommended change to the user's app based on comparing the flow and execution of the user's app to the flow and execution of other apps, wherein the other apps are selected for comparison based on insights determined from the big data. The recommendation engine 2090 may generate a recommendation including the recommended change, and the bot user interface 2010 may present the recommendation to the user. If the user provides user input to accept the recommendation, then the system may provide input to the IDE to change the user's app in accordance with the recommended change.

In accordance with aspects of the present disclosure, the autonomous advisor functionality is configured to provide a "defect tracking" recommendation in the IDE based on best practices learned from other apps. In embodiments, the system is configured to run the user's app in the background of the IDE and determine the likelihood that there is a defect with a field included in the app by comparing the execution of the user's app to the execution of other apps. For example, a mismatched definition from the back end to the front end can cause a defect, and the system may be configured to detect this defect by comparing the runtime parameters of the user's app to the runtime parameters of other apps, wherein the other apps are selected for comparison based on insights determined from the big data. The recommendation engine 2090 may generate a recommendation including a recommended change to the user's app to fix a defect detected in this manner, and the bot user interface 2010 may present the recommendation to the user. If the user provides user input to accept the recommendation, then the system may provide input to the IDE to change the user's app in accordance with the recommended change.

In accordance with aspects of the present disclosure, the autonomous advisor functionality is configured to provide a "workflow assistant" recommendation in the IDE based on best practices learned from other apps. In embodiments, the system is configured to determine a referential integrity of a user's app in the IDE, and to compare the referential integrity of the user's app to the referential integrity of other apps. As used herein, referential integrity refers to a flow and efficiency of moving from one screen to another within an app. The referential integrity may be measured using qualitative means, quantitative means, or both. In embodiments, the system is configured to determine a recommended change to the user's app based on comparing the referential integrity of the user's app to the referential integrity of other apps, wherein the other apps are selected for comparison based on insights determined from the big data. The recommendation engine 2090 may generate a recommendation including the recommended change, and the bot user interface 2010 may present the recommendation to the user. If the user provides user input to accept the recommendation, then the system may provide input to the IDE to change the user's app in accordance with the recommended change.

In accordance with aspects of the present disclosure, the autonomous advisor functionality is configured to provide a "standards adherence" recommendation in the IDE based on best practices learned from other apps. In embodiments, the system is configured to analyze a user's app in the IDE for adherence to a standard by comparing the source code of the user's app to data that defines a standard. The standard may be predefined by stored data. Additionally or alternatively, the standard may be determined based on insights determined from big data as descried herein. For example, the system may use big data analytics as described herein to determine that a particular existing app is highly regarded as adhering to a particular standard. As another example, the system may analyze the code of plural published apps to determine insights (e.g., patterns, correlations, trends, and preferences) related to standards. The system may then compare the code of the user's app to the code of the particular existing app to determine where the user's app does not comply with the standard. The recommendation engine 2090 may generate a recommendation including a recommended change to the user's app to bring the user's app into compliance with the standard, and the bot user interface 2010 may present the recommendation to the user. If the user provides user input to accept the recommendation, then the system may provide input to the IDE to change the user's app in accordance with the recommended change.

In accordance with aspects of the present disclosure, the autonomous advisor functionality is configured to provide a "DevOps Advisor" recommendation in the IDE based on insights determined from the big data. In embodiments, the DevOps Advisor recommendation includes a recommendation of one or more tools for the user to utilize in creating their app in the IDE. Numerous software tools may be used in conjunction with the IDE when creating an app in the IDE. Such tools can be categorized as either supported or non-supported. Supported tools are those tools that are supported by the IDE, whereas non-supported tools are those that are not supported by the IDE but nevertheless can be used to perform functions that are utilized in creating an app in the IDE. Examples of functions provided by such tools include: editors, debuggers, formatting beautifiers, dependency managers, update monitors, etc.

In embodiments, the system identifies supported tools and non-supported tools and their respective functions by analyzing the big data as described herein (e.g., using cognitive analysis and/or AI). For example, the system may use cognitive analysis to analyze data from websites, blogs, forums, published articles, comments, etc., to determine the functions for which different tools are being used by other users when creating apps. As another example, the system may analyze operating system data on a computer of another user to identify a tool that was used by the other user concurrently with the other user working in the IDE, and the system may analyze the app created by the other user in the IDE to determine a function for which the tool was used in creating the app. The operating system data may include, for example: process execution trees; thread trees; CPU usage; and memory usage.

In embodiments, the system also determines one or more intents of a user creating an app in the IDE, e.g., in the manner already described herein. According to aspects of the present disclosure, the system compares the user intent to the functions of the identified tools and, based on this comparison, makes a recommendation to the user to use a particular tool to achieve the user intent. The recommendation engine 2090 may generate a recommendation including the recommended tool and function, and the bot user interface 2010 may present the recommendation to the user. The recommendation may include information on how to obtain the recommended tool, e.g., by indicating menu commands to access the recommended tool in the IDE; by suggesting upgrading a subscription to the platform to obtain access to a subscription tier that includes the recommended tool; or by providing a link (e.g., a hyperlink) to a website where the recommended tool is available.

In accordance with additional aspects of the present disclosure, the autonomous advisor functionality is configured to provide a "refactoring" recommendation in the IDE based on best practices learned from other apps. In embodiments, the system is configured to determine a complexity of the source code of a user's app in the IDE by comparing the source code to standards and/or best practices learned from other apps. The standards may be predefined by stored data. The best practices may be determined based on insights determined from big data as descried herein. For example, the system may use big data analytics as described herein to determine that a particular existing app is highly regarded having an optimal level of complexity. As another example, the system may analyze the code of plural published apps to determine insights (e.g., pat patterns, correlations, trends, and preferences) related to complexity. The system may then compare the code of the user's app to the predefined standards and/or the code of the existing apps to determine where the code of the user's app is too complex. The recommendation engine 2090 may generate a recommendation including a recommended change refactor the code of the user's app to achieve the same functionality with less complexity. The bot user interface 2010 may present the recommendation to the user. If the user provides user input to accept the recommendation, then the system may provide input to the IDE to change the user's app in accordance with the recommended change. Examples of refactoring that may be recommended include replacing manually created source code with pre-defined widgets and/or predefined function calls.

In accordance with additional aspects of the present disclosure, the autonomous advisor functionality is configured to provide a "performance" recommendation in the IDE based on best practices learned from other apps. In embodiments, the system is configured to determine the performance of a user's app in the IDE, and to compare the performance of the user's app to performance of other apps. As used herein, performance refers to how the app is initializing and executing, and may include quantitative measures of how the app transitions from one screen to another, the latency of operations, etc. In embodiments, the system is configured to determine a recommended change to the user's app based on comparing the performance of the user's app to the performance of other apps, wherein the other apps are selected for comparison based on insights determined from the big data. The recommendation engine 2090 may generate a recommendation including the recommended change, and the bot user interface 2010 may present the recommendation to the user. If the user provides user input to accept the recommendation, then the system may provide input to the IDE to change the user's app in accordance with the recommended change.

In accordance with additional aspects of the present disclosure, the autonomous advisor functionality is configured to provide a "code cleanup" recommendation in the IDE based on best practices learned from other apps. In embodiments, the system is configured to continuously monitor a state of the code of a user's app in the IDE, and to autonomously recommend code cleanup processes based on the monitoring. Code cleanup as used herein refers to fixing code that generates warnings and fixing stylistic errors (e.g., beautify the layout and/or formatting). Code cleanup may include linting. In embodiments, the system is configured to recommend a code cleanup of an app in the IDE based on comparing the code of the user's app to the code of other apps, wherein the other apps are selected for comparison based on insights determined from the big data. The recommendation engine 2090 may generate a recommendation including the recommended action (e.g., code cleanup), and the bot user interface 2010 may present the recommendation to the user. If the user provides user input to accept the recommendation, then the system may provide input to the IDE to automatically begin the code cleanup process.

In accordance with additional aspects of the present disclosure, the autonomous advisor functionality is configured to provide a "feature request advisor" recommendation in the IDE based on analyzing the usage of users in the IDE. In embodiments, the system is configured to identify and analyze dead-ended processes and unfinished projects in the IDE, and to identify and recommend features to add to the IDE based on this analysis. In embodiments, the system analyzes data logs in the IDE, i.e., those data logs associated with dead-ended processes and unfinished projects of many users using the IDE. In embodiments, the system also analyzes big data such as user comments about their dead-ended processes and unfinished projects, client feature requests, etc. Based on this analysis, the system identifies functionalities that users want in the IDE but that are not currently available in the IDE. In embodiments, the system is configured to provide a recommendation to platform curators to add the identified functionalities.

In accordance with additional aspects of the present disclosure, the autonomous advisor functionality is configured to provide a "newsletter" recommendation to a user of the IDE based on the user's determined persona and insights determined from big data as described herein. In embodiments, the system categorizes determined best practices according to the set of personas (e.g., designer, developer, business owner, sales, marketing, platform, etc.). Any desired rules may be used to implement such categorization.

In embodiments, the system periodically (e.g., monthly) pushes a newsletter to the users associated with each persona, the newsletter for each respective persona identifying newly determined best practices associated with that respective persona.

Conversational Bot App Developing

The architecture 2000 may include a conversational bot app designing functionality that is configured to create an app in the IDE based on user voice commands In embodiments, the conversational bot app designing functionality is configured to: receive voice commands from a user (e.g., via a user device); determine an intent of the user based on analyzing the voice commands; perform actions in creating an app in a background instance of the IDE based on a combination of the determined user intent and determined insights (e.g., from big data); present the results of the actions to the user device for review by the user; receive feedback from the user (via the user device) regarding the presented results; determine an intent of the user based on analyzing the feedback; perform additional actions in revising the app in the background instance of the IDE based on a combination of the determined user intent and determined insights; and present the results of the actions to the user device for review by the user. The process may iterate in this manner any number of times until the user is satisfied with the app that is created by the system based on the user input at the user device. In this manner, implementations of the invention provide a system and method for user to create apps via voice command using their user device (e.g., smartphone) without requiring the user to provide input via a graphical user interface (GUI) of the IDE.

Figures 4G, 4H:
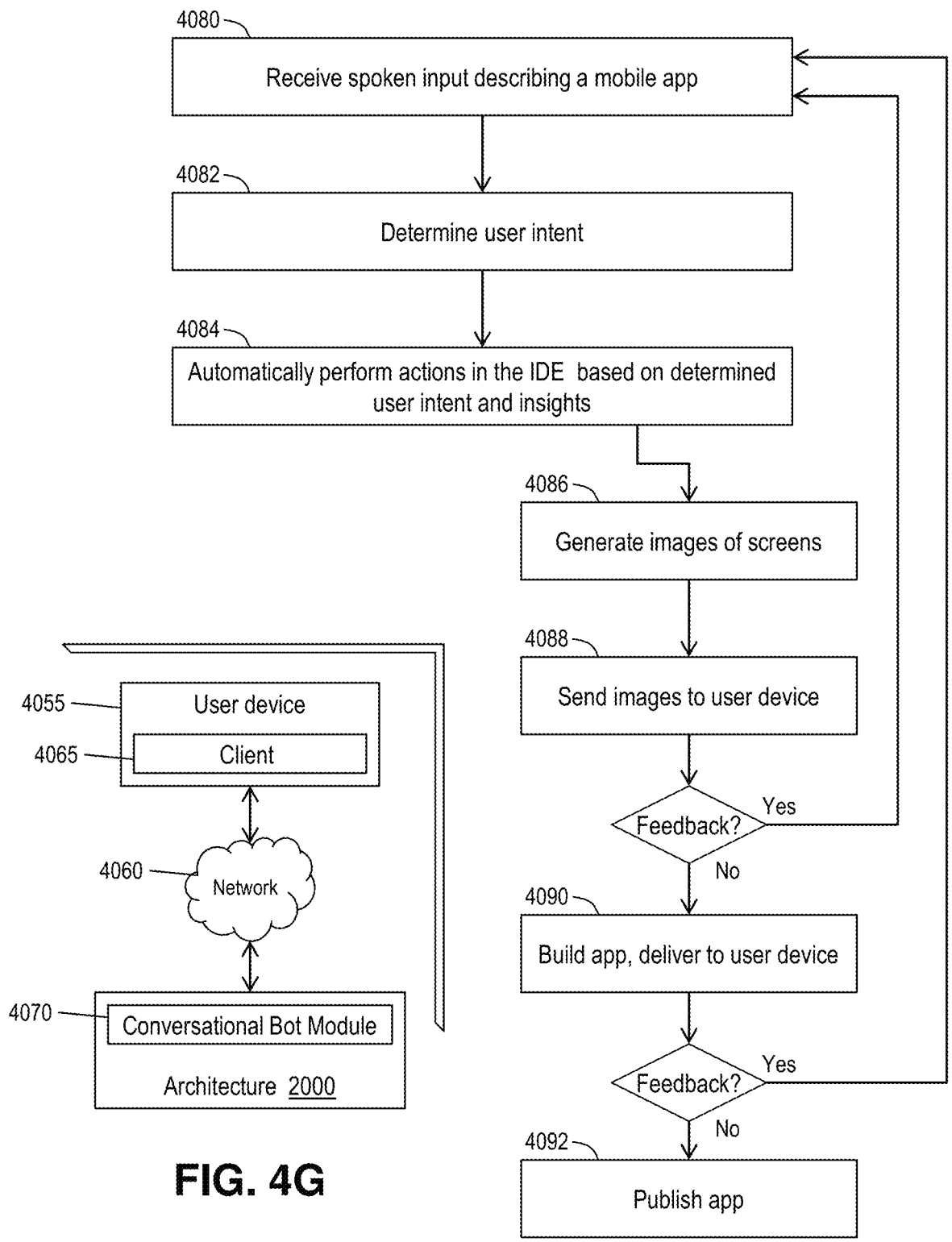
FIG. 4G shows an illustrative environment in accordance with aspects of the present disclosure.
FIG. 4H shows a flowchart of exemplary processes for conversational bot app developing in accordance with aspects of the present disclosure.

FIG. 4G shows an illustrative environment in accordance with aspects of the present disclosure. The environment includes the architecture 2000 of FIG. 2A in communication with a user device 4055 via a network 4060. The network 4060 may comprise any combination of communications networks including one or more of a LAN, WAN, and the Internet. For example, the network 4060 may comprise the cloud computing environment 1100 of FIG. 1B, and the architecture 2000 and user device 4055 may be cloud computing nodes 1110 as described with respect to FIG. 1B.

The user device 4055 may be a general purpose computer device such as a smartphone, tablet computer, laptop computer, desktop computer, etc. In embodiments, the user device 4055 has a client 4065 installed thereon, the client 4065 being a program module that is configured to access the services provided by the architecture 2000. In embodiments, the IDE is not run on the user device 4055, and instead is run as Software as a Service (SaaS) in the architecture 2000.

In embodiments, the architecture 2000 includes a conversational bot module 4070 that is configured as an interface between the client 4065 of the user device 4055 and the other elements of the architecture 2000. In embodiments, the conversational bot module 4070 comprises one or more program modules in the program control 1044 of the computing device 1014 as described with respect to FIG. 1A. In embodiments, the bot module 4017 can be representative of the bot user interface 2010 under control of the bot manager 3565. In alternative or additional embodiments, the conversational bot module can be representative of any of the registered bots including, e.g., autonomous bot 3520, third-party bot(s) 3530, market place bot 3540 and/or help bot 3550.

FIG. 4H shows a flowchart of an exemplary method for conversational bot app developing in accordance with aspects of the present disclosure. The steps of the method of FIG. 4H may be carried out in the environment of FIG. 4G and are described with reference to the elements depicted in FIG. 4G. At step 4080, the user device 4055 receives spoken input from the user, e.g., via a microphone connected to or integrated with the user device 4055. The spoken input may comprise, for example, a verbal description of aspects of an app that the user wishes to create in the platform associated with the architecture 2000. For example, the user can verbally describe aspects, components, and functionality of the app, such as "start with a blue splash screen with the enterprise logo and app name, then transition to a login screen with a login object for a user to enter their credentials, then transition to a home screen with a menu containing . . . " The client 4065 transmits the spoken input to the conversational bot module 4070 via the network 4060. For example, the client 4065 may transmit audio data of the spoken input. Alternatively, the client 4065 may convert the audio data of the spoken input to text data using speech to text techniques, and then transmit the text data to the conversational bot module 4070.

At step 4082, the system determines an intent of the user based on the spoken input. In one embodiment, the conversational bot module 4070 converts the spoken input to a format that is usable by the other elements of the architecture 2000 to determine an intent of the user. For example, the conversational bot module 4070 may use NLP to convert the spoken input to data that represents events that are useable by the event analytics engine 2070 and the event AI/NLP engine 2080 (included in the architecture 2000) to determine an intent of the user in the manner described herein. In another embodiment, the conversational bot module 4070 is configured to perform cognitive analysis and/or AI processes to determine a user intent in a manner similar to that described with respect to the event analytics engine 2070 and the event AI/NLP engine 2080, but without passing the spoken input data to the event analytics engine 2070 and the event AI/NLP engine 2080.

At step 4084, the system automatically performs actions in the IDE based on the determined user intent and insights. In embodiments, the user intent that is determined as a result of the spoken input is provided to the recommendation engine 2090 (included in the architecture 2000), which determines actions to take in the IDE (running in the architecture 2000) to achieve the user intent. In embodiments, and as described herein, the actions determined by the recommendation engine 2090 are based on insights determined from big data. In this manner, the system determines the user's intent from the spoke input, and determines actions to take in the IDE to achieve the intent, wherein the actions are determined based on insights (e.g., patterns, correlations, trends, and preferences) derived from analyzing the ways that others are using the IDE.

Still referring to step 4084, in accordance with aspects of the present disclosure, the recommendation engine 2090 causes the determined actions to be performed in the IDE, e.g., via the control loop to the visualizer enhanced event engine 2040 and IDE 2030 as depicted in the architecture 2000 shown in FIG. 2A. For example, the recommendation engine 2090 may cause the IDE to create screens, objects, widgets, etc., in an app project in the IDE, wherein the screens, objects, widgets, etc., are determined based on the user's intent determined from the spoken input and the insights determined from big data.

According to aspects of the present disclosure, the conversational bot module 4070 is configured to provide data to the client 4065 to present the user with a visual representation of actions that were performed in the IDE based on the user's spoken input. For example, as depicted at steps 4086 and 4088, the conversational bot module 4070 may generate and send to the user device screen shots of what the app looks like when running. As another example, as depicted at step 4090, the conversational bot module 4070 may build the app and send a beta version of the app to the user device 4055 so that the user can install and run the beta version of the app on the user device 4055 for testing the app on the user device 4055.

In embodiments, the conversational bot module 4070 is configured to receive feedback from the user via the user device 4055 and to modify or revise the app in the IDE (running in the architecture 2000) based on the feedback. For example, after either of steps 4088 and 4090, the process may return to step 4080 where the user may provide additional spoken input to the user device 4055 after reviewing aspects of the app on the user device 4055. The client 4065 may transmit this additional spoken input to the conversational bot module 4070, which may determine user intent from the additional spoken input in the manner described herein. Based on the user intent determined from the additional spoken input, the system may determine and perform additional actions in the IDE, i.e., to revise the app in the IDE based on the additional spoken input. In this manner, the system provides an iterative process by which the system receives user spoken input, determines intent of the spoken input, performs actions in creating the app in the IDE based on the determined intent, and presents the results of the actions to the user for review. This iterative process can continue until the user is satisfied with the app, at which point the system can automatically publish the app to the marketplace on behalf of the user, e.g., as indicated at step 4092.

Systems and Methods of Converting Actions Based on Determined Personas (Users)

As described in the previous section, in one embodiment, the system is configured to determine a persona of a user that is working in the UI of the IDE. In accordance with aspects of the present disclosure, the system monitors all actions performed by each user in the IDE and stores and aggregates the actions of all users according to category of persona. For example, when the system determines that a user has the persona of designer, the system saves a record of all this user's actions in a record of designer actions. The system does the same for all other users that are determined as designers, so that the record of designer actions is a stored record of all actions performed by all designers in the IDE (e.g., an aggregate record of all the designer actions). In embodiments, the system does the same for each category of persona, such that there is a record of developer actions of all actions performed by all developer personas in the IDE (e.g., an aggregate record of all the developer actions), a record of sales actions of all actions performed by all sales personas in the IDE (e.g., an aggregate record of all the sales actions), etc.

It is often the case with an app project that different users having different personas work on the same app project at different times. It is often the case that the different users having different personas perform different actions in the IDE when they are working on the app project. For example, a designer may start the app project using designer actions such as action editor actions, which are no-code actions that define how an asset moves on a screen in the app. The designer actions are used in the IDE for demonstrating how assets will behave in the app; however, the designer actions are not usable in the end-product app (e.g., the designer actions are not executable in a deployed app). For this reason, the designer may then hand the app project off to a developer who performs developer actions such as writing code to achieve desired aspects (e.g., functions) that are defined by the designer actions. For example, the developer uses the designer actions as a guide for the work that the developer performs with developer actions, i.e., coding. For example, the developer may observe the app functions defined by the designer actions and the write code to implement these functions in the app.

In accordance with aspects of the present disclosure, the system determines when the app project is passed from a first user having a first persona to a second user having a second persona, and based on this determination the system automatically converts actions that are specific to the first persona to actions that are specific to the second persona. For example, the system may determine that the app project has been passed from a designer to the developer. Based on this determination, the system may automatically convert the designer actions in the app project to developer actions. For example, the system may convert designer actions to developer actions (e.g., code such as JavaScript code) that achieve the functions defined by the designer actions. In this manner, the system automatically converts the actions for the subsequent user.

The conversion of actions from those of a first persona to those of a second persona may be performed using predefined rules and stored associations between the two different types of actions. For example, Kony Visualizer® by Kony, Inc. has a menu function that operates to convert designer actions to developer actions. Similar functions can be programmed for converting actions between any two personas, such as from designer to sales, from developer to sales, from developer to designer, etc. Aspects of the present invention perform the conversion automatically in response to determining that a designer user has passed the project to a developer user. In this manner, the system advantageously converts the actions for the subsequent user without requiring the user to navigate menu functions to do so.

Figure 5A:
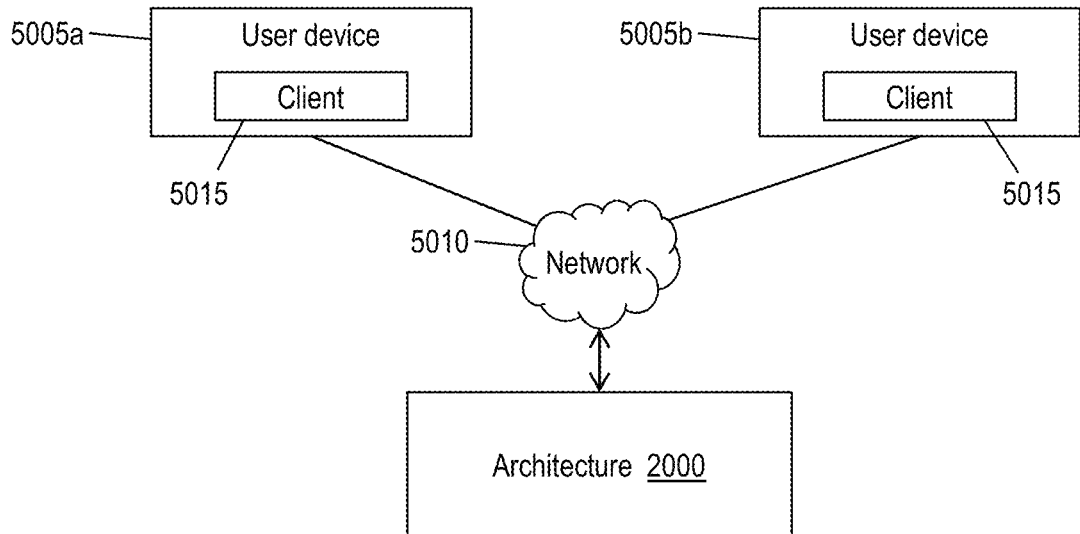
FIG. 5A shows an exemplary computing environment in accordance with aspects of the present disclosure.

FIG. 5A shows an exemplary computing environment in accordance with aspects of the present disclosure. The environment includes the architecture 2000 of FIG. 2A in communication with user devices 5005a and 5005b via a network 5010. The network 5010 may comprise any combination of communications networks including one or more of a LAN, WAN, and the Internet. For example, the network 5010 may comprise the cloud computing environment 1100 of FIG. 1B, and the architecture 2000 and user devices 5005a-b may be cloud computing nodes 1110 as described with respect to FIG. 1B.

The user device 5005a-b may be a general purpose computer device such as a smartphone, tablet computer, laptop computer, desktop computer, etc. In embodiments, each of the user devices 5005a-b has a client 5015 installed thereon, the client 5015 being a program module that is configured to access the services provided by the architecture 2000. In embodiments, the client 5015 permits the user devices 5005a-b to log into the IDE that is run as Software as a Service (SaaS) in the architecture 2000.

In this example, the user device 5005a is used by a first user who is a designer that works on an app project via the UI of the IDE (e.g., IDE 2030 of the architecture 2000 as described with respect to FIG. 2A). In embodiments, and as described in the previous section titled AUTONOMOUS ADVISOR, the system (e.g., the architecture 2000) determines the first user's persona either from an indication by the user of by analyzing the user's actions in the IDE.

Continuing the example of FIG. 5A, the user device 5005b is used by a second user who is a developer that works on the same app project as the first user, but at a time different than that of the first user. For example, the first user may perform designer actions in the app project and then save and close the project in the IDE. After this, the second user may open the same app project in the IDE and begin performing their respective developer actions in the app project.

In accordance with aspects of the present disclosure, based on determining that the first user has a first persona and that the second user has a second persona different than the first persona, the system automatically converts actions associated with the first persona to actions associated with the second persona. In embodiments, the system presents the second user with a recommendation via the bot user interface 2010 of FIG. 2A and provides the second user with an option to accept the recommendation.

Figure 5B:
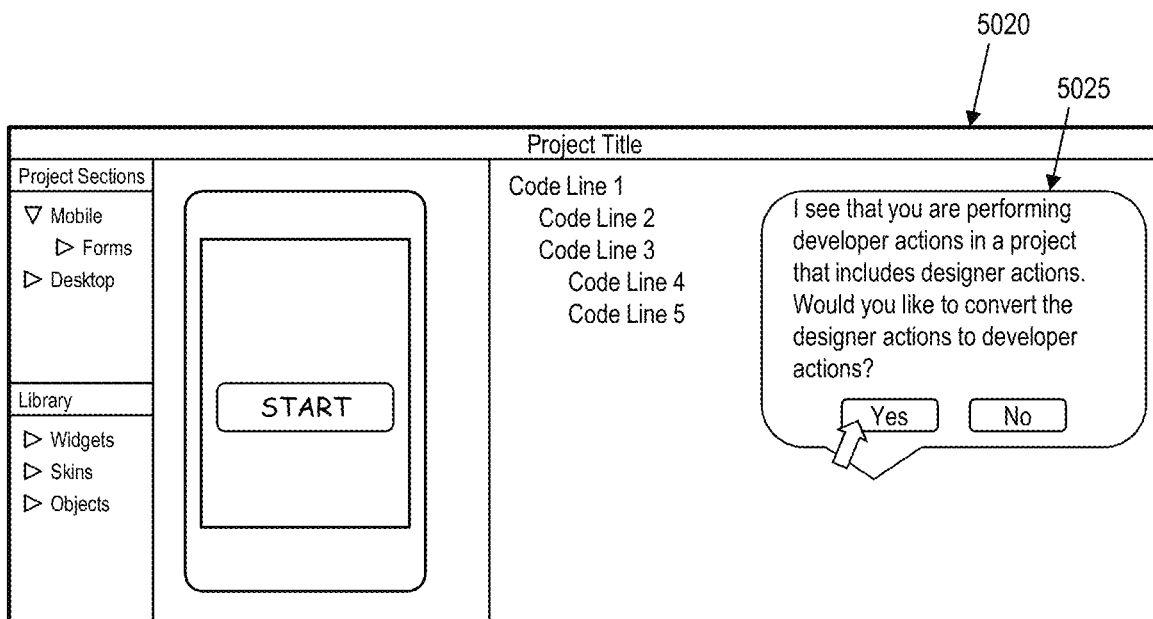
FIG. 5B shows an exemplary user interface illustrating a function in accordance with aspects of the present disclosure.

For example, as shown in FIG. 5B, the system may cause the UI 5020 of the IDE displayed at the second user device 5005b to present the recommendation 5025 in the form of a chat window. The chat window may include user input fields (e.g., 'Yes' and 'No' buttons in this example) that permit the second user to accept or decline the recommendation. In this manner, the system automatically determines that a user with a different persona is working with an app project and, based on this determination, automatically makes a recommendation to the user to convert the actions of a previous user to actions that are associated with the persona of the second user.

Figure 5C:
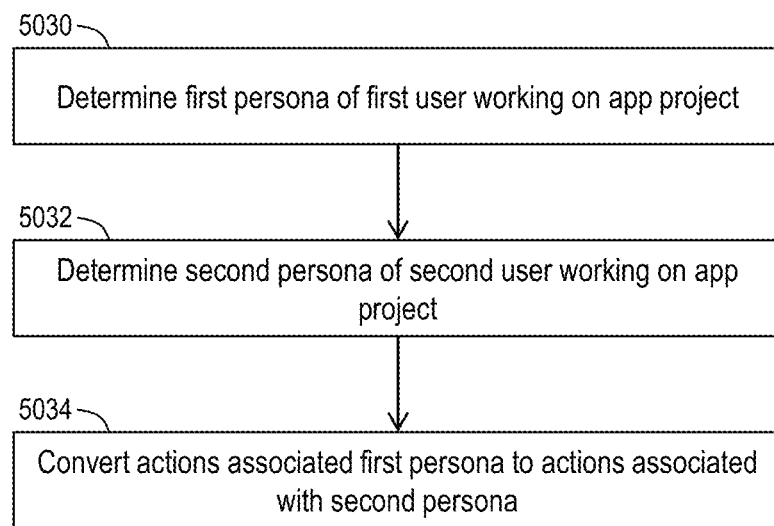
FIG. 5C shows a flowchart of steps of exemplary processes in accordance with aspects of the present disclosure.

FIG. 5C shows a flow chart of steps of an exemplary method in accordance with aspects of the present disclosure. At step 5030, the system determines a first persona of a first user working on an app project in the IDE. In embodiments, and as described in the previous section titled AUTONOMOUS ADVISOR, the system (e.g., the architecture 2000) determines the first user's persona either from an indication by the user of by analyzing the user's actions in the IDE.

At step 5032, the system determines a second persona of a second user working on the same app project in the IDE (i.e., the same app project as at step 5030). In embodiments, and as described in the previous section titled AUTONOMOUS ADVISOR, the system (e.g., the architecture 2000) determines the second user's persona either from an indication by the user of by analyzing the user's actions in the IDE.

At step 5034, the system automatically converts actions associated first persona to actions associated with second persona. For example, as described herein, the system may automatically convert designer actions (e.g., action editor actions) performed by the first user to developer actions (e.g., coding such as JavaScript coding) for user by the second user.

Step 5034 may include presenting the recommendation to the second user via the bot user interface. For example, as shown in FIG. 5B, the system may present a recommendation 5025 to the second user in a chat window of the UI 5020. The recommendation may include an explanation of the proposed conversion. The recommendation may include user input fields (e.g., 'Yes' and 'No' buttons in this example) that permit the second user to accept or decline the recommendation. In response to the second user providing user input to accept the recommendation (e.g., selecting the 'Yes' button in this example), the system automatically converts the actions associated with the first persona to actions associated with the second persona, after which the second user may continue working on the app project in the UI of the IDE. As an example of a conversion, the system may automatically generate code in the IDE that corresponds to an object that was defined using action editor actions. In this manner, the system may convert the first action (e.g., the object defined using action editor actions) to a second action (e.g., code in the IDE that defines a functional instance of the object defined using action editor actions).

Figure 5D:
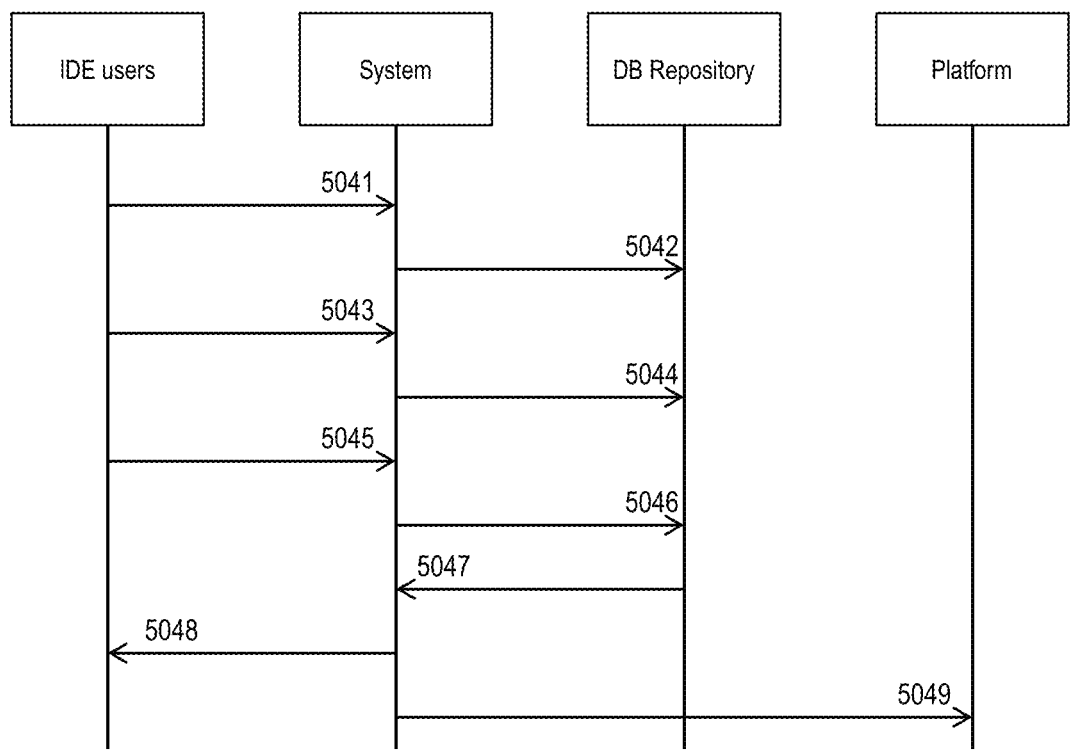
FIG. 5D shows a swim lane diagram of exemplary processes in accordance with aspects of the present disclosure.

FIG. 5D shows a swim lane diagram of an exemplary method in accordance with aspects of the present disclosure. In accordance with aspects of the present disclosure, and as described in this section, there is a system and method to capture and aggregate multi-role user actions (designers, developers or other types) performed within a platform into a data repository and performing analytics capable of determining future enhancements needed to that platform.

As described herein, a same IDE is commonly used by different personas such as UI designers, Developers, Sales and Marketing Teams, Support teams, Product managers, etc. For example, designers mostly perform actions related to the IDE canvas, developers mostly perform actions related to source code modules, and sales personas, marketing personas, and product manager personas commonly use functional preview actions in the IDE. In accordance with aspects of the present disclosure, the system may monitor a user's actions in the IDE and determine a persona of the user based on typical patterns of that persona, e.g., by analyzing the user's actions in the IDE as described herein. In embodiments, the system automatically adjusts the UI based on the characteristics the user is demonstrating.

With continued reference to FIG. 5D, the recommendation engine registers itself as a subscriber to all the events raised by various sub-systems of the IDE. Based on this, the recommendation engine receives various user actions information in a structured format, e.g., in the manner described with respect to FIG. 4C. In embodiments, the system monitors all user actions and preserves a record of the actions in a database (DB) repository. In embodiments, the system analyzes all the actions performed by users of different personas and adjust the UI of the IDE depending on the user's persona. In embodiments, based on the analyzing the actions performed by users of different personas, the system determines and sends recommendations for platform enhancements ideas to platform curators.

In the example shown in FIG. 5D, at step 5041, the system (e.g., the architecture 2000) receives an action performed in the UI of the IDE by a first user having a determined first persona (e.g., a designer). At step 5042, the system stores data defining the action and the persona (of step 5041) in the DB repository.

At step 5043, the system receives an action performed in the UI of the IDE by a second user having a determined second persona (e.g., a developer). At step 5044, the system stores data defining the action and the persona (of step 5043) in the DB repository.

At step 5045, the system receives an action performed in the UI of the IDE by a third user having a determined third persona (e.g., sales). At step 5046, the system stores data defining the action and the persona (of step 5045) in the DB repository.

In embodiments, the system performs this pair of steps (e.g., 5041/5042) repeatedly and continuously for plural users interacting with the IDE. For example, plural users around the globe may be simultaneously using the IDE for different projects, and the system performs this pair of steps for each action of each user. Moreover, in embodiments, the system aggregates actions of users of the same persona. For example, the system stores actions performed by all designers in a designer record, actions performed by all designers in a developer record, and actions performed by all sales users in a sales record.

At step 5047, the system reads information from the DB repository. In embodiments, the system reads the data for all actions of one or more of the defined personas. For example, the system may read the data defining all the actions performed by all users determined to be a developer.

At step 5048, the system presents an appropriate UI in the IDE of a particular user, based on the determined persona of the user and based on the data read at step 5047. In this manner, the UI may be customized based on the persona of the user using the UI. The customization may include, for example, converting actions of first persona to actions of a second persona.

At step 5049, the system performs analytics on the data obtained at step 5047, and determines and sends recommendations for changes to the platform. For example, the system may be configured to analyze the data from step 5047 and determine features (e.g., functionality) to add to the IDE based on this analysis. The recommendations may be transmitted to users who are responsible for platform issues.

System and Method of Generating Actionable Intelligence Based on Platform and Community Originated Data As described herein, aspects of the present disclosure involve analyzing the actions of individual platform users and community data, and performing automated functions based on insights determined from the analyzing. For example, the system may collect and analyze big data including both internal data (e.g., platform data gathered from other users working with instances of the IDE that are connected to the IDXDP) and external data (e.g., community data obtained using data mining, web scraping, etc., of publicly available (e.g., Internet) data and/or enterprise data from other third party applications). In accordance with aspects of the present disclosure, the system uses cognitive analysis techniques (e.g., NLP, sentiment analysis, etc.) and AI techniques (e.g., machine learning, neural networks, etc.) to analyze the big data to determine insights about how users are using the IDE and what people are saying about the IDE, the platform, apps made using the IDE, etc. In accordance with embodiments described in this section, the system performs automated functions based on such insights, the functions including: updating support documentation associated with the platform; identifying product features; and identifying sales leads.

Updating Support Documentation

In accordance with aspects of the present disclosure, the system monitors and analyzes community data and provides recommendations to update support documentation based on the community data. This function may be performed, for example, using the training/support optimization module 1235 described with respect to FIG. 1C. For example, in embodiments, the system monitors community data including but not limited to social media sources (user social media posts, comments, follows, likes, dislikes, etc.) and social influence forums (e.g., user comments at online blogs, user comments in online forums, user reviews posted online, etc.). In aspects, the system collects and analyzes such community data to determine insights such as questions that are asked in the community data and, when available, answers that are provided to the questions.

For example, the system may determine, by analyzing data from one or more forums, that plural users have a common question about performing the same task in the IDE (e.g., IDE 2030 as described with respect to FIG. 2A). The forums may include forums that are internal to the platform and/or third party forums that are external to the platform (e.g., Stack Overflow, AllAnswered, etc.). One or more components of the system, such as the event AI/NLP engine 2080, may obtain the data from the forum(s) using methods described herein (e.g., data mining, web scraping, etc.) and may analyze the data using methods described herein (e.g., cognitive analysis, machine learning, etc.). The determination of a common question may be based on NLP of user posts in the forum(s) to identify questions that have a same topic, number of views of such posts in the forum(s) by other users, etc. Based on determining that plural users have a common question about performing the same task in the IDE, the system may generate and present a recommendation to a user of the platform to provide an answer to the question. For example, the recommendation engine 2090 may generate the recommendation and cause the bot user interface 2010 to present the recommendation to a user having the persona of a platform curator. In response to receiving the recommendation, the user may at least one of: (i) post an answer to the question in one or more forums, and (ii) update the support documentation associated with the platform with an answer to the question.

Continuing the example of determining that plural users have a common question about performing the same task in the IDE, the system may be further configured to analyze the community data from the forum(s) to determine whether a community-accepted answer exists. For example, there may be many different threads in one or more forums that all deal with the same question (e.g., how to create particular object in an app), and there may be an answer to the question posted in one of the threads. Although the answer exists, it is only in a single thread and thus might not be seen by many users of the forum(s) unless they happen upon that single thread in that particular forum. Accordingly, aspects of the present disclosure mine the community data not only for common questions, but also for answers to common questions. The mining for answers may be performed in a similar manner as the mining for questions (e.g., using data mining, web scraping, etc., to collect data and using cognitive analysis to analyze the collected data). When the system determines that an answer to a question exists, the system may include both the question and the answer in the recommendation presented by the bot user interface 2010. In this manner, the user having the persona of a platform curator may choose how to utilize the determined answer in updating the support documentation for the platform.

In further aspects, the system is configured to automatically update at least one of the community data and the support documentation based on an answer determined as described herein. For example, alternatively to presenting the question and the answer in the recommendation presented by the bot user interface 2010, the system may instead automatically update the support documentation for the platform to include the question and answer. In this example, the platform may include an electronic version of a user manual, and the recommendation engine 2090 may automatically change data in the user manual to include the question and answer determined from the community data. In another example, the system may automatically post the answer in a community forum. For example, the system may have a bot account registered with a forum, and the recommendation engine 2090 may send data to the bot account that causes the bot account to post a reply to the question, wherein the reply includes the answer. This may be repeated for every thread in which the common question is identified.

Figure 6A:
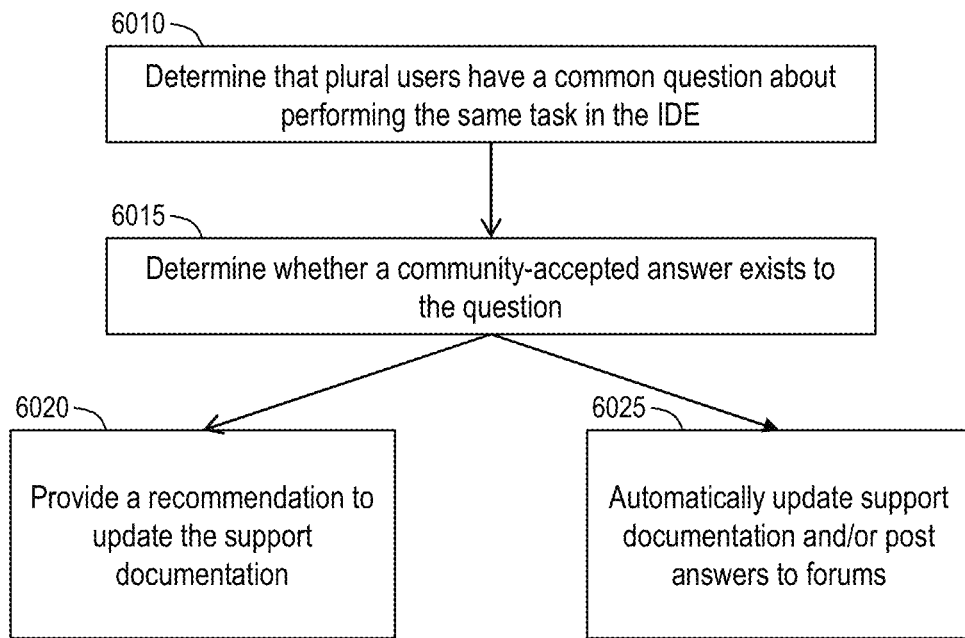
FIG. 6A shows a flowchart of exemplary processes in accordance with aspects of the present disclosure.

FIG. 6A shows a flowchart of an exemplary method for updating support documentation in accordance with aspects of the present disclosure. At step 6010, the system determines that plural users have a common question about performing the same task in the IDE. In embodiments, as described herein, this is performed by mining and analyzing community data, e.g., from one or more forums, to identify a common question.

At step 6015, the system determines whether a community-accepted answer exists to the question identified at step 6010. In embodiments, as described herein, this is performed by mining and analyzing community data, e.g., from one or more forums, to determine an answer to the identified common question.

In one embodiment, at step 6020, the system provides a recommendation to update the support documentation. In embodiments, as described herein, the recommendation may be provided to a user having the persona of a platform curator. The recommendation may be provided via the bot user interface and/or a push notification (e.g., email) The recommendation may include the determined question and the determined answer (if an answer was determined). The user having the persona of a platform curator may then utilize this information to update support documentation associated with the platform. For example, the user having the persona of a platform curator may update a user manual or frequently asked question (FAQ) that is available to users of the platform. As another example, the user having the persona of a platform curator may post messages to forums in response to the identified questions.

In another embodiment, at step 6025, the system automatically updates support documentation and/or posts an answer to the community. For example, as described herein, the system may automatically change data in a user manual to include the question and answer determined from the community data. In another example, the system may automatically post the answer in a community forum.

Identifying Product Features

In accordance with aspects of the present disclosure, the system monitors and analyzes community data and provides recommendations to identify product features based on the community data. This function may be performed at least in part by the product evolution module 1245 described with respect to FIG. 1C.

In embodiments, the system monitors community data including but not limited to social media sources (user social media posts, comments, follows, likes, dislikes, etc.) and social influence forums (e.g., user comments at online blogs, user comments in online forums, user reviews posted online, etc.). In aspects, the system collects and analyzes such community data to determine insights such as user-suggested features (e.g., functionalities) for the platform.

For example, the system may determine, by analyzing data from one or more forums, that plural users want a user-suggested feature that is not available in the IDE (e.g., IDE 2030 as described with respect to FIG. 2A). The forums may include forums that are internal to the platform and/or third party forums that are external to the platform (e.g., Stack Overflow, AllAnswered, etc.). One or more components of the system, such as the event AI/NLP engine 2080, may obtain the data from the forum(s) using methods described herein (e.g., data mining, web scraping, etc.) and may analyze the data using methods described herein (e.g., cognitive analysis, machine learning, etc.). The determination of a user-suggested feature may be based on NLP of user posts in the forum(s), number of views of such posts in the forum(s) by other users, etc. For example, the system may identify posts that say something to the effect of "I wish the IDE did function xyz" or "product abc really needs to do xyz." The system may also analyze how many views, replies, tags, likes, dislikes, thumbs-up, thumbs-down, or plus-ones are associated with such posts. Based on such data and analysis, the system may determine with a quantitatively determined measure of confidence that plural users want a user-suggested feature that is not available in the IDE.

Based on determining that plural users want a user-suggested feature that is not available in the IDE, the system may generate and present a recommendation to a user of the platform. For example, the recommendation engine 2090 may generate the recommendation and cause the bot user interface 2010 to present the recommendation to a user having the persona of a platform curator. In response to receiving the recommendation, the user may work with the platform development team in determining whether and how to add the user-suggested feature.

Figure 6B:
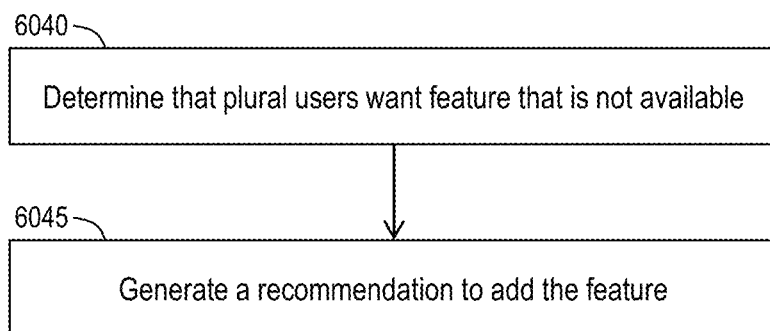
FIG. 6B shows a flowchart of exemplary processes in accordance with aspects of the present disclosure.

FIG. 6B shows a flowchart of an exemplary method for identifying product features in accordance with aspects of the present disclosure. At step 6040, the system determines that plural users want a user-suggested feature that is not available in the IDE. In embodiments, as described herein, this is performed by mining and analyzing community data, e.g., from one or more forums, to determine the user-suggested feature. At step 6045, the system generates a recommendation to add the user suggested feature to the IDE. In embodiments, as described herein, the system presents the recommendation to a user having the persona of a platform curator. In response to receiving the recommendation, the user may work with the platform development team in determining whether and how to add the user-suggested feature.

Identifying Sales Leads

In accordance with aspects of the present disclosure, the system monitors and analyzes platform data and/or community data and provides recommendations to identify sales leads based on the community data. This function may be performed at least in part by the improve sales efficiency module 1240 described with respect to FIG. 1C.

It is common for a service provider, such as an owner of a platform including an IDE, to permit access to the IDE on a subscription basis, with SaaS and PaaS being examples. It is also common in the subscription model for a service provider to offer different subscription levels (e.g., tiers) that have different functionalities. For example, a platinum level subscription might have full functionality in which a user may utilize every feature in the IDE, whereas a gold level subscription might have a reduced functionality in which the user cannot utilize every feature in the IDE.

In accordance with aspects of the present disclosure, the system identifies sales leads by: identifying a feature of interest that is not included in a user's current subscription level; determining that the feature of interest is included in a different subscription level; and/or providing a recommendation to upgrade to the different subscription level. The feature of interest may be determined in a number of ways including but not limited to: based on platform data of an individual user; based on platform data of an enterprise; and/or based on community data. The recommendation may be provided directly to a subscribing user or subscribing enterprise (e.g., to an entity that has a subscription to the platform), or may be provided to a user associated with the platform such as a user having a sales persona in the enterprise that owns the platform.

In one embodiment of identifying sales leads, the system identifies a feature of interest that is not included in a user's current subscription level by: determining an intent of a user creating an app in the IDE; determining a feature that achieves this intent; and determining that the feature is not included in the user's current subscription level but is included in a different subscription level. The determining the intent of the user is performed in a manner similar to that described in the AUTONOMOUS ADVISOR section, e.g., by using cognitive analysis and/or machine learning to analyze at least one of: the user's events in the IDE; the user's searches for components (e.g., assets) in the platform marketplace; the user's downloads of components (e.g., assets) from the platform marketplace; the user's searches for information in platform resource materials; the user's comments to forums (e.g., "I wish the IDE did function xyz" or "product abc really needs to do xyz"); and data logs associated with the user's dead-ended processes and unfinished projects in the IDE.

The determining the feature that achieves the intent is also performed in the manner described in the AUTONOMOUS ADVISOR section, e.g., by analyzing platform data and/or community data using cognitive analysis and/or machine learning to determine what feature(s) other users are utilizing to achieve the same intent. The determining that the feature is not included in the user's current subscription level but is included in a different subscription level is performed by accessing and analyzing data that defines the respective subscription levels, which is readily available from the platform.

According to aspects of the present disclosure, the system compares the determined user intent to the determined features that are available in other subscription levels and, based on this comparison, makes a recommendation to the subscribing user to upgrade their subscription level. The recommendation engine 2090 may generate a recommendation including the recommended feature and subscription level, and the bot user interface 2010 may present the recommendation to the subscribing user. The recommendation may include information on how to obtain the feature, e.g., by suggesting upgrading the subscription to obtain access to the subscription level that includes the feature.

Additionally or alternatively to providing a recommendation to the subscribing user, the recommendation engine 2090 may generate a recommendation that is provided to a user associated with the enterprise that owns or operates the platform, e.g., a user having a sales persona with the platform. The recommendation may include data such as: account information of the subscribing user with the platform (e.g., account number, enterprise name, user name, current subscription level, etc.); the determined intent; the determined feature; and the subscription level that includes the determined feature. In this manner, the user having the sales persona with the platform may personally contact the subscribing user to suggest upgrading the subscribing user's subscription level.

Figure 6C:
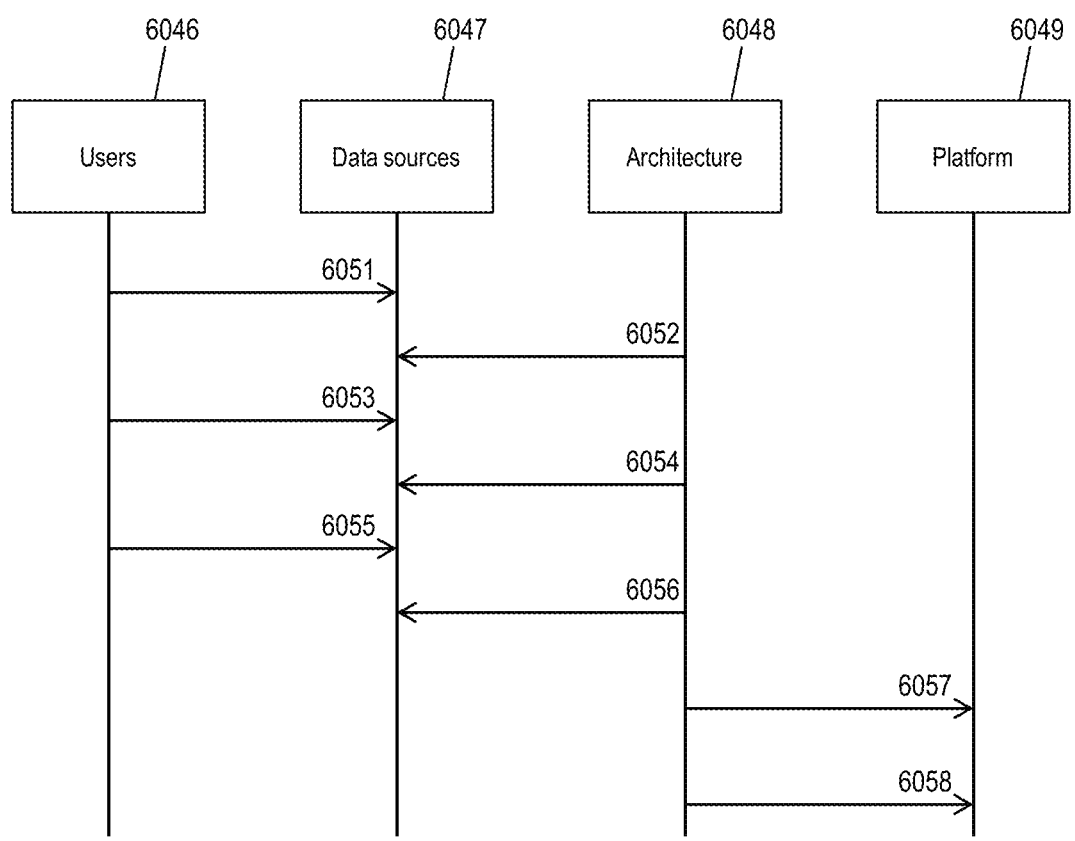
FIG. 6C shows a swim lane diagram of exemplary processes in accordance with aspects of the present disclosure.

FIG. 6C shows a swim lane diagram of an exemplary method for identifying sales leads in accordance with aspects of the present disclosure. The method may be performed in the environment of FIG. 1C, with users 6046 representing user computer devices operated by subscribing users, data sources 6047 representing computer based sources of platform data and community data (e.g., platform event queue, platform marketplace, platform support forums, third party forums, etc.), architecture 6048 representing the architecture 2000 of FIG. 2A, and platform 6049 representing other computer devices of an enterprise that owns or operates the architecture 2000.

At step 6051, one of the users 6046 performs one of: downloads a component from the platform marketplace; searches for a component in the platform marketplace; adds a comment to a post in a forum (e.g., an internal platform forum or an external third party forum); posts a question in a forum; posts an answer to a question in a forum. Step 6051 may be performed plural times by plural different ones of the users. At step 6052, the architecture 6048 tracks and stores the entire user activity from step 6051 in a DB repository. Step 6052 is performed substantially continuously in response to the many user actions at step 6051.

At step 6053, one of the users 6046 uses a downloaded component (e.g., asset) in an app. At step 6054, the architecture 6048 tracks the usage of the downloaded component (e.g., asset) from step 6053. Steps 6053 and 6054 may be repeated plural times for different actions of different ones of the users 6046.

At step 6055, one of the users 6046 adds a comment in a forum. At step 6056, the architecture 6048 analyzes the comment from step 6055 to determine whether there is a product suggestion in the comment. Steps 6055 and 6056 may be repeated plural times for different actions of different ones of the users 6046.

At step 6057, the architecture 6048 provides a product recommendation to the platform 6049. In embodiments, as described herein, the architecture 6048 analyzes the data from at least one of steps 6052, 6054, and 6056 to identify a product recommendation (e.g., a user-suggested feature). In embodiments, as described herein, the architecture 6048 provides a recommendation to a user associated with the enterprise that owns or operates the platform, e.g., a user having the persona of a platform curator. In response to receiving the recommendation, the user may work with the platform development team in determining whether to add the user-suggested feature.

At step 6058, the architecture 6048 tracks and analyzes usage of components (e.g., assets) by one or more users 6046 and suggests a subscription upgrade based on the analyzing. In embodiments, as described herein, the system identifies a feature of interest that is not included in a user's current subscription level, and identifies another subscription level that includes the feature. Based on this, the system either provides a recommendation directly to the subscribing user, or provides a recommendation to a user associated with the enterprise that owns or operates the platform, e.g., a user having a sales persona with the platform.

Interactive Tutorial Platform and Related Processes

The interactive tutorial platform and related processes comprise a system and method for the dynamic conversion of a software component (e.g., asset) comprised of data and meta-data into a real-time playback of component creation. This interactive tutorial platform provides the capability to use components within a component library or marketplace, and to educate a designer, developer or other associated skills role in the functionality, the runtime characteristics and the end to end integration of a software component. In addition, the interactive tutorial platform implements DevOps, which is a combination of cultural philosophies, practices, and tools that can increase an organization's ability to deliver applications and services at high velocity. Basically, the DevOps will evolve and improve products at a faster pace than using traditional software development and infrastructure management processes.

In embodiments, application developers create different types of reusable code/UI, which are called "components". These components are part of different assets such as skins, widgets, platform specific icons, buttons, or other assets, etc. These components include two personas: 1) component producer and 2) component consumer. The component producer defines the component in a meta file; whereas, the component consumer can download the component to his/her application via an application development tool, for example. The consumer typically goes through the meta info to understand the usage of this component. This is a tedious and time consuming process, which is not very effective.

In contrast, though, the interactive tutorial platform described herein assists the consumer to consume the component by using an interactive technique. More specifically, the interactive tutorial platform and related processes allow for components to tell a story about themselves; that is, the interactive tutorial platform described herein is capable of learning about the different components, putting them into their constituent components and providing an interactive tutorial to the user for building the components in a development application environment. The interactive tutorials can be used directly in the workspace, as the user (consumer) is building the component. In this way, the consumer is not only learning how to build the component, but is also actually capable of building the component in the application development platform in real-time.

Figure 7A:
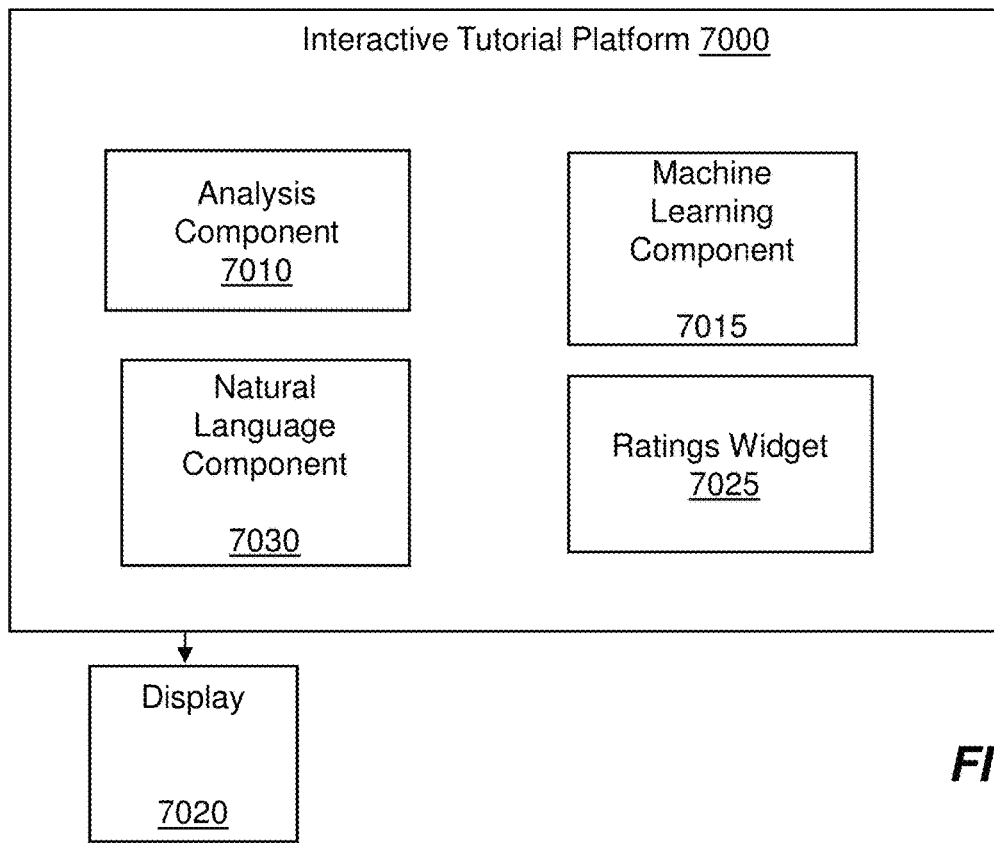
FIG. 7A shows a system level or architectural overview of an interactive tutorial platform in accordance with aspects of the present disclosure.

With this noted, FIG. 7A shows a schematic or architectural view of the interactive tutorial platform and related processes. In embodiments, the interactive tutorial platform and related processes can be implemented using the infrastructure shown in FIG. 1A, e.g., computing environment 1000. The interactive tutorial platform 7000 can also be imported from any marketplace, e.g., Kony Marketplace™ by Kony, Inc. into the workspace of the development application, e.g., Kony Visualizer®, and subsequently "played". The interactive tutorial platform can also be a plug-in (e.g., plug-in architecture module 1230 shown in FIG. 1C) to any development tools or other computing infrastructure and/or any of the subsystems described herein. In this way, a training and support environment, e.g., an interactive tutorial, can be provided directly to the user (developer) in an application development environment while the user is building the component.

In FIG. 7A, the interactive tutorial platform 7000 includes an analysis component 7010 and machine learning component 7015. In embodiments, the machine learning component 7015 can be a subcomponent of the analysis component 7010 or a standalone component. In further embodiments, the analysis component 7010 can include AI as described herein for analysis of assets and associated metadata. In further embodiments, the analysis component 7010 and machine learning component 7015 can be sub-components of the training/support optimization module 1235 shown in FIG. 1A, configured to create and view an interactive type of tutorial for training a user in the construction or use of different assets. In addition, the analysis component 7010 and machine learning component 7015 can be implemented through the help bot 3550 shown in FIG. 3D.

By way of illustrative example, the analysis component 7010 can analyze component meta files and construction format of a current asset (hereinafter referred to as a component) being built by the user, as well as components which are imported from other development tools, marketplaces, etc. By making such analysis, the analysis component 7010 can determine the exact method of construction of the component. In addition, by using this obtained information, the analysis component 7010 can transform the component into an interactive tutorial for other users for providing knowledge, education and training about the component. This can be done by using, for example, the machine learning component 7015 or, alternatively, in a standalone mode, as further explained herein.

As should be understood by those of ordinary skill in the art, a meta file is a generic term for a file format that can store multiple types of data. This commonly includes graphics file formats. These graphics files can contain raster, vector, and type data, amongst other information. In the examples provided herein, the meta file can also include information about the component, as written or explained by the creator or a third party source. The analysis component 7010 can also analyze DevOps of the components, making comparisons to best practices, for example.

In specific embodiments, the analysis component 7010 can create an interpretation layer, which is capable of processing the internal file formats of a component and replay the construction of that component within an IDE. By way of illustrative example, the interpretation layer can determine and pipe each of the steps derived from the design of different components or assets such as skins, widgets, platform specific icons, buttons, etc., to visualize its appearance in the development application workspace.

In embodiments, metadata that is analyzed can include timing data, comments, special symbolic indicators such as boxes and arrows effectively creating a dynamic technology transfer. The analyzed data can then be used, e.g., to build a video, in the development tool (e.g., Kony Visualizer® by Kony, Inc) by representing the component syntactically in JavaScript Object Notation or JSON, which is an open-standard file format that uses human-readable text to transmit data objects consisting of attribute-value pairs and array data types (or any other serializable value). As should be understood, JSON is a language-independent data format. This technology transfer results in the development, e.g., rendering of the interactive tutorial, with the user observing the interactive tutorial of the asset (component). The user can also import or inspect any component for inclusion into a blank or pre-populated application project, and become educated in the functionality of the component.

The interactive tutorial platform 7000 further includes a machine learning component 7015. The machine learning component 7015 is capable of gathering global trends for particular assets or components in order to include such information in the interactive tutorial. In embodiments, the global trends can be gathered by the global developer trends module 1215 as shown in FIG. 1C. The machine learning component 7015 can also gather the different assets or components from remote sources, e.g., blogs, other development tools, marketplaces, etc., by any known data mining technique, e.g., crawlers, spiders, etc. This information can then be provided to the analysis component 7010 or directly to the interactive display 7020. If provided to the analysis component 7010, the analysis component 7010 will then analyze the different assets or components, e.g., component meta file and construction format, for use in the interactive tutorial, which may be displayed on the interactive display 7020.

The machine learning component 7015 extends to insight generated by AI, which can inject commentary of the component gathered from an extensive collection of users who have previously commented on the component, as well as the intergradation by the AI of the machine learning component 7015. Moreover, the machine learning component 7015 and/or analysis component 7010 can provide comparison and contrasting interpretations based on the analysis of a plethora of components. These commentary including the comparisons, etc. can be wrapped an object so that a component can be "explained" in a particular point of view or by a particular user. The analysis component 7010 and/or machine learning component 7015, using the AI described herein, can automatically generate the commentary, which can be wrapped around the object with insightful meta-data so that a component can be "explained" in a particular point of view.

In embodiments, the commentary can be provided by a natural language component 7030. The natural language component 7030 can create original commentary or commentary based on previous user comments on that component or by the analysis of the meta file, etc. As should be understood by those of ordinary skill in a meta file is a generic term for a file format that can store multiple types of data. This commonly includes graphics file formats. These graphics files can contain raster, vector, and type data, amongst other information. A common use for these files is to provide support for an operating system's computer graphics. In the examples provided herein, the meta file can also include information about the component, as written or explained by the creator.

In embodiments, the natural language component 7030 can update commentary based on actions by specific users or developer, e.g., modifications to the components, user comments, etc. In further embodiments, the systems and methods described herein will allow a user or specific users (e.g., depending on the particular settings) to provide updated commentary. Any of these updated commentaries can be shared in subsequently viewed tutorials of the component. In addition, the tutorials (or commentary) can be updated as the component or asset is changed or updated by another user, using the components described herein. The commentary and tutorials can be saved in the storage system 1022B shown in FIG. 1A. Alternatively or in addition, the commentary and tutorials can be saved locally in any marketplace or development tool, or remotely in the cloud or other server.

Still referring to FIG. 7A, the machine learning component 7015 and/or the analysis component 7010 can include AI to determine or identify any difficulties the user may be encountering in the application development process. For example, the analysis component 7010 and/or machine learning component 7015 can determine, e.g., if certain assets designed and/or written by the user will not work, if there is a "bug", if the user has encountered a "dead end" (e.g., the user cannot continue due to some difficulty), etc. In these and other examples, the machine learning component 7015 and/or the analysis component 7010 can find a new opportunity for the user, and provide such new opportunity to the user in an interactive format (or tutorial as described herein). This new opportunity can be global trends e.g., a different or easier way of doing things, or other information found by searching the Internet, blogs, social media, other development tools or digital applications, marketplaces, etc.

The interactive tutorial platform 7000 can further expose a ratings widget 7025 in a community or marketplace, which allows for the reflection of satisfaction levels associated with user submitted commentary. For example, the ratings widget 7025 can rate each of the commentaries by gathering information from the users, or noting any negative or positive feedback from the different commentaries or tutorials. The ratings widget 7025 can also rate the tutorials by how many times it was used, whether any changes were made to the tutorial or any changes made to the commentary, as examples.

Figure 7B:
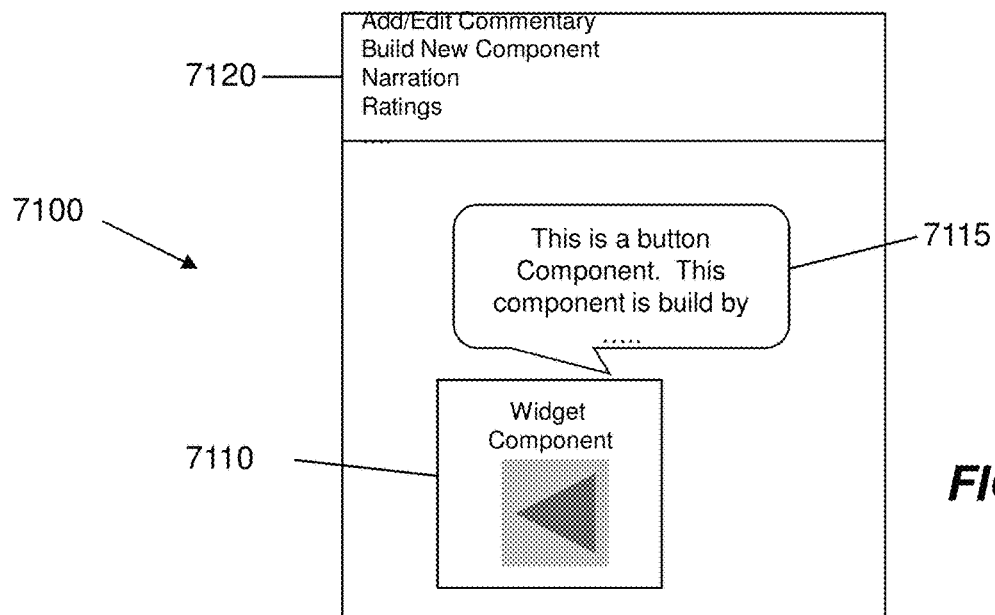
FIG. 7B shows an exemplary display with an interactive tutorial using the interactive tutorial platform in accordance with aspects of the present disclosure.

FIG. 7B shows an exemplary display with an interactive tutorial using the interactive tutorial platform in accordance with aspects of the present disclosure. As shown in FIG. 7B, the commentary 7115 can be provided in a bubble format, a playback format or a narration which will inform the user how the component (or service) was actually created. Accordingly, the commentary 7115 can be optional narration tags which can specifically be rendered as balloon text or spoken words and essentially performs a dynamic technology transfer to the user. Basically, the commentary, which was generated by the systems and methods described herein can show each step of the component's creation and can behaves similar to another developer or designer taking the user through the creation of the component.

More specifically, FIG. 7B shows an exemplary display 7100 comprised of the component 7100 being built by a developer or other user (or imported from another source). In embodiments, the component 7110 is a button; although, it should be understood by those of skill in the art that the component 7110 can be any component being built by a user or which a user wants additional information. As further shown, the display 7100 includes a commentary box 7115. In embodiments, the commentary box 7115 can be optional narration tags which can specifically be rendered as balloon text or spoken words and essentially performs a dynamic technology transfer to the user, e.g., tutorial as to how to build the particular component.

As noted already herein, the commentary box 7115 will be auto-generated by the interactive tutorial platform, which will provide a step by step tutorial and/or comments related to the particular component 7110. For example, in the case example shown in FIG. 7B, the commentary box 7115 can be provided by a chat bot as described herein, and can provide a comment on how to place the arrow box in a certain location, how to enlarge or decrease its size, how to modify the shape, or other instructions. In addition, the commentary box 7115 can provide a step by step analysis of other information of the component 7110 and, as the component changes in the build process, the commentary box 7115 can automatically be updated to show the steps of the change. In addition, the component 7110 can be either a static representation of the component or part of a video with accompanying narration or commentary showing the entire process of building the component 7110.

As further shown in FIG. 7B, the display 7100 includes a menu 7120. In embodiments, the menu 7120 provides the user with the ability to perform many different functions, as implemented by the interactive tutorial platform. For example, the user can add or edit the comment box, build a new component (in which case the interactive tutorial platform will analyze the meta file, etc., and provide a new tutorial), provide or edit narration, provide a rating to the current comments, etc.

Figure 7C:
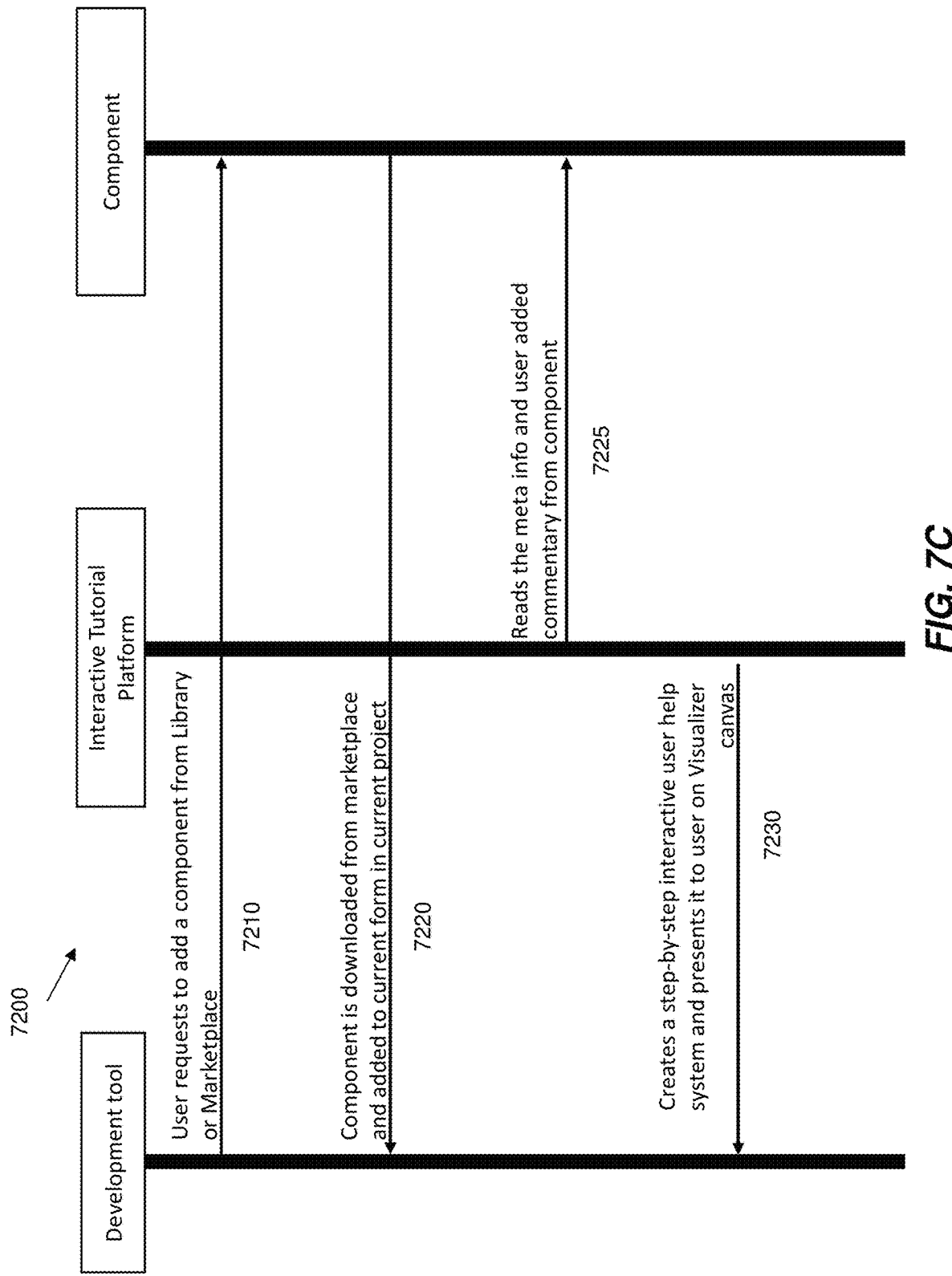
FIG. 7C depicts a swim lane diagram for implementing steps associated with the interactive tutorial platform in accordance with aspects of the present disclosure.

FIG. 7C depicts a swim lane diagram for the interactive tutorial platform in accordance with aspects of the present disclosure. The swim lane diagram 7200 includes three actors: the application development tool (e.g., Kony Visualizer® by Kony, Inc), the interactive tutorial platform and a marketplace or other source for a component. At step 7210, a user (e.g., using the application development tool) requests to add a component from library or marketplace or other third party source. For example, the library or marketplace can be any third party source, e.g., blog, development tool, service provider, etc. At step 7220, the component is downloaded from marketplace or other source and added to the current form in the current project. At step 7225, the interactive tutorial platform reads the meta info (e.g., component meta and construction format) and any user added commentary associated with the downloaded component. At step 7230, the interactive tutorial platform creates a step-by-step interactive user help system (e.g., tutorial) and presents it to user to the user (e.g., on the development tool). As already noted herein, the interactive tutorial platform can generate the step-by-step interactive user help system using Natural Language Generation (NLG) based on previous user comments on that component or, intuitively, the component meta and construction format. In this way, the interactive tutorial platform can create an interactive help system to guide the user about the component.

System and Method of Real-Time Collaboration

The system and method for real time collaboration is provided between developers within the enterprise and a community of developers. For example, multiple developers and designers can work on a single project, with the developers working on subsections of the single project at different locations. These developers can now interact with each other and with the designer by sharing the project context etc.

In embodiments, the system and method for real time collaboration allows system administrators to define collaboration rules across the enterprise users or at the developer level. For example, the system and method for real time collaboration allows:

1) the developers to connect with the other developers in the enterprise to collaborate, discuss issues etc.;

2) the developers to connect with the external world (outside of the enterprise) if they have the permission from the administrator; and/or 3) users to take screenshots, capture build logs from the IDE and to share them with others.

Figure 8A:
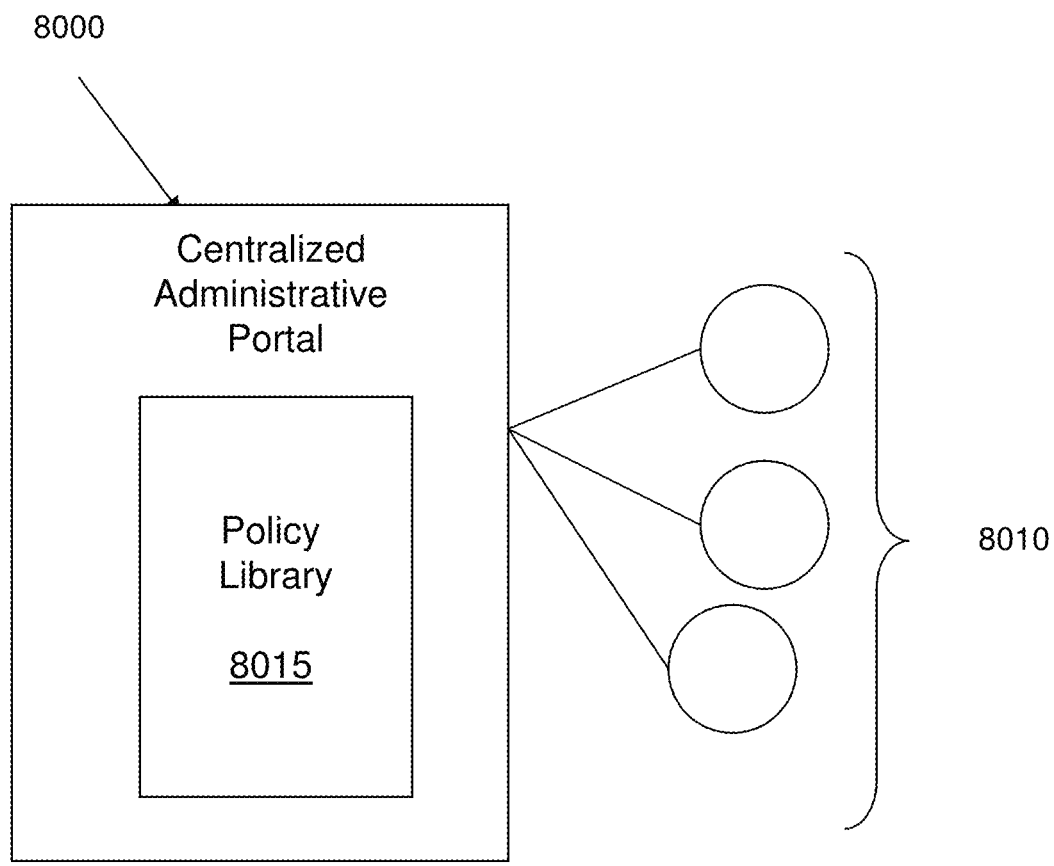
FIG. 8A shows an administrative portal for providing rules in a real-time collaboration environment in accordance with aspects of the present disclosure.

In embodiments, the administrators of the system can define rules and the level of collaboration that is allowed through the administrative portal 8000 as shown in FIG. 8A. The administrative portal 8000 and its constituent components (e.g., library, etc.) can be implemented in the illustrative environment 1000 of FIG. 1A. In additional or alternative embodiments, the administrative portal 8000 (e.g., system and method for real time collaboration) can be a standalone system with a plug-in architecture (e.g., plug-in architecture module 1230 shown in FIG. 1C) to any of the components or systems described herein. For example, the system and method for real time collaboration can be a plug-in to a marketplace or any enterprise system providing any of the functionality described herein. In additional embodiments, the administrative portal 8000 can be a subsystem of the admin console manager 3580 shown in FIG. 3E.

Through the administrative portal 8000, the administrator or other authorized user can create, configure and/or update security policies (rules) for providing permissions to share information amongst different users as shown representatively at 8010, e.g., collaborating users. In embodiments, the users, e.g., developers can register with the administrative portal 8000, such that the administrative can append certain rules or policies to each of the users. In this way, the administrative portal 8000 can act as a centralized portal for the administrator to set policies, for the users (developers) to request collaboration with other users that have registered with the system, and to provide information to the requesting user about the requested user.

In embodiments, the administrator can set policies from a policy library 8015 which, e.g., implements the processes described herein. The policy library 8015 can be a storage system as shown, e.g., in FIG. 1A or a standalone database or other storage system. In embodiments, the policy library 8015 may be implemented as separate dedicated processors, or a single or several processors to provide the function of this tool. The policies from the policy library 8015 can be provided to each of the registered users 8010 of a development tool. For example, the policies from the policy library 8015 can be packaged with other communications, a component, assets, or a tutorial, etc., by appending the policy directly thereto and sending it to the user. The policy can be an eXtensible markup language (XML) file or other type of file that contains the policy, itself. In embodiments, the policies, in turn, can be cached in the development tools of the users for later use.

It should be understood that that any number of policies can be provided by the administrator, depending on many factors. That is, the policies can be targeted on a much more granular level than just the user or project being worked upon by the different users. For example, a different policy can be configured taking into account the application ID, device platform (e.g., such as iOS™, Android®, Blackberry®, Windows Mobile™, etc.), specific device ID, specific user ID, device characteristics and/or the user's group information. Also, certain levels of security or enforcement policies can be matched to a user based on the user, e.g., level of security, types of applications, types of digital devices, etc. These policies can include, amongst other examples:

1) block collaboration between users on certain device hardware elements;

2) block collaboration between users that have a virtual private network (VPN) connection;

3) allow collaboration between users that are on certain VPN connection;

4) require collaboration between users only over a secure connection such as using a secure sockets layer (SSL);

5) limit collaboration to certain IP addresses, domains and/or ports the user is allowed to connect to (firewall for applications);

6) allow offline collaboration between users;

7) require collaboration between users that are using encryption;

8) disable or enable document sharing including, e.g., build logs, US screenshots, working canvas and/or libraries, etc.; and/or 9) allow collaboration between users only during a specific date or time span (e.g., business hours) or at specific locations.

The enterprise administrator can update or create these policies, independent and regardless of any specific application or user. These updated policies can not only change the rules, but how and when they are applied based on the many different factors. For example, the rules can be changed based on company or enterprise policies, e.g., a lead developer of the enterprise can collaborate with any other developer, regardless of location, time, or platform. This can be achieved by noting the user ID and password, at startup or authentication. In embodiments, a developer can independently develop a digital application, without knowledge of the policies.

Figure 8B:
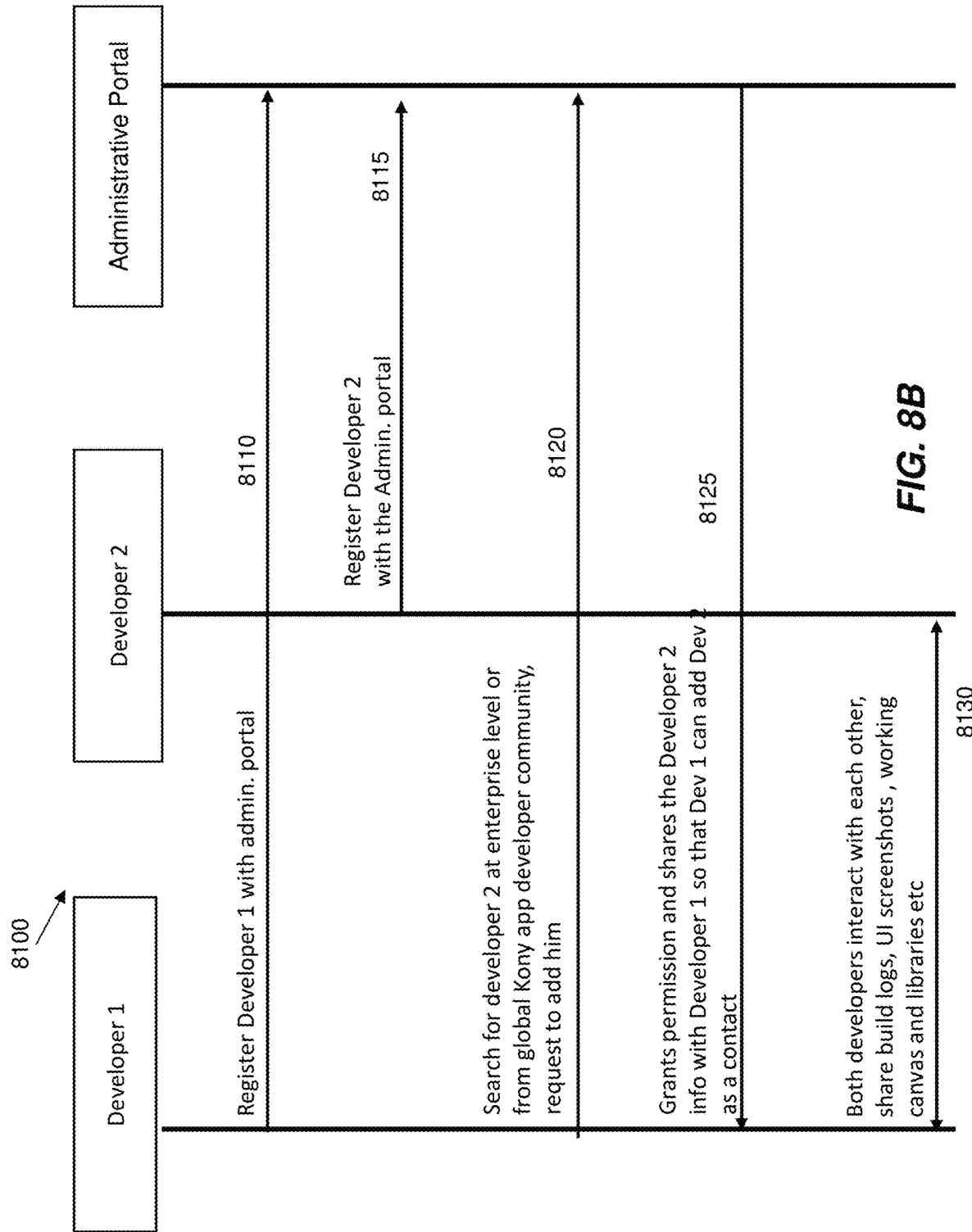
FIG. 8B depicts a swim lane diagram for implementing steps associated with the administrative portal to provide rules for real-time collaboration in accordance with aspects of the present disclosure.

FIG. 8B depicts a swim lane diagram for implementing steps associated with the administrative portal to provide rules for real-time collaboration in accordance with aspects of the present disclosure. The swim lane diagram 8100 includes several actors: developer 1, developer 2 and the system of collaboration, e.g., administrative portal 8000. It should be understood by those of skill in the art that more than two developers can be part of this flow, with two developers being used for illustrative purposes only.

At step 8110, the developer 1 registers with the administrative portal. At step 8115, the developer 2 registers with the administrative portal. Through the administrative portal, the administrator can assign specific rules to each of the developers. It should be understood that other developers or users, e.g., designers, collaborators, etc. can also register with the administrative portal. At step 8120, developer 1 will request a search for developer 2 at the enterprise level or from a global app developer community using, e.g., the administrative portal. In embodiments, the administrative portal will search for developer 2, determine its specific rules associated with developer 2 and, if access can be granted for collaboration, the administrative portal will share developer 2 information so that developer 1 can add developer 2 as a contact. At step 8130, depending on the specific rules with each of the developers, developer 1 and developer 2 can begin interaction with one another. This interaction can be any type of allowed collaboration such as sharing build logs, UI screenshots, working canvas and libraries, etc.

System and Method for Connecting End Users to Business Systems

The system and method for connecting end users to business systems is a system and method that enhances service and generates business leads. In embodiments, the system will allow the users with certain roles (e.g., managers, lead developers, etc.) to request help for professional services, buy products, proposals, etc., through a chat interface. In embodiments, the system and method for connecting end users to business systems routes these requests to customer relation management systems and/or through the business systems and logs the requests. The system will also autonomously respond back to the users when the previously sent requests are updated by the interested parties. By way of more specific example, by implementing the systems and methods described herein, users from any enterprise can connect with a sales team about new products and upgrades. The user can also request help from professional services.

Figure 9A:
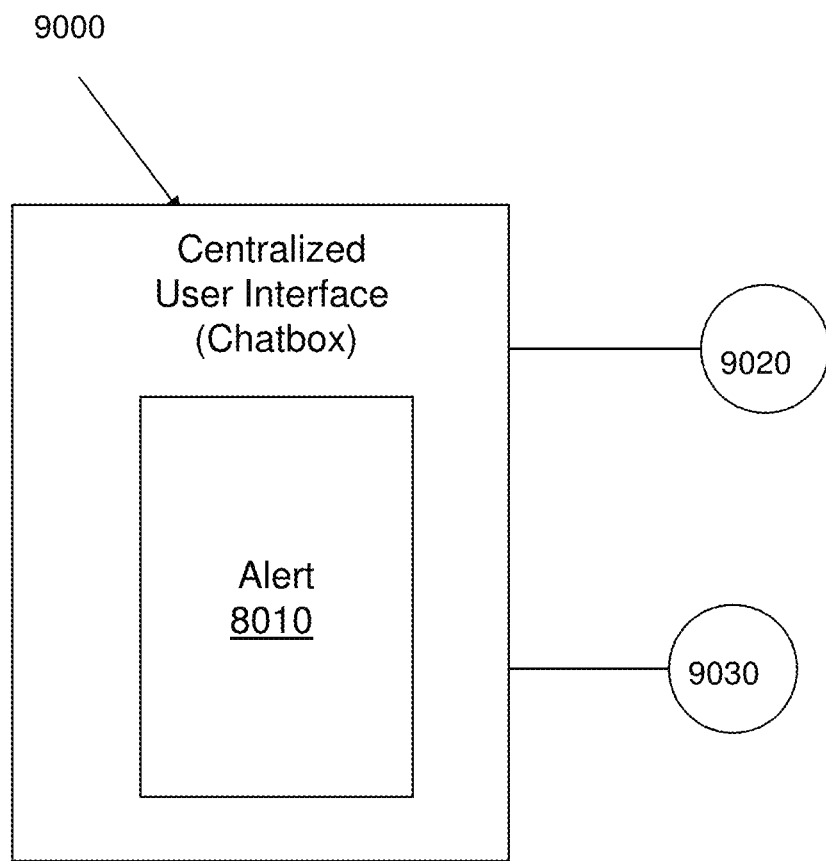
FIG. 9A shows an interface for communicating to business systems (e.g., chatbot) in accordance with aspects of the present disclosure.

Referring to FIG. 9A, a user interface 9000, e.g., chatbot, allows a user to connect with sales and professional teams on a remote computing systems. In embodiments, the user interface 9000 can be representative of the computing environment 1000 of FIG. 1A and be implemented with any of the subsystems described herein. For example, the user interface 9000 can be implemented and/or plugged into the improve sales efficiency module 1240 of FIG. 1C. Here, an IQ engine has the ability to feed metrics into a salesforce service or a salesforce database which, in turn, is provided to a member of a sales support team informing them of potential upsell opportunities.

By implementing the user interface 9000, for example, a user can send their proposal and/or requests to a sales and professional team. The user can use the user interface 9000 to request help for professional services, buy products, proposals through the chat interface. In embodiments, the user can be one of many different roles. For example, the user can be a manager, a lead developer, etc. The requests will be routed to a customer relation management systems 9020 and/or through the business systems 9030, depending on the communication and the requested type of information. In embodiments, the customer relation management systems 9020 is a technology for managing a company's relationships and interactions with customers and potential customers to improve business relationships. When the user interface 9000 receives the response from sales/marketing and professional teams (or customer relation management systems 9020 and/or through the business systems 9030), it notifies the user with same response. This can be done by an alert system 9010. The alert can be an email, text message, an audible alert, etc.

In embodiments, the user interface 9000 can include a plug-in architecture (e.g., plug-in architecture module 1230 shown in FIG. 1C), plugging into any of the sub-systems described herein. In combination with AI or machine learning (as described herein), the user interface 9000 can monitor the sub-systems described herein and, by determining certain actions of the user, it can autonomously request information from the customer relation management systems 9020 and/or through the business systems 9030. For example, by determining that the user has taken a certain action, the user interface 9000 can determine that new systems may be needed to more efficiently provide such action and request information from the customer relation management systems 9020 and/or through the business systems 9030 of such systems. The information can then be provided automatically to the user, through the user interface 9000.

The requests can be logged in the user interface 9000 and/or customer relation management systems 9020 and/or through the business systems 9030. By logging the requests, the systems and methods described herein (e.g., chatbot) can continue a query into the customer relation management systems 9020 and/or through the business systems 9030, and autonomously respond back to the users when the previously sent requests are updated or found. For example, using the AI residing on the user interface 9000, the systems and methods described herein can parse the questions/requests of the user and when an answer is found to such a request, the management systems 9020 and/or through the business systems 9030 can autonomously send back a response. In embodiments, the response can be a machine generated response or a human response. In any event, the logged information will be maintained in a queue until it is answered, at which time it can be removed or flagged as complete.

Figure 9B:
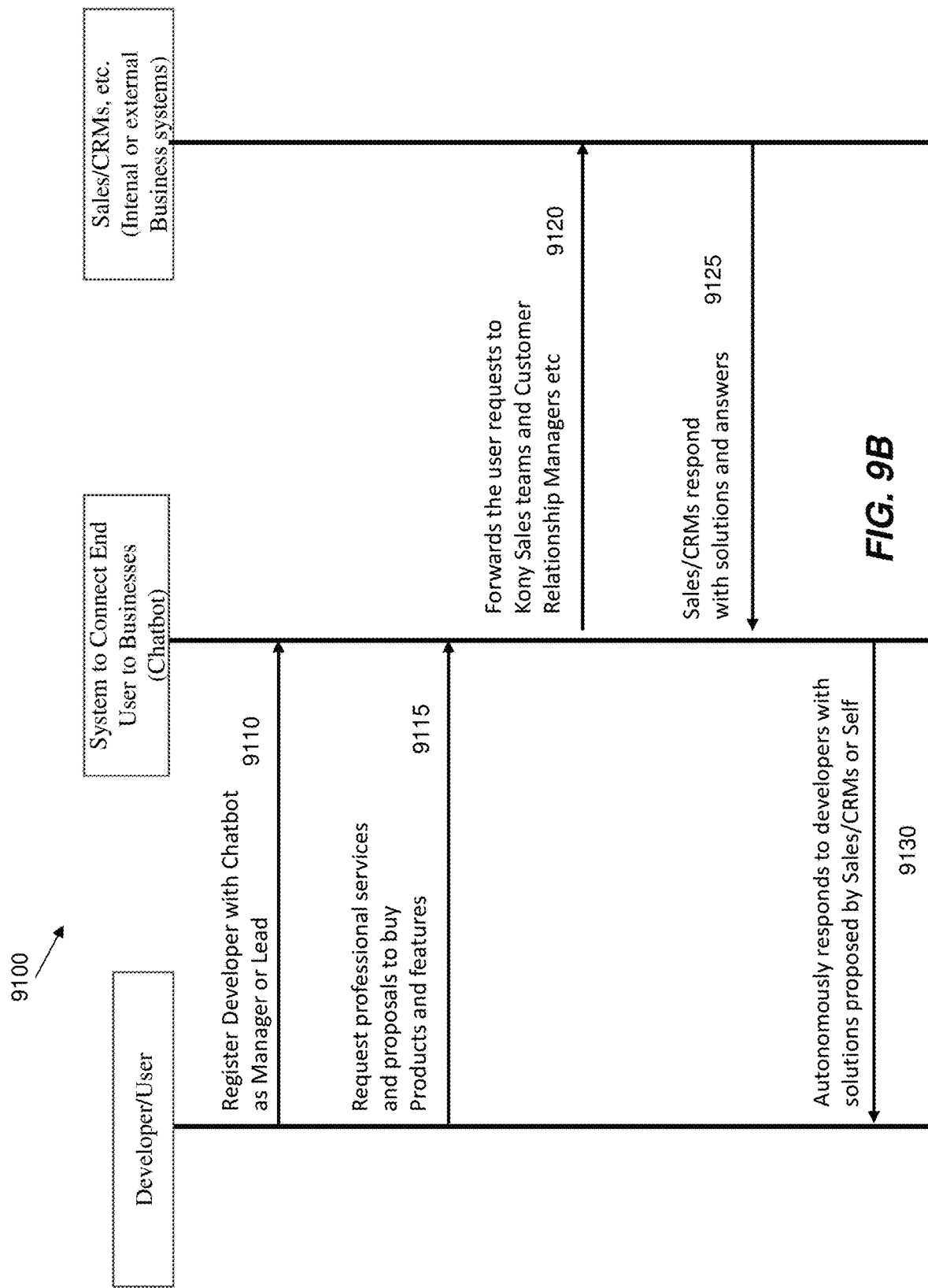
FIG. 9B depicts a swim lane diagram for implementing steps associated with the communication with the business systems in accordance with aspects of the present disclosure.

FIG. 9B depicts a swim lane diagram for implementing steps associated with the communication with the business systems in accordance with aspects of the present disclosure. The swim lane diagram includes at least three actors: developer/user, the system which connects the end user to a business application and the business application, itself, e.g., customer relationship management (CRM). At step 9110, the user registers with the systems described herein, e.g., chatbot. In embodiments, the user can be a manager or lead, for example, amongst other users. At step 9115, the user requests professional services and/or proposals for products, features or some services from the chatbot. At step 9120, the chatbot will forward the request to the sales team, customer relationship manager, or other internal or external business solution system, etc. At step 9125, the customer relationship manager, or other internal or external business solution system will respond with solutions and/or answers. At step 9130, the chatbot will autonomously forward/respond to the user with the solutions proposed by the management systems and/or through the business systems.

Registration System

The registration system allows vendors to register themselves with the any combination of the systems/sub-systems described herein using an administrative portal/website (e.g., administrative portal 8000). In embodiments, the registration system can be a plug-in architecture (e.g., plug-in architecture module 1230 shown in FIG. 1C) to any of the subsystems or other computing infrastructures described herein. The registration system can also be represented by the computing infrastructure shown in FIG. 1A.

Figure 10A:
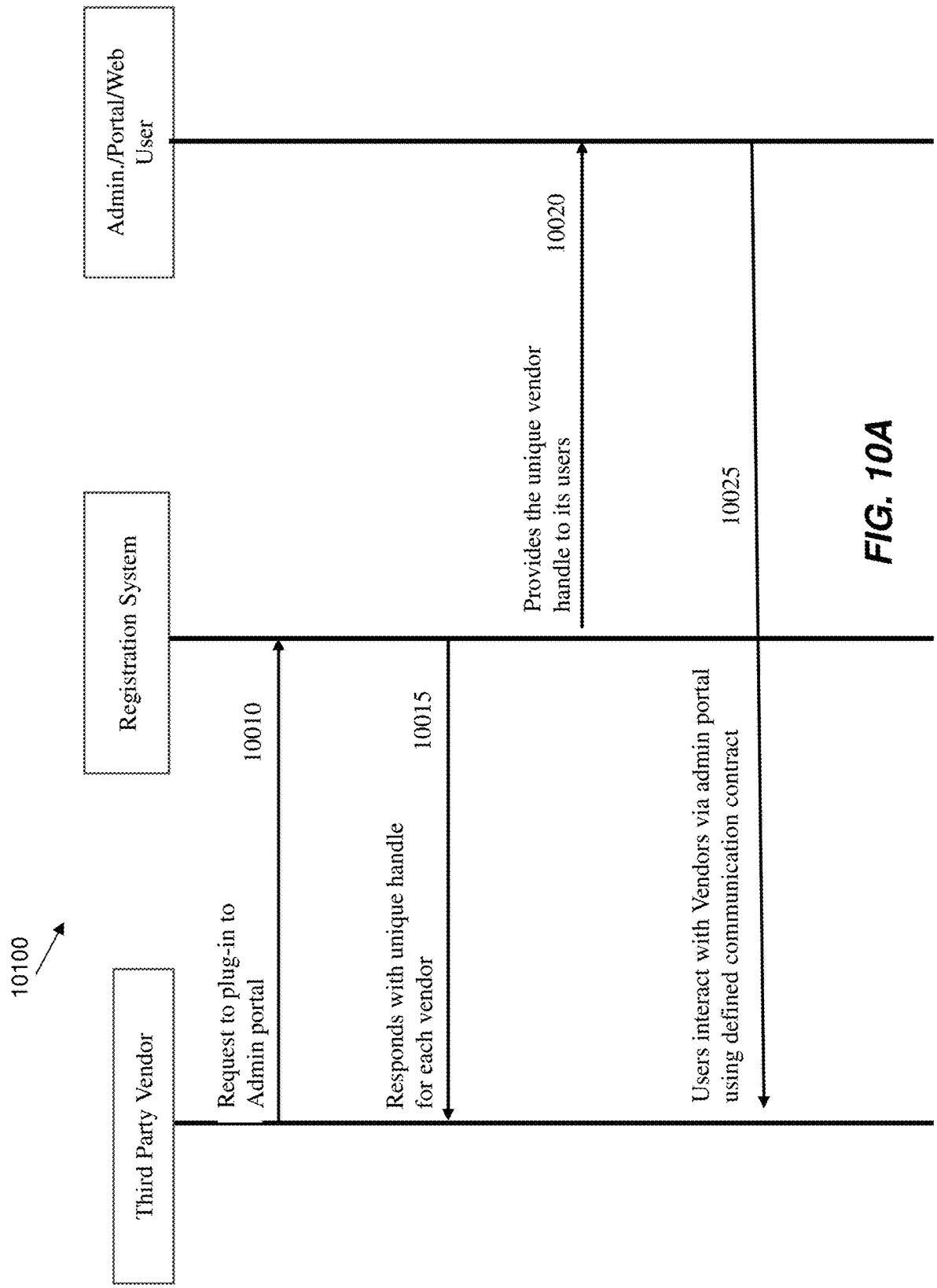
FIG. 10A depicts a swim lane diagram for implementing steps associated with a registration system in accordance with aspects of the present disclosure.

In embodiments, the registration system is capable of digitalizing the third party vendors communication with a third party service provider system e.g., Kony® of Kony, Inc. Once the registration is successful, these vendors are allowed to interact with other vendors using their unique ID. For example, as shown in the swim lane diagram of FIG. 10A, at step 10010, the system will allow third party vendors to plug in through the administrative portal. At step 10015, the registration system will assign each vendor a unique handle. At step 10020, the registration system will provide the unique handle to a third party service provided, e.g., vendor. This handle is used by the end users of the system to communicate with the external vendors through the registration system, as shown at step 10025. In embodiments, the registration system can also define a communication contract for the external vendors.

System and Method to Campaign Products and Services (Marketing System)

The system and method to campaign (e.g., identify and sell) products and services has the ability to run marketing campaigns for product/professional services with a targeted audience. In embodiments, the system and method described herein can be implemented by the computing environment 1000 of FIG. 1A, which campaigns can be displayed on any of the interfaces described herein. In addition, the campaign can be implemented through a plug-in (e.g., plug-in architecture module 1230 shown in FIG. 1C) to work with any of the sub-systems described herein. In embodiments, the system and method to campaign products can be implemented through the improve sales efficiency module 1240 described with respect to FIG. 1C.

The products and services can be provided in a campaign via a development tool such as Kony Visualizer® by Kony, Inc. or through a marketplace or other third party service provider. Information can be collected from the users and fed back from Kony Visualizer® or other third party service provider. In embodiments, as with any of the systems and related functionality described throughout the disclosure, the user can opt-out of the information gathering mode and/or campaign. In the case that the user does not opt-out, any information obtained from the user can be preserved in a database, e.g., storage system 1022B shown in FIG. 1B or other central repository, for example.

In embodiments, the system and method described herein can run and initiate marketing campaigns with selected users by taking feedback from users and by providing the user with a unique set of questionnaires. The system and method can also provide notifications to the users, which have provisions for the user to turn on/off such notifications.

In implementing the system and method described herein, AI (and/or machine learning) can run analytics from the response data received from various users and provide suggestions/details to the different platforms described herein. For example, the system will have the ability to run product/professional services marketing campaign with the targeted audience based on the data received from various users. The system and method also has access to all its users via identity services, e.g., Fabric Identity Services' of Kony, Inc. In embodiments, the identity services are a centralized system capable of creating and transferring tokens between different systems, inserting the appropriate tokens at the appropriate locations for the different systems.

Figure 11A:
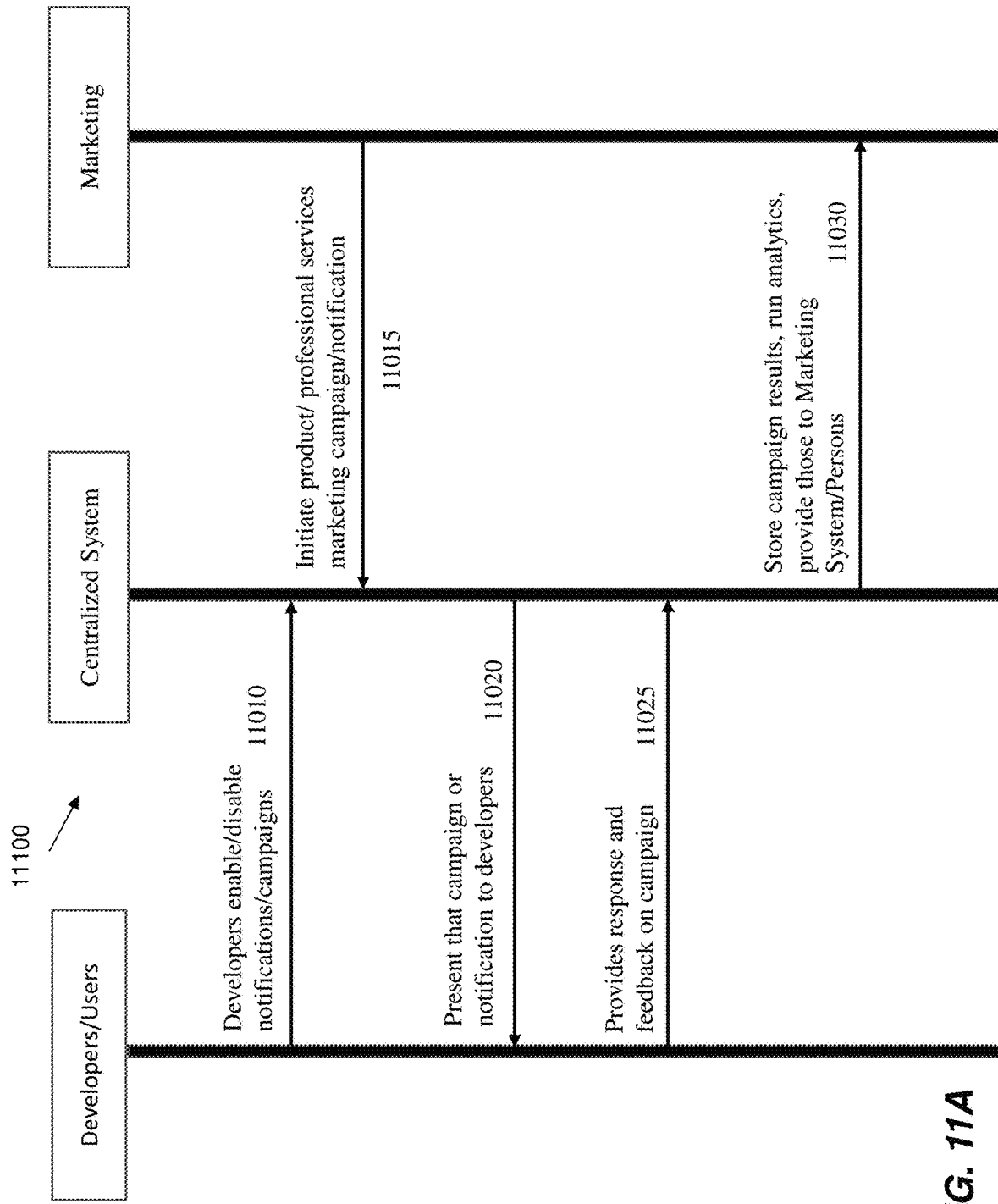
FIG. 11A depicts a swim lane diagram for implementing steps associated with a marketing system in accordance with aspects of the present disclosure.

FIG. 11A depicts a swim lane diagram for implementing steps associated with a marketing system in accordance with aspects of the present disclosure. The swim lane diagram 11100 of FIG. 11A includes three actors: users (e.g., developers), a centralized management system (e.g., Kony IQ' by Kony, Inc.) and a marketing system. In one example, the centralized management can be representative of the computing environment 1000 shown in FIG. 1A implemented as the improve sales efficiency module 1240 shown in FIG. 1C.

At step 11010, a developer or other user can enable or disable the notifications and/or campaign. At step 11015, the marketing system can initiate the notifications and/or campaign for products and/or professional services. At step 11020, the centralized management system (e.g., Kony IQ™ by Kony, Inc.) can provide the notifications and/or campaign for products and/or professional services to the user. At step 11025, the user can provide feedback to the centralized management system (e.g., Kony IQ™ by Kony, Inc.) about the notifications and/or campaign for products and/or professional services. At step 11030, the centralized management system (e.g., Kony IQ™ by Kony, Inc.) can store the results and run analytics, providing them to the marketing system. In embodiments, the analytics can be run using the AI as described herein. The analytics can be, e.g., effectiveness of the campaign, whether it is targeting the correct users with the most pertinent products and/or services, etc.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed. Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

System and Method of Application Translation

The system and method of application translation can be implemented in prepackaged applications, e.g., digital banking and other commerce related applications provided to customers. The system and method of application translation allows customers to customize the applications to meet their requirements, while still providing for translations. For example, the system and method of application translation can be implemented in a prepackaged application that will now support internationalization (i18n) of many different languages using, e.g., translation APIs. In embodiments, by implementing the system and method herein, prepackaged applications will support i18n on all strings in the application, which, in turn, will reduce issues at runtime.

Adding a new language support to applications is very challenging. For example, problem areas in internationalization may include client side issues, server side issues and other miscellaneous issues. In computing, internationalization and localization are means of adapting computer software to different languages, regional differences and technical requirements of a target locale. Internationalization is the process of designing a software application so that it can be adapted to various languages and regions without engineering changes. Localization is the process of adapting internationalized software for a specific region or language by translating text and adding locale-specific components. Localization (which is potentially performed multiple times, for different locales) uses the infrastructure or flexibility provided by internationalization (which is ideally performed only once, or as an integral part of ongoing development)

By way of illustration, client side i18n issues may include: static text set to widget and no i18n key; static text set to widget after setting i18n key; static text set to widget property directly; static text set to widget property indirectly (via another variable); text set to widget and no i18n key onc, but text is set in code; images with English text or which represents locale or regions in it; splash screen; date and time formats; currency symbol format; currency separator in numbers; keyboard and soft input panels; charts/custom calendars/custom widgets with user interfaces; browser content; map content; native/pickers/choosers; network call returned text in English; static English text concatenated with dynamic text; and i18n text concatenated with dynamic English text. Server side i18n issues may include: text saved in master tables in a DB; text in child tables in the DB; text constructed with raw text in network call response; indirect text such as URLs in master/child tables; and images in child tables with language or region specific. Miscellaneous i18n issues may include: semi internationalized and localized applications; not all strings are externalized; language mappings in source code; conditional code based on language or region; currency mapping based on language; date time formats based on language and region; custom charts with English text; browser content with English URLs; custom widgets (calendar) with static English text; and network calls are returning English text always.

The systems and methods of the application translation solve the above problems. For example, by implementing the system and method provided herein, the following can be provided during application conversion:

1. Extracting all strings from all forms, widgets, applications, etc., and localizing the extracted strings with i18n keys;

2. Localizing master and child tables in a database having English text, e.g., in localized format;

3. Localizing strings on application developer written code which perform string operations on strings;

4. Localizing custom widgets (e.g., calendar widget) at multiple places, advertisement image URLs, form headers, etc.

5. Allowing translate APIs to translate all strings from a set;

6. Deploying on public cloud without login failure;

7. Changing formatting in application code and databases;

8. Supporting charts, maps, etc. in different languages; and

9. Returning network calls in English text and/or other languages; and

10. Rending translated content in a browser.

In embodiments, the system and method described herein can be implemented by the computing environment 1000 of FIG. 1A, with translations being displayed on any of the interfaces described herein. In addition, the system and method of translation can be implemented through a plug-in (e.g., plug-in architecture module 1230 shown in FIG. 1C) to work with any of the sub-systems described herein. In embodiments, the system and method can be implemented through the Cognitive Computing for Omni-Channel Platform described with respect to FIG. 1C.

Figure 12A:
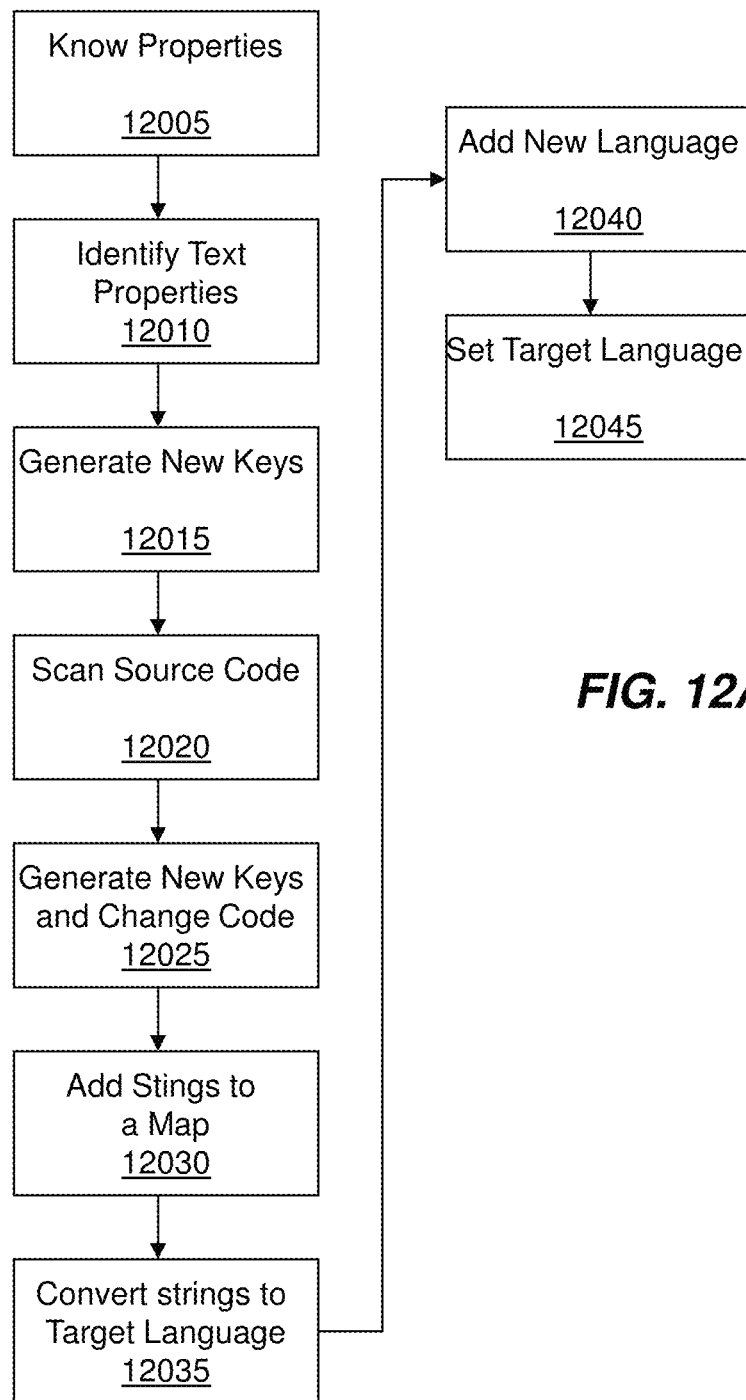
FIG. 12A depicts a flow diagram for implementing steps associated with the system and method of translation application in accordance with aspects of the present disclosure.

FIG. 12A depicts a flow diagram for implementing steps associated with the system and method of translation application. The features described herein can be implemented from the centralized management which is representative of the computing environment 1000 shown in FIG. 1A. More specifically, FIG. 12A shows the translation process which is implemented by the centralized management system (e.g., Kony IQ™ by Kony, Inc.).

Figure 12B:
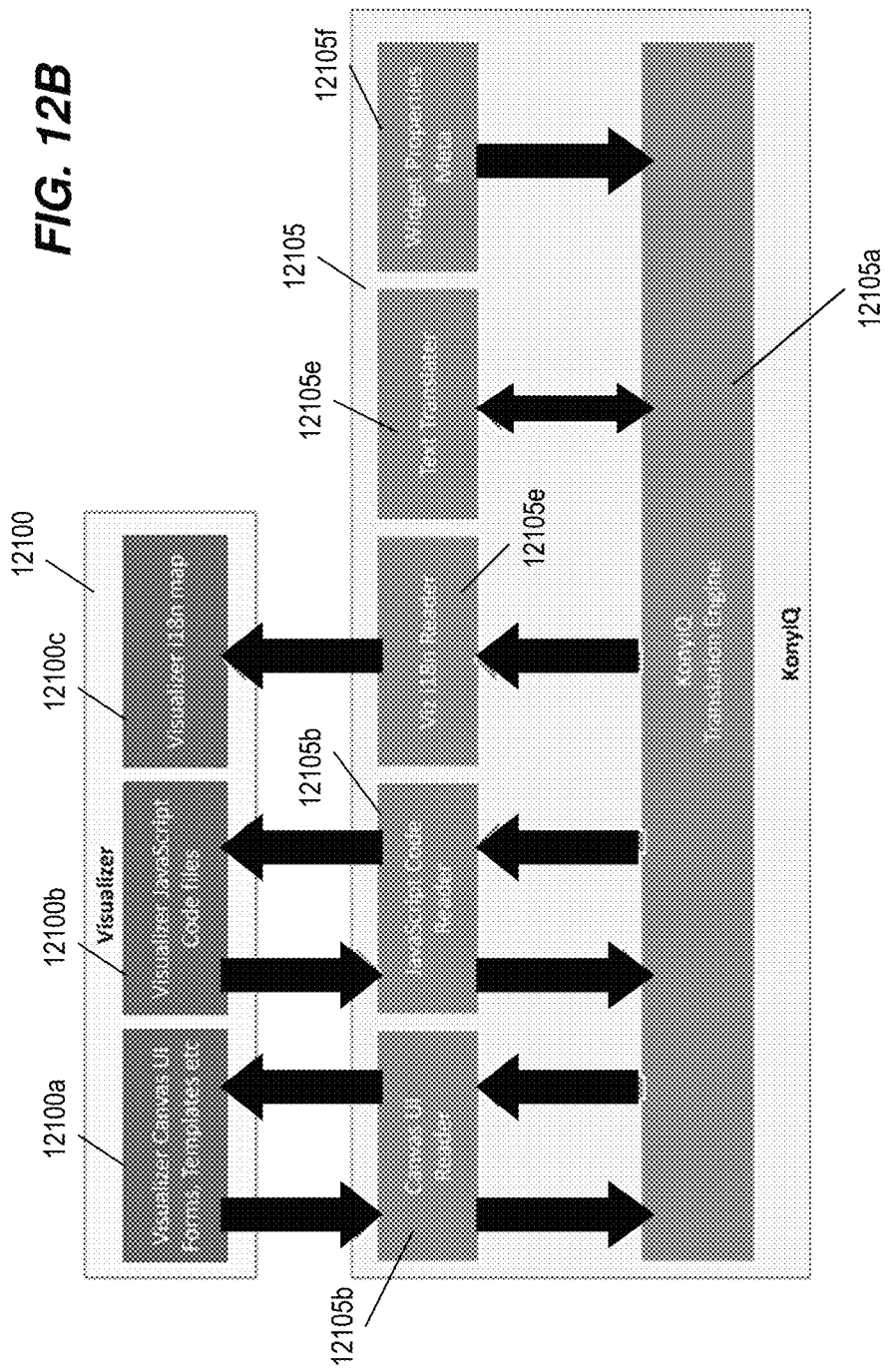
FIG. 12B shows an architecture of system and method of the translation application in accordance with aspects of the present disclosure.

At step 12005, all properties of widgets which show text on a user interface are obtained, e.g., known. In embodiments, the centralized management system can know the properties of the widgets because it will integrate with the reference architecture of all forms, widgets and applications (which include the widgets and the forms). More specifically, the reference architecture (which is shown in FIG. 12B) allows for a very robust representation of widgets, forms and applications so that the centralized management system can become integrated such that it implicitly knows the format of the widgets, forms and application. In further embodiments, the centralized management system will be able to understand the formatting and syntax of any application and, further, is capable of accepting modifications and handling applications outside the context of the platform associated with the centralized management system.

At step 12010, the centralized management system identifies all the text properties of the widgets (or applications or forms) which do not have an i18n key, from all forms, templates, masters, and widgets in the current application. At step 12015, the centralized management system generates new i18n keys and sets these keys to text properties while removing the direct text properties. For example, in this step, the centralized management system can upgrade the application in real time by dynamically creating additional JSON notation with respect to that particular field. In this implementation, the new i18n keys can be synthesized, with new format and syntax representing text properties that support the i18n key for that particular field or widget etc., which is then written into the project side. The initial text properties can then be removed as they have been updated and enhanced.

At step 12020, the centralized management system scans through all the source code files using JavaScript AST. In embodiments, the JavaScript abstract syntax tree (AST) helps collect all the widget properties that are a part of the scope of the application in order to set the widget properties both directly and indirectly. For example, the JavaScript AST essentially rifles through all code and gathers up all the strings that are needed to reset in terms of translation capabilities. To identify which screen string sets are needed in order to perform the translation capabilities, it should be understood that the screen string will have a unique identifier for a text field and if that text field has something pre-initialized in it, then the text field is reviewed and it is assumed necessary to create a different embodiment by translating that particular field.

At step 12025, the centralized management system will generate the new i18n keys and change the code with an API call, e.g., kony.i18n.getlocalizedString( ) API calls, with the new generated i18n keys. For example, in embodiments, the centralized management system calls using a particular get localized strings function and maps this to a translate program. More specifically, the centralized management system would use the i18n keys to pass a source language to set a target language for translation, and then collects the translation when it returns from that particular service call. In embodiments, by using a reverse translation technique, it is also possible to translate the target translation back into the original source language for comparison purposes. This can be done by flagging any translations that it's believed to be out of specification or out of compliance.

At step 12030, all of the collected strings are added to an i18n map along with their i18n keys. In embodiments, the i18n map can be a currently existing map or a map, which includes the JSON notations. For example, the centralized management system has taken care of essentially rewriting all the JSON notation that represents the i18n key structure, and all the fields, and fields by language, etc. As noted below, once this structure is saved the particular project does not need to be translated again.

At step 12035, a translation API (e.g., Google™ translation API) will convert all the identified strings into the target language, e.g., English to Mandarin, etc. At step 12040, the centralized management system adds the new language and the newly translated strings to the application i18n map. At step 12045, the centralized management system sets the target language to the new language.

In embodiments, the target language can be driven in many different ways. For example, the target language can be driven by a top level interface of the centralized management system, which implements a chatbox interface. Also, once a particular project (e.g., widget, form or application) is translated, it can be saved in a repository, e.g., database, such as the storage system 1022B. In this way, the text field of any widget, form or application will not have to be translated again, with the system and method described, through the mapping function, having the ability to traverse the translation throughout the marketplace for similar forms, widgets and applications.

FIG. 12B shows an architecture of the system and method of the translation application in accordance with aspects of the present disclosure. More specifically, FIG. 12B shows the implementation of the processing steps of FIG. 12A within an architectural structure. In embodiments, the processing steps are implemented by different components/services within the architecture.

The architecture includes a development tool 12100 and the centralized management system (Kony IQ™ by Kony, Inc.) 12105. In embodiments, the development tool 12100 can be e.g., Kony Visualizer® by Kony, Inc. The centralized management system (Kony IQ™ by Kony, Inc.) 12105 includes several components/services, including: a translation engine 12105a, a canvas user interface reader 12105b, a JavaScript code reader 12105c, a Viz i18n reader 12105d, a text translator 12105e and a widget properties metadata 12105f. In implementation of the architecture, each of the components/services 12105a-12105d communicate with the translation engine 12105a and are configured to implement the steps shown in FIG. 12A. The development tool 12100 includes the following components/service: canvas user interface forms, templates, etc., 12100a, JavaScript code files 12100b and an i18n map 12100c. In embodiments, the components 12105a-12105c communicate with the respective components 12100b-12100d of the development tool 12100 when implementing steps 12005-12030, 12040 and 12045.

In embodiments, the translation engine 12105a can live within a network cloud or within the centralized management system (Kony IQ™ by Kony, Inc.) 12105. In any scenario, the translation engine 12105a is used to implement the respective components/services 12105b-12105f. The user interface reader 12105b passes information between the canvas user interface forms, templates, etc., 12100a and the translation engine 12105a, while implementing the steps 12010 and 12015 of FIG. 12A. By way of example, the canvas user interface reader 12105b can interface with the canvas user interface forms, templates forms and templates module/service 12100a. The canvas user interface reader 12105b can be a piece of executable code, which interacts with elements that are specified at the IDE level. For example, the canvas user interface forms and templates 12105b are services described and created at the visualizer IDE level. The canvas user interface reader 12105b is a service layer underneath the covers that interoperates with those features of the integrated development environment. It can, for example, match the world of drag-and-drop user interface with things that would manually either hover over click or be input via keyboard etc., with the world of the canvas user interface (UI) reader that actually performs the biological transformations.

Still referring to FIG. 12B, the JavaScript code reader 12105c can embed the JavaScript AST, e.g., abstract syntax tree interpreter. In this way, the JavaScript code reader 12105c is capable of reading the JavaScript code for the purposes of translation as discussed with respect to steps 12020 and 12025 of FIG. 12A. For example, the AST provides a complete manifest of what is needed to change for translation, so that it can be mapped and provided as a collection of service calls to the translate service, e.g., translate engine 12105a.

The viz i18n reader 12105d places the generated keys to the map 12100c of the development tool 12100. In embodiments, the viz i18n reader 12105d implements/passes along the information provided in steps 12030, 12040 and 12045 of FIG. 12A. The text translator 12105e is an API wrapper that essentially is the go-between between the Kony Visualizer® by Kony, Inc (development tool) and the translation API, e.g., implements the step 12035 of FIG. 12A.

The widget properties metadata component 12105e, on the other hand, is sensitive to the internal structure of metadata that comprises the format and syntax of the forms, widgets and applications. That is, the widget properties metadata component 12105e knows the properties of the widgets, forms and applications as described with respect to step 12005 of FIG. 12A. In embodiments, the widget properties metadata component 12105e can collect all widget details and create a meta with all the properties of widgets that need to be translated. By way of illustrative example, Table 1 below shows the widgets and their properties that render text on the user interface.

TABLE 1

| Widget | Property |
|---|---|
| Form/Form2 | title |
| Button | text |
| Link | text |
| Label | text |
| Phone | text |

TABLE 1-continued

| | |
|---|---|
| Segment/Segment0 | 1. pushToRefresh |
| | 2. pullToRefresh |
| | 3. releaseToPushRefresh |
| | 4. releaseToPullRefresh |
| | 5. data without sections |
| | 6. data with sections |
| Switch | 1. leftSideText |
| | 2. rightSideText |
| ScrollBox | 1. pushToRefresh |
| | 2. pullToRefresh |
| | 3. releaseToPushRefresh |
| | 4. releaseToPullRefresh |
| TextArea/TextArea2 | 1. text |
| | 2. placeholder |
| TextField/TextField2 | 1. text |
| | 2. placeholder |
| Camera | text |
| Tab | tabName |
| RichText | text |
| Video | text |
| Radio group | data |
| Checkbox | data |
| Combo box | data |

| Type | Details |
|---|---|
| Templates | Widgets inside templates of different types |
| Components | Widgets inside components |
| Forms | Widgets inside form |
| App menu | App menu data |
| Segment data in components | Segment inside Component will have data for each channel |
| Actions | "Set widget property" action |

Figure 12C:
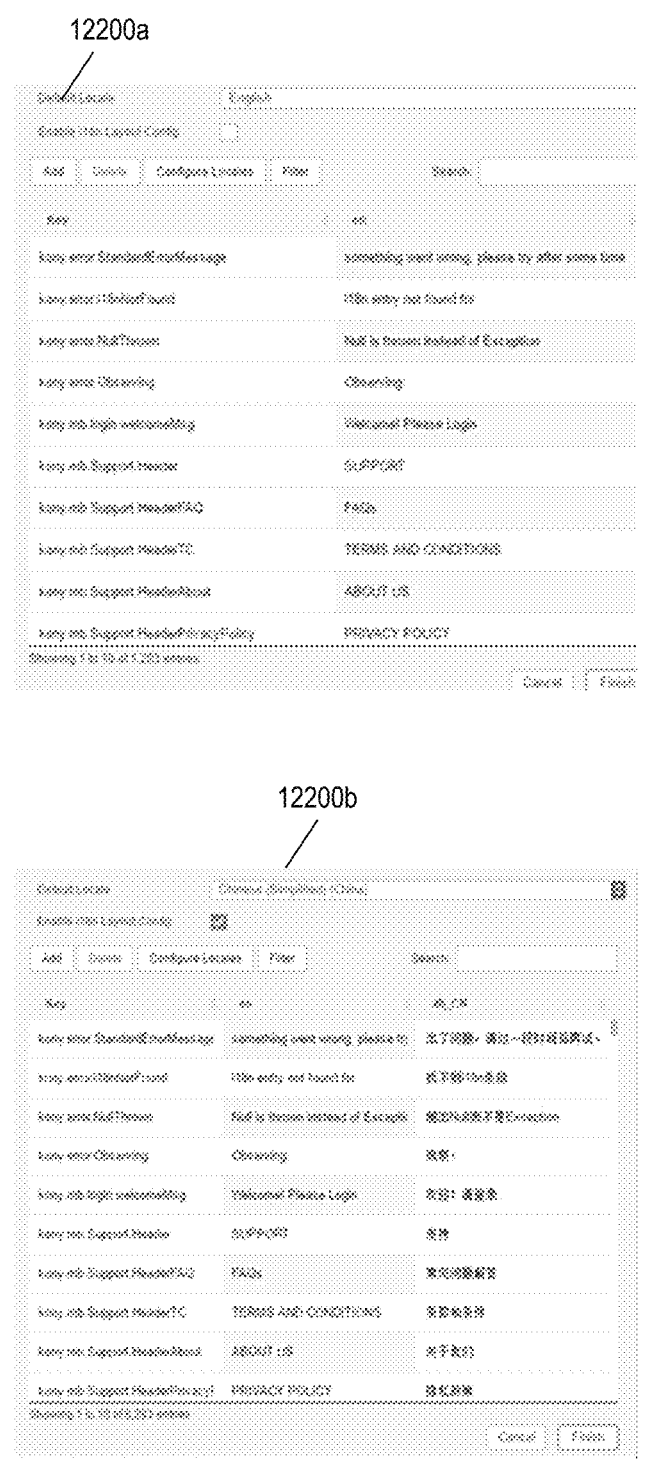

FIG. 12C shows screenshots before and after translation conversion support as implemented by the system and method of translation application. In this example, the conversion is from English to Mandarin; although these screenshots are equally applicable to other translations. In embodiments, the screenshot 12200a shows English strings in an i18n map; whereas, screenshot 12200b shows Mandarin strings in an i18n map.

FIG. 12D shows screenshots of translation of strings on forms (from English to Mandarin) as implemented by the system and method of translation application. In this example, the conversion is from English to Mandarin; although these screenshots are equally applicable to other translations. In embodiments, the screenshot 12205a shows a form in English; whereas, screenshot 12205b shows the form translated into Mandarin. Accordingly, it is shown that the system and method described herein, e.g., translation application, can provide translations of a user's interface in response to a question, for example, or any text embedded in the application of the form or the widget itself so the entirety of a widget can be translated.

Referring still to FIG. 12D, the system and method described herein, e.g., translation application, can handle static questions and answers as well as providing the ability to translate web services into different languages. The translation application also has the ability to translate a portion of the form or any static answer and, at run time of the application, bring in the translation and merge it with other content coming back from the service call, i.e., a person's name. For example, using the information shown in FIG. 12D, the person's name, e.g., John, can be merged with the remaining portion of the answer. This is beneficial since the name can be deemed static text which will likely be input into the target language, e.g., their own native language, so there should be no need to translate this portion of the text. Instead, it would only be necessary to translate the hard-coded response, e.g., all other text.

Figure 12E:
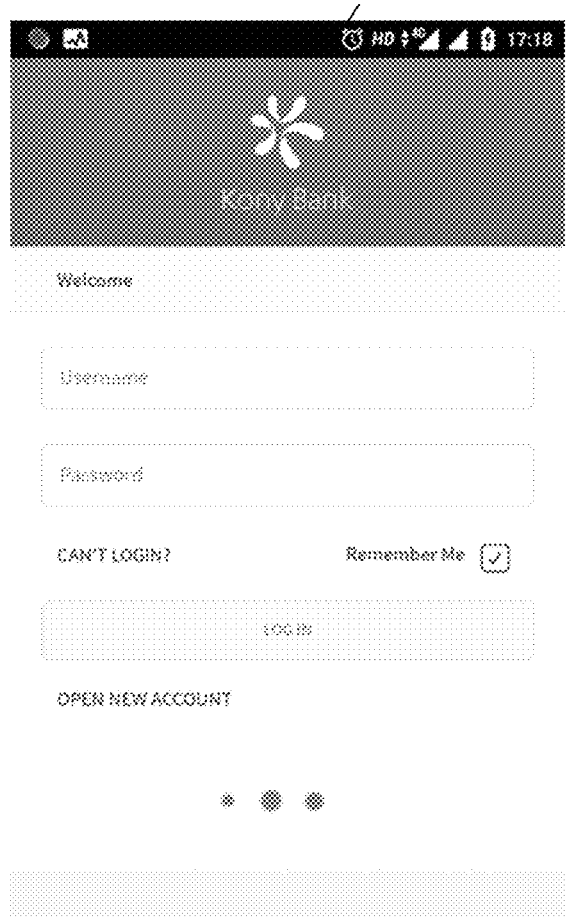
FIG. 12E shows screenshots of translation of fillable fields and static text on forms (from English to Mandarin) as implemented by the system and method of translation application.
Figure 12E:

FIG. 12E shows screenshots of a translation of fillable fields and static text on forms (from English to Mandarin) as implemented by the system and method of translation application. In this example, the conversion is from English to Mandarin; although these screenshots are equally applicable to other translations. In embodiments, the screenshot 12210*a* shows the form in English (both static and fillable fields); whereas, screenshot 12210*b* shows the form translated into Mandarin. In this and other examples described herein, the fillable fields can be static text hardcoded on the form or can be obtained from a back end service essentially living in a service call or within a database front ended by a service call that needs to be traversed and translated prior to being populated into the form. This latter feature can be performed through the marketplace, for example, using mapping features to find the location of the particular text requiring a translation.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for translating strings of a software application comprising:
   identifying, by a computing device, text properties of software widgets of a software application that do not have an internationalization key, wherein the text properties of the software widgets of the software application show text on a user interface;
   scanning, by the computing device, source code of the software application to identify strings needed to perform translation capabilities;
   generating, by the computing device, new internationalization keys which are set to the text properties of the software widgets of the software application;
   replacing, by the computing device, the source code of the software application utilizing an application program interface (API) call with the new internationalization keys based on the scanning the source code of the software application;
   adding, by the computing device, the identified strings to an internationalization map, along with their respective new internationalization keys of the text properties of the software widgets of the software application;
   translating, by the computing device, the identified strings from a first language to a second language utilizing a translation API to produce translated strings;
   adding, by the computing device, the second language and the translated strings to the internationalization map; and
   saving in a repository, by the computing device, translated software widgets of the software application generated during the translation of the identified strings, wherein the repository eliminates the need for users to translate the same software widgets of the software application again.

2. The computer-implemented method of claim 1, wherein the identifying the text properties of the software widgets of the software application comprises:
   collecting, by the computing device, details of the software widgets of the software application; and
   creating, by the computing device, metadata with the text properties of the software widgets of the software application that need to be translated.

3. The computer-implemented method of claim 1, further comprising setting, by the computing device, a target language for the software application as the second language.

4. The computer-implemented method of claim 1, wherein the scanning the source code of the software application is implemented utilizing a JavaScript abstract syntax tree.

5. The computer-implemented method of claim 1, wherein the identifying the text properties of the software widgets of the software application comprises obtaining the text properties of the software widgets of the software application from a software development tool.

6. The computer-implemented method of claim 1, wherein the generating the new internationalization keys comprises dynamically upgrading, by the computing device, the software application in real-time by dynamically creating JavaScript Object Notation (JSON) notations with respect to the software widgets of the software application.

7. The computer-implemented method of claim 6, wherein the internationalization map includes the JSON notations.

8. The computer-implemented method of claim 1, wherein the scanning the source code of the software application comprises assuming that a text field is needed to perform translation capabilities when the text field has been pre-initialized.

9. The computer-implemented method of claim 1, wherein the translating the identified strings from the first language to the second language utilizing a translation API to produce translated strings results in translated content in a web browser.

10. A computer program product comprising a non-transitory computer readable storage medium having program instructions embodied therewith, the program instructions executable by a computing device to cause the computing device to:
    identify text properties of software widgets, software forms, software templates, and software masters of a software application that do not have an internationalization key, wherein the text properties of the software widgets, software forms, software templates, and software masters of the software application show text on a user interface;
    scan source code of the software application to identify strings needed to perform translation capabilities;
    generate new internationalization keys which are set to the text properties of the software widgets, software forms, software templates, and software masters of the software application;
    replace the source code of the software application utilizing an application program interface (API) call with the new internationalization keys based on the scanning the source code of the software application;
    add the identified strings to an internationalization map, along with their respective new internationalization keys of the text properties of the software widgets, software forms, software templates, and software masters of the software application;
    translate the identified strings from a first language to a second language utilizing a translation API to produce translated strings;

add the second language and the translated strings to the internationalization map; and save in a repository, translated software widgets, software forms, software templates, and software masters of the software application generated during the translation of the identified strings, wherein the repository eliminates the need for users to translate the same software widgets, software forms, software templates, and software masters of the software application again.

11. The computer program product of claim 10, wherein the identifying the text properties of the software widgets, software forms, software templates, and software masters of the software application comprises:

collecting details of the software widgets, software forms, software templates, and software masters of the software application; and creating metadata with the text properties of the software widgets, software forms, software templates, and software masters of the software application that need to be translated.

12. The computer program product of claim 10, wherein the program instructions executable by the computing device to further cause the computing device to set a target language for the software application as the second language.

13. The computer program product of claim 10, wherein the scanning the source code of the software application is implemented utilizing a JavaScript abstract syntax tree.

14. The computer program product of claim 10, wherein the identifying the text properties of the software widgets, software forms, software templates, and software masters of the software application comprises obtaining the text properties of the software widgets, software forms, software templates, and software masters of the software application from a software development tool.

15. The computer program product of claim 10, wherein the program instructions executable by the computing device to further cause the computing device to dynamically upgrade the software application in real-time by dynamically creating JavaScript Object Notation (JSON) notations with respect to the software widgets, software forms, software templates and software masters of the software application, and wherein the internationalization map includes the JSON notations.

16. A system for translating strings of a software application comprising:

a processor, a memory and a non-transitory computer readable storage medium associated with a computing device; and a centralized management system of the computing device including: a translation engine configured to implement services of a user interface reader, a JavaScript code reader, and an internationalization reader, wherein the centralized management system of the computing device is configured to:

obtain from a software development tool, by the user interface reader, text properties of software widgets of a software application, wherein the text properties of the software widgets of the software application do not have an internationalization key;

identify, by the user interface reader, strings in source code of the software application needed to perform translation capabilities;

generate, by the user interface reader, new internationalization keys which are set to the text properties of the software widgets of the software application;

replace, by the JavaScript code reader, the source code of the software application utilizing an application program interface (API) call with the new internationalization keys based on the identifying the strings in the source code of the software application;

send, by the internationalization reader, the identified strings to the software development tool to be added to an internationalization map along with their respective new internationalization keys of the text properties of the software widgets of the software application;

utilize, by the translation engine, a translation API to translate the identified strings from a first language to a second language to produce translated strings; and send, by the internationalization reader, the second language and the translated strings to the software development tool to be added to the internationalization map;

wherein the user interface reader is executable code which interacts with forms and templates created at an integrated development environment (IDE) level of the software development tool, wherein the centralized management system of the computing device saves translated software widgets of the software application generated during the translation of the identified strings in a repository, and wherein the repository eliminates the need for users to translate the same software widgets of the software application again.

17. The system of claim 16, wherein the system further comprises the software development tool including: a user interface forms and templates component, JavaScript code files, and the internationalization map, and wherein:

the user interface reader of the centralized management system of the computing device is configured to interface with the user interface forms and templates component of the software development tool;

the JavaScript code reader of the centralized management system of the computing device is configured to read the JavaScript code files of the software development tool, generate a manifest of what needs to be changed for translation, and provide the manifest to the translation engine; and the internationalization reader of the centralized management system of the computing device is configured to communicate with the internationalization map of the software development tool for updating the internationalization map.

18. The system of claim 17, wherein the centralized management system of the computing device further comprises:

a text translator in the form of an API wrapper configured to act as a go-between between the software development tool and the translation API; and a widget properties metadata component configured to collect the text properties of the software widgets of the software application and create metadata with the text properties of the software widgets of the software application that need to be translated.

* * * * *